United States Patent
Bennin et al.

(10) Patent No.: US 7,218,481 B1
(45) Date of Patent: May 15, 2007

(54) APPARATUS FOR INSULATING AND ELECTRICALLY CONNECTING PIEZOELECTRIC MOTOR IN DUAL STAGE ACTUATOR SUSPENSION

(75) Inventors: Jeffry S. Bennin, Hutchinson, MN (US); Scott C. Giere, Hutchinson, MN (US); Jason S. Griesbach, Appleton, WI (US); Brett L. Haugen, Hutchinson, MN (US); Jason R. Heffelfinger, Arden Hills, MN (US); Dennis M. Ingle, Dassel, MN (US); Tony S. Peterson, Buttle Ground, WA (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 556 days.

(21) Appl. No.: 10/680,729

(22) Filed: Oct. 7, 2003

Related U.S. Application Data

(60) Provisional application No. 60/416,479, filed on Oct. 7, 2002.

(51) Int. Cl.
*G11B 5/58* (2006.01)
*G11B 21/20* (2006.01)
*G11B 21/21* (2006.01)

(52) U.S. Cl. .............................. 360/294.4; 360/245.8; 360/244.2

(58) Field of Classification Search ............. 360/294.4, 360/294.3, 294.1, 294.7, 294, 290, 291.9, 360/292, 244, 244.2, 245.8, 244.5
See application file for complete search history.

(56) References Cited

U.S. PATENT DOCUMENTS

| | | | |
|---|---|---|---|
| 5,656,882 A | 8/1997 | Lazerus et al. | 310/328 |
| 6,078,473 A | 6/2000 | Crane et al. | 360/294.3 |
| 6,108,175 A | 8/2000 | Hawwa et al. | 360/294.4 |
| 6,134,087 A | 10/2000 | Khan et al. | 360/294.6 |
| 6,157,522 A | 12/2000 | Murphy et al. | 360/294.6 |
| 6,791,783 B2 * | 9/2004 | Nakagawa | 360/75 |
| 6,791,802 B2 * | 9/2004 | Watanabe et al. | 360/294.4 |
| 2002/0080532 A1 * | 6/2002 | Fujiwara et al. | 360/294.4 |
| 2004/0136117 A1 * | 7/2004 | Kuwajima et al. | 360/294.4 |

OTHER PUBLICATIONS

The ACX QuickPack Microactuator; Active Control eXperts, Inc.; 3 pages; 1998.

* cited by examiner

*Primary Examiner*—Julie Anne Watko
(74) *Attorney, Agent, or Firm*—Faegre & Benson LLP

(57) ABSTRACT

Apparatus and method for selectively applying a voltage to one major surface of a pair of piezoelectric motors (PZTs) on a disk drive head suspension with a primary plane of a load beam of the head suspension parallel to the major surfaces of the PZT elements electrically insulated from the load beam. Electrical connections to the PZTs are made via wires, solder, conductive epoxy or electro-mechanical attachment of a plated surface of the PZT with a bond pad on an electrically isolated substrate. Lead extensions or separate pieces may be used to connect to the PZTs. The PZTs may be located on a major surface of the load beam, or may be assembled in a pre-fabricated motor assembly before being installed in the head suspension. Apertures in the load beam and other layers permit physical installation of the PZT motors and enable electrical connection to the PZTs.

6 Claims, 116 Drawing Sheets

APPARATUS FOR INSULATING AND ELECTRICALLY CONNECTING PIEZOELECTRIC MOTOR IN DUAL STAGE ACTUATOR SUSPENSION

CROSS REFERENCE TO RELATED APPLICATION

This application claims the benefit of U.S. Provisional Application No. 60/416,479 filed Oct. 7, 2002, the entire contents of which are hereby expressly incorporated by reference.

FIELD OF THE INVENTION

This invention is directed to differential actuation of one or more piezoelectric transducer (PZT) motors on a disk drive head suspension.

BACKGROUND OF THE INVENTION

Conventionally, PZT motors have a generally planar configuration, with one or two opposing major faces plated or otherwise coated with a conductive material, such as gold. Conventionally, it has been known to ground one face of the PZT and electrically energize the other face to actuate the PZT. Applying one polarity of voltage causes the PZT to contract in a direction parallel to the faces having electrodes, while applying the other polarity causes the PZT to expand in a direction parallel to the plane of the opposing major faces having the electrodes. It is to be understood that, while the PZT is expanding in the direction parallel to the plane of the opposing major faces, it is correspondingly contracting in a perpendicular direction, and conversely, when the PZT is contracting in the direction parallel to the plane of the opposing major faces, it is correspondingly expanding in the perpendicular direction. The present invention preferably makes use of the movement (of expansion or contraction) in the direction parallel to the plane of the opposing major faces carrying electrodes, while accommodating or "tolerating" the movement perpendicular thereto.

BRIEF DESCRIPTION OF THE DRAWINGS

FIG. 120 is a bottom plan view of the version shown in FIG. 119.

FIG. 121 is a composite view of FIGS. 119 and 120 with hidden lines shown for clarity.

FIG. 122 is an enlarged composite or wireform view (with hidden lines shown for clarity) of the motor subassembly of FIG. 119 together with separate pieces of laminate using solder connections between the motor subassembly and a portion of the flexure.

FIG. 123 is a section view along line I—I of FIG. 121.

FIG. 124 is a section view along line II—II of FIG. 121.

DETAILED DESCRIPTION

In the practice of the present invention, the PZT is electrically isolated from what has heretofore been a grounding substrate. In this arrangement, each major face of the PZT is independently available for receiving a driving voltage, permitting the use of a unipolar voltage source to obtain both expanding and contracting modes of operation of the PZT (i.e., when either major face may be connected to circuit common or "ground"). Furthermore, this result is obtained while the primary plane of the PZT is kept parallel to the primary plane of the stainless steel load beam of the head suspension. Maintaining this parallelism greatly simplifies the attachment of the PZT to the substrate, and keeps a low profile for the overall assembly, in contrast to prior art arrangements where the PZT is not parallel to the primary plane of the load beam. It is to be understood that "unipolar voltage source" refers to a single polarity electrical voltage source wherein, for example, a positive voltage potential is applied to a first major surface of the PZT motor when measured with respect to a reference voltage potential at a second major surface of the PZT element (which is normally at a ground or "circuit common" potential). In order to obtain both the expanding and contracting modes of operation in the practice of the present invention, the second (normally the bottom) surface of each of the two PZT motors must be isolated from any mechanical contact which would inherently "ground" those surfaces, since the unipolar source must be reconnected with reversed polarity to the PZTs to switch operation from the expanding mode to the contracting mode (or vice-versa). In contrast to a unipolar source, a bipolar source has the ability to change the polarity of the voltage supplied on its output terminal, when measured with respect to circuit common. However, bipolar sources are typically more complicated and hence more costly than unipolar sources (even with output switching of both terminals for a unipolar source) and thus there is a need for PZT loads to be able to be driven from unipolar sources. A head suspension typically includes a load beam, in which case the load beam forms a species of substrate for the present invention, which may be suitable for assemblies other than head suspensions. It is further to be understood that the metal layer forming the load beam for a head suspension may have additional portions forming a spring region and a mounting region for receiving a mounting plate.

Figures 1, 2:
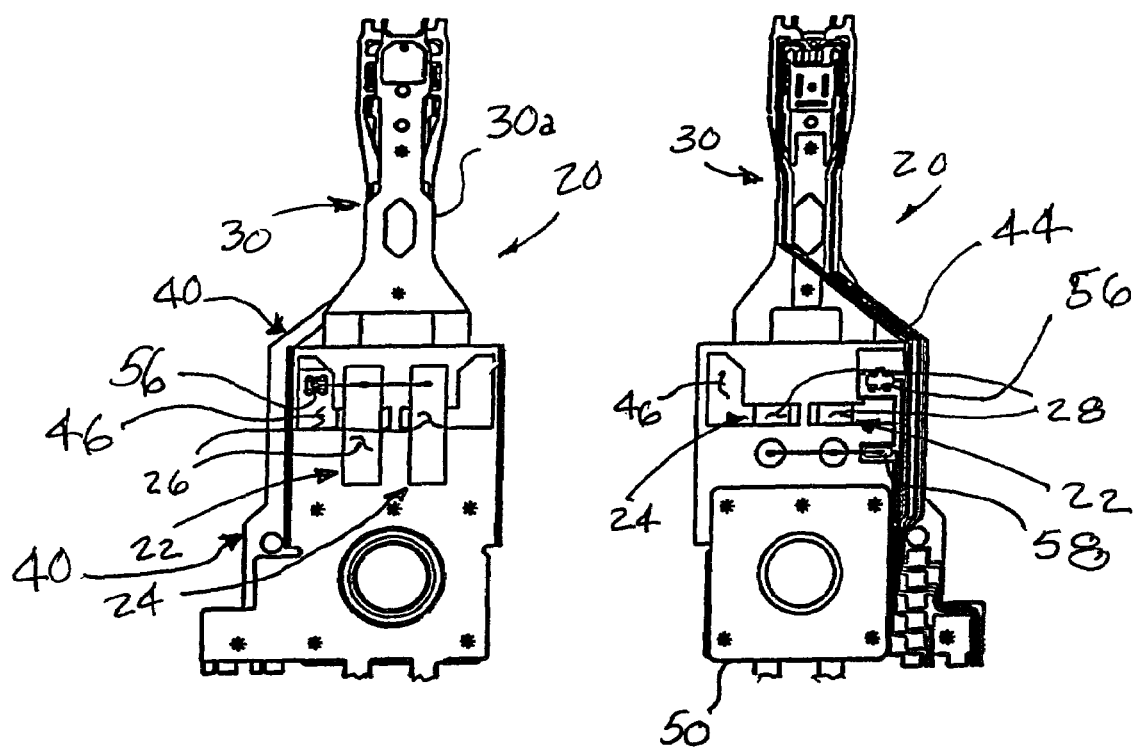
FIG. 1 is a top plan view of the suspension assembly showing a pair of PZT motors.
FIG. 2 is a bottom plan view of the suspension assembly of FIG. 1.
Figure 3:
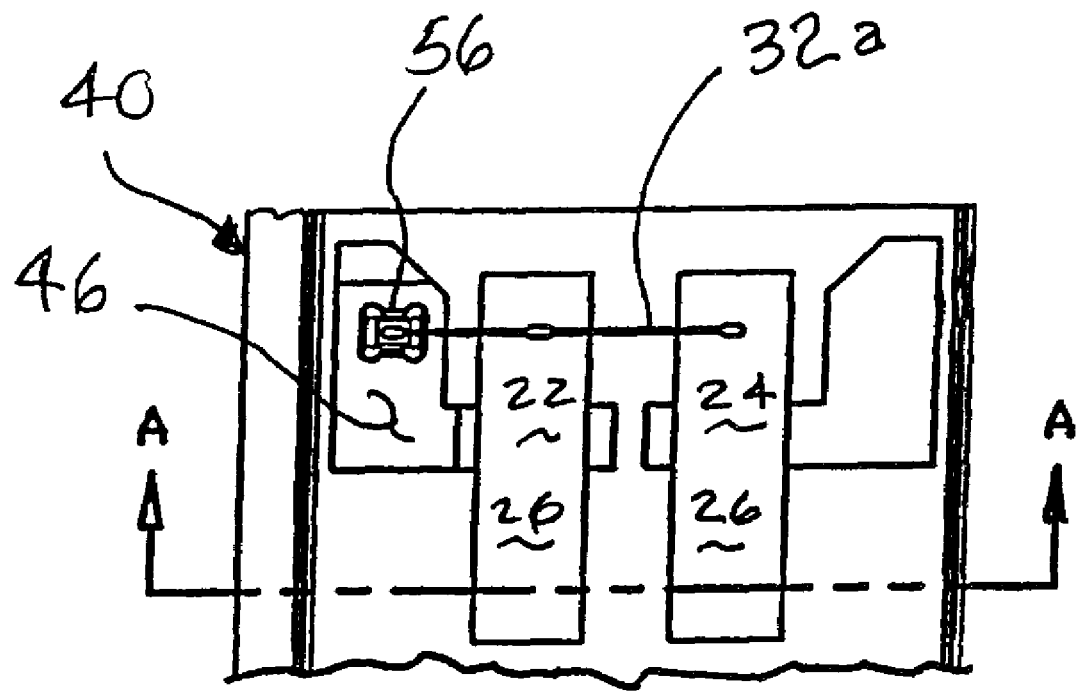
FIG. 3 is an enlarged fragmentary view of the top of the suspension assembly from FIG. 1, showing details of the PZT motors and the top electrical connections thereto.
Figure 4:
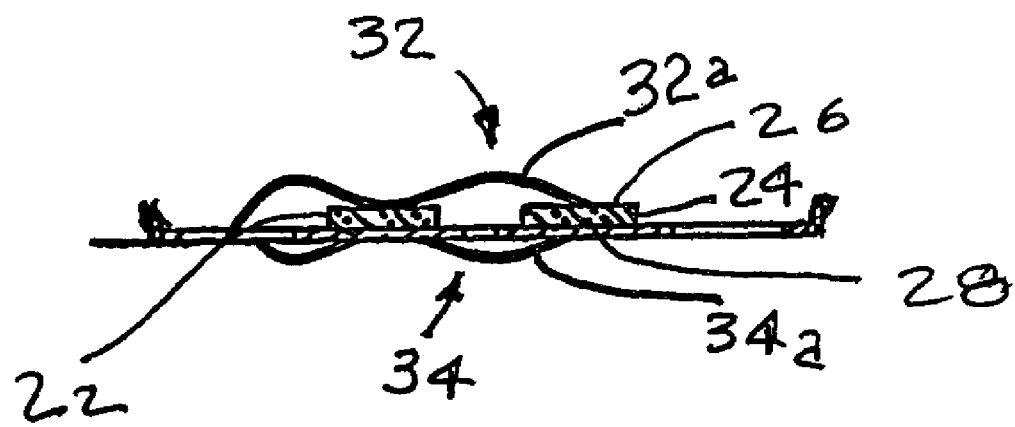
FIG. 4 is an enlarged fragmentary plan view of the bottom of the suspension assembly of FIG. 1.
Figure 5:
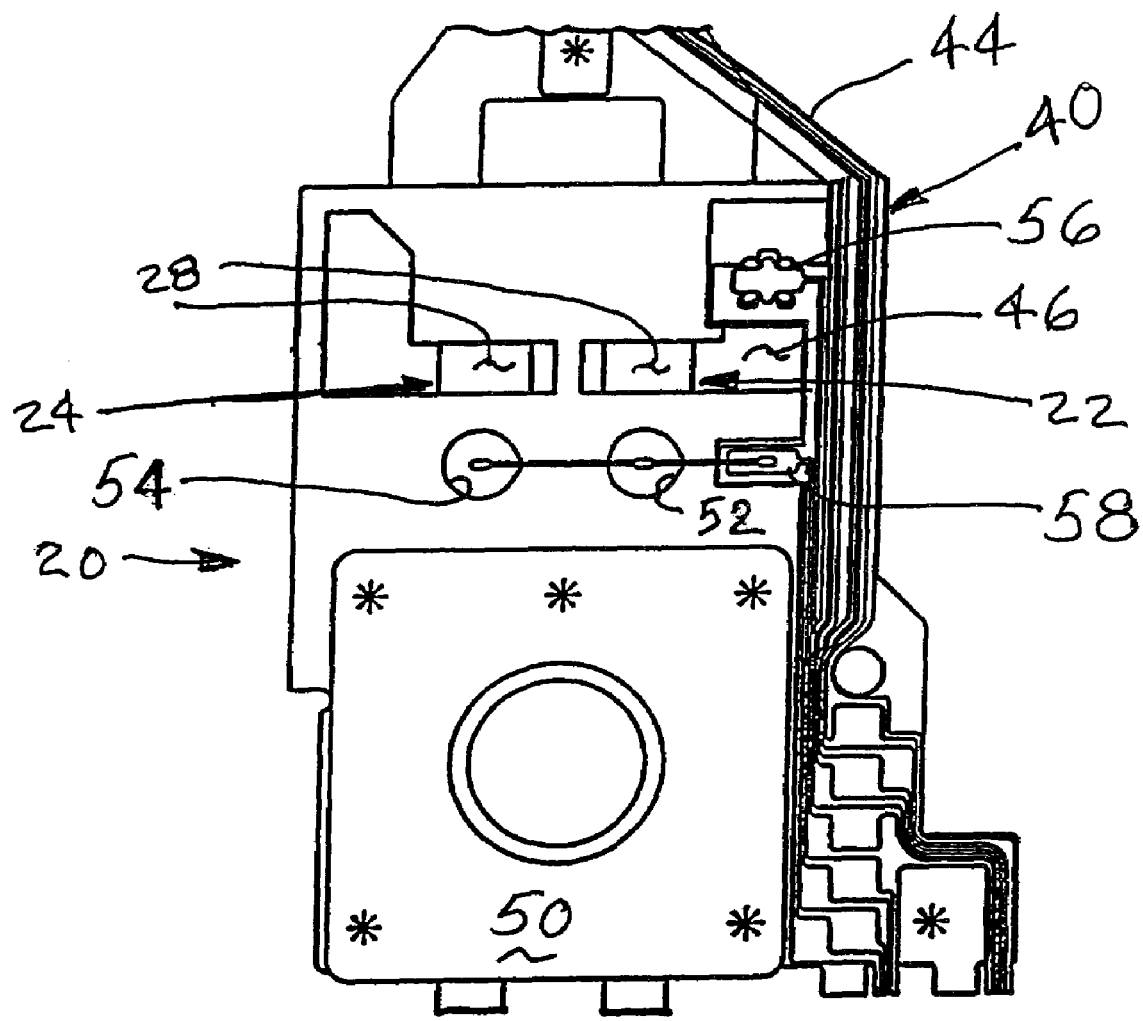
FIG. 5 is a section view along line A—A of FIG. 3.
Figure 6:
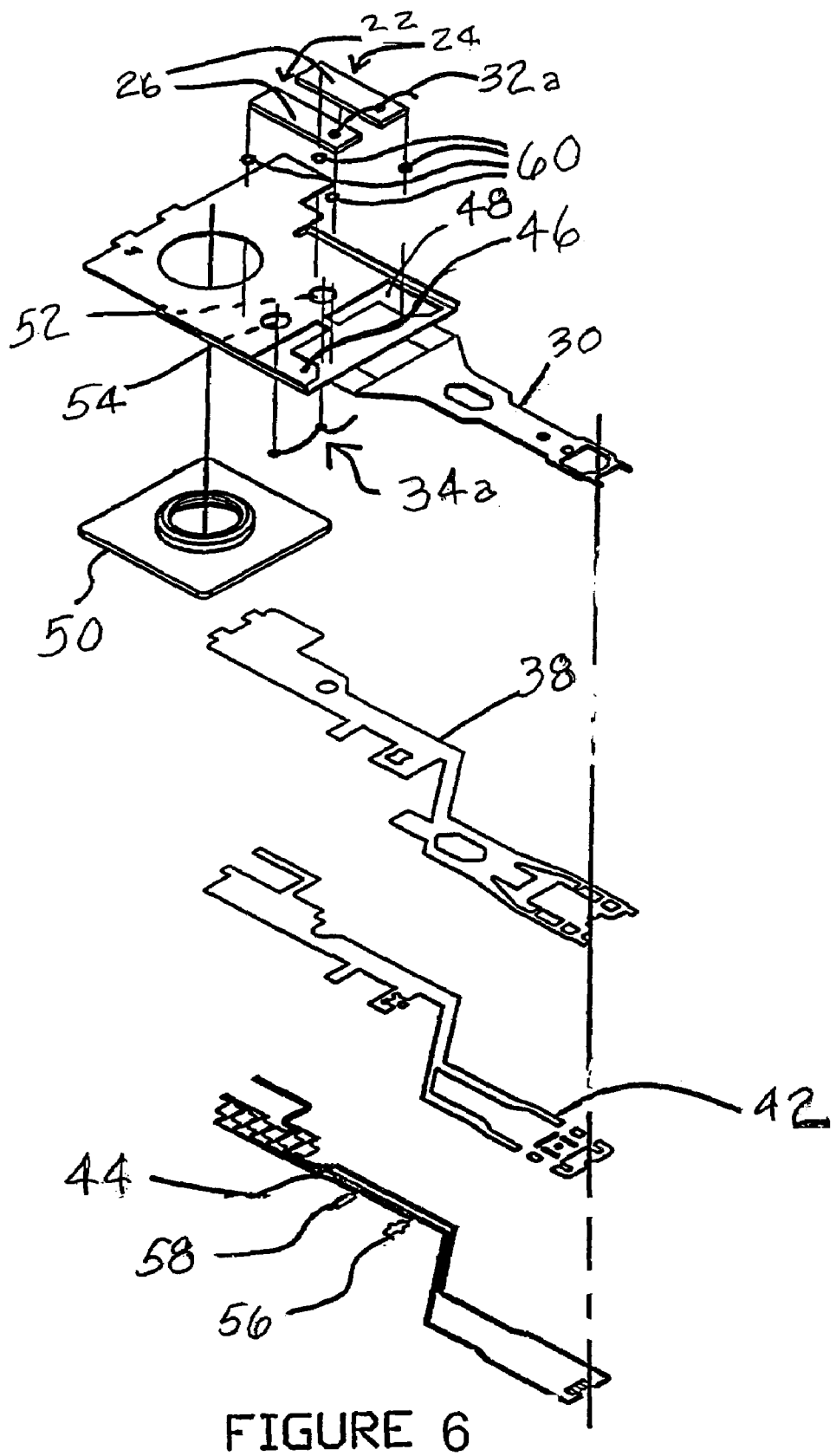
FIG. 6 is an exploded view of the suspension assembly of FIG. 1.

One embodiment of this invention may be seen in FIGS. 1–5 and is a disk drive head suspension or assembly 20 which allows electrical isolation of the PZT from the ground or circuit common connection, while permitting wire bonding to the PZT at both major surfaces (top and bottom) of the PZT. Head suspension 20 includes a pair of PZT motors 22, 24. As used herein it is to be understood that the terms "top" and "bottom" are relative terms, in that typically disk drive head suspensions are employed on both sides of a disk. As such, "top" refers to the free side or major surface 26 of the PZT 22 or 24 facing away from the suspension 20 which is visible in FIG. 1, and "bottom" refers to the major surface 28 of the PZT facing towards the suspension 20, partially visible in FIG. 2, FIG. 4 shows an enlarged plan view detail of a portion of the assembly 20 from the same side as shown in FIG. 2. In an exploded view, FIG. 6 shows the PZT motors 22 and 24, a first connection means 32 in the form of a top wire stitch 32a, a second connection means 34 in the form of a bottom wire stitch 34a, a stainless steel substrate 30 (here in the form of a load beam 30a, a stainless steel layer 38 for a flexure 40, a dielectric layer 42, and a layer of conductive traces 44 preferably formed of copper. The flexure 40 is made up of the stainless steel layer 38 for the flexure, the dielectric layer 42 and the copper traces 44. The connection means 32, 34 (shown in this embodiment in the form of wire stitches 32a, 34a) are for making electrical connections between the PZT motors 22, 24 and the conductive traces 44. A first aperture 46 in the load beam or substrate 30 enables the top wire stitch 32a (or first connection means 32) to be attached to a first bonding pad 56 electrically connected to one of the copper traces 44. In FIG. 6 the suspension 20 includes a mounting plate 50, and the substrate 30 has a second aperture 52 and a third aperture 54 for connection to the bottom conductive surfaces of the PZTs 22 and 24. Conductive copper traces 44 have a first bonding pad 56 and a second bonding pad 58. It is to be understood that the top surfaces 26 of each of the PZT motors 22 and 24 is conductive.

It is to be understood that in the version shown in FIGS. 1–8, the PZT motors 22 and 24 are electrically insulated from the stainless steel substrate/loadbeam 30 by an insulating epoxy 60 shown somewhat schematically in FIG. 6. In this embodiment, each PZT motor is mechanically, but not electrically, bonded via a bottom conductive surface 28 (i.e., the second major surface) to the substrate 30 (e.g., load beam 30a), typically made of stainless steel, using an adhesive (such as epoxy) that is filled with beads made of an insulating material. The adhesive is a type RP 672-1A (Alumina filler) or RP 672-1S (Silica filler) available from Ablestik at 20021 Susana Rd., Rancho Dominguez, Calif. 90221. The average particle size for the alumina filler is about 1 micron up to a maximum particle size of about no more than 5 microns. No surface treatment is required for the alumina filler version of the adhesive. For the silica filler version, the surface is preferably treated with a silane adhesion promoter, and the average particle size is about 4.5 microns, with a maximum particle size of about no more than 15.5 microns. For both the silica and alumina filler type adhesives, spacers are preferably glass beads with a particle size range of about 9 to about 20 microns in diameter.

It is to be understood that the adhesive (insulating epoxy) extends over some, but not all, of the bottom surface, and electrically isolates the mechanically bonded conductive surface 28 of the PZT 22 or 24 from the ground plane of the suspension 20 formed when the substrate 30 is conductive. A pair of openings, (the second and third apertures 52, 54) in the substrate 30 aligned with the region free of adhesive permit electrical connection to the bottom conductive surface 28 of each PZT. Electrical connection to the top conductive surface 26 (i.e., the first major surface, on the non-disk side in this arrangement) of each PZT is completed (in this embodiment) using a standard ultrasonically bonded top wire stitch 32a, the structure and method of which have been utilized on prior art designs and are conventional. The electrical connection to the bottom conductive layer of the PZT is also completed with an ultrasonically bonded bottom wire stitch 34a, but is completed from the disk side of the suspension through access features (such as the second and third apertures 52 and 54 in the load beam 30a) in a region where the adhesive is absent. It is to be understood that the two PZT motors 22 and 24 have opposite polarizations with respect to each other such that when the same voltage is applied to the PZT motors using the parallel electrical connection shown, one PZT will contract and the other PZT will expand in the direction parallel to the major surfaces of the PZT motors, thus "steering" the distal end 62 of the head suspension 20 laterally in a first direction 64. It is to be further understood that by applying an oppositely poled voltage across the pair of electrically parallel connected PZTs, the distal end of the head suspension will be driven in a second direction 66 diametrically opposite the first direction 64, as shown in FIG. 4b.

Figure 7:
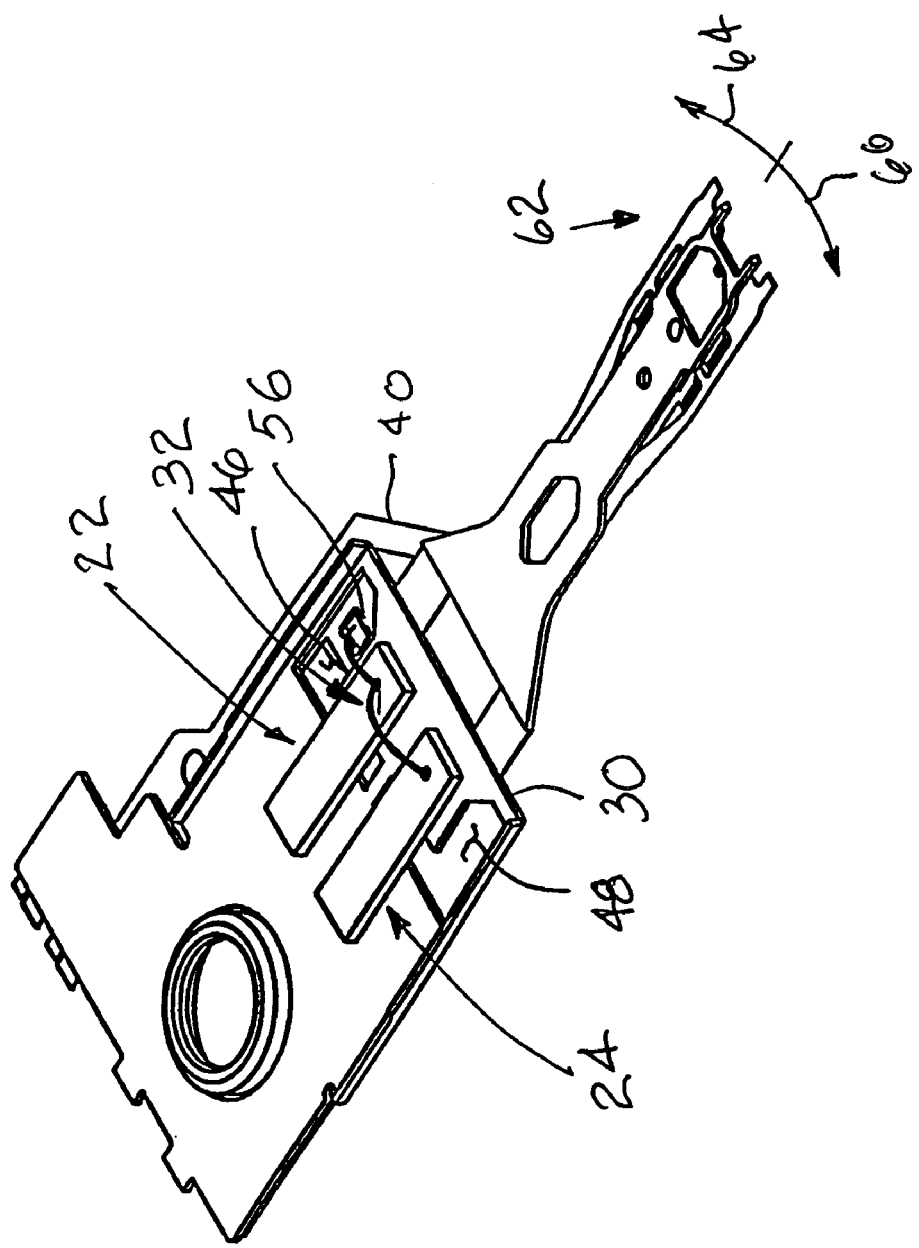
FIG. 7 is a perspective view of suspension assembly of FIG. 1 from a first side.
Figure 8:
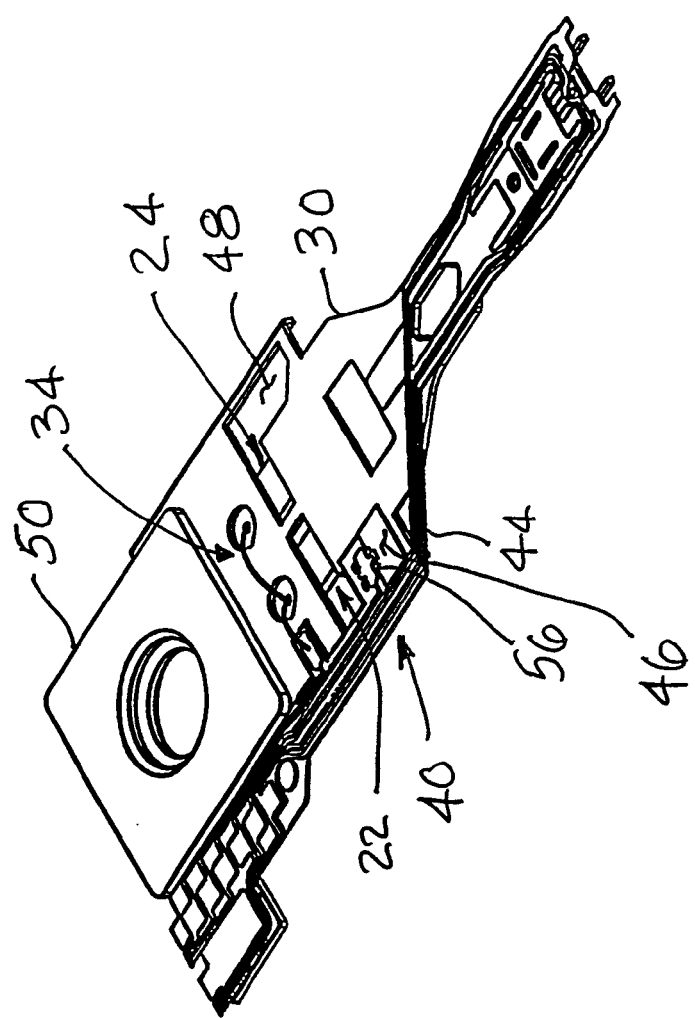
FIG. 8 is a perspective view of the suspension assembly of FIG. 1 from a second side opposite the first side shown in FIG. 7.
Figure 9:
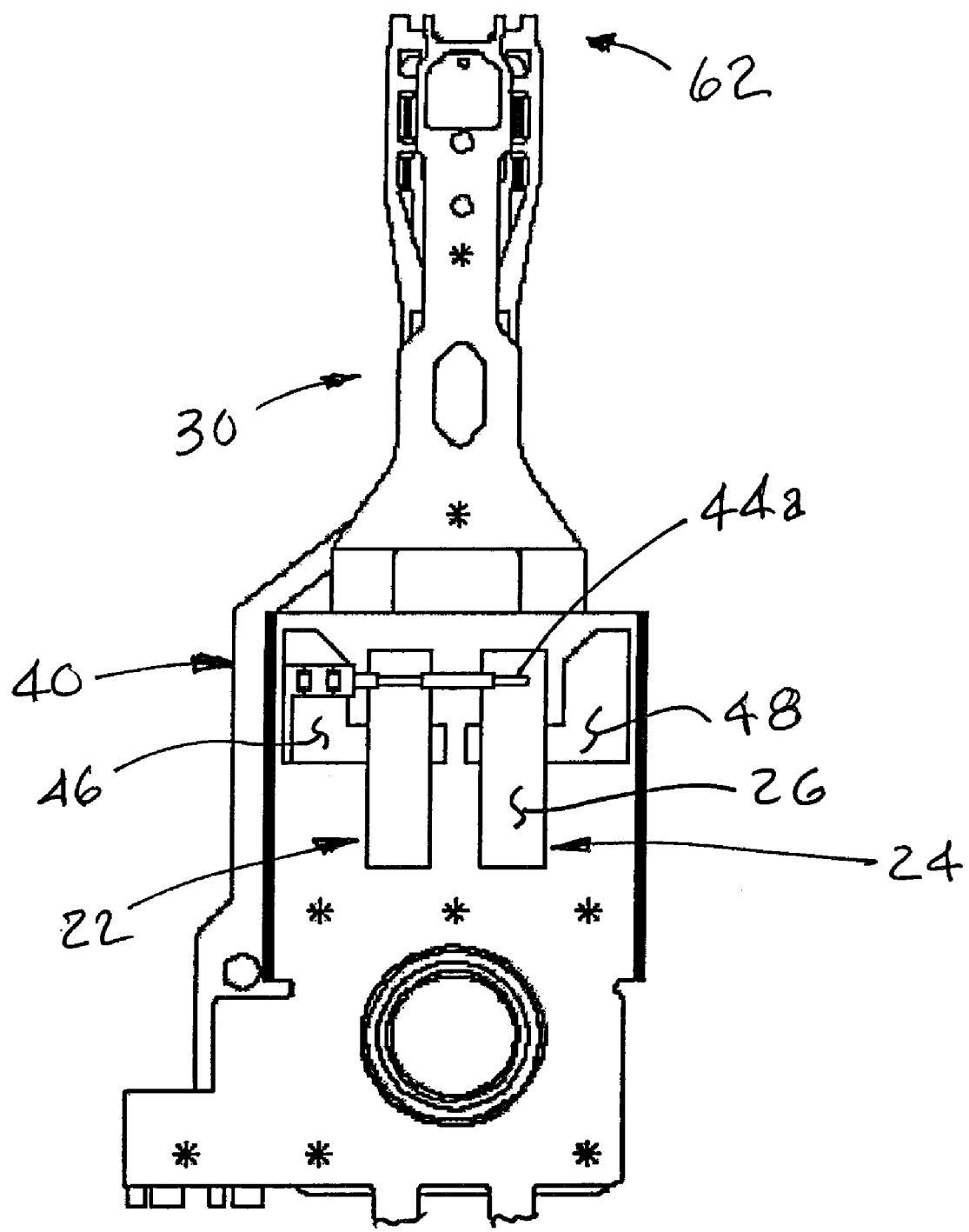
FIG. 9 is a top plan view of a first version of a first alternative embodiment wherein the PZT motors are ultrasonically bonded to extensions of the conductive leads formed from the flexure material.
Figure 10:
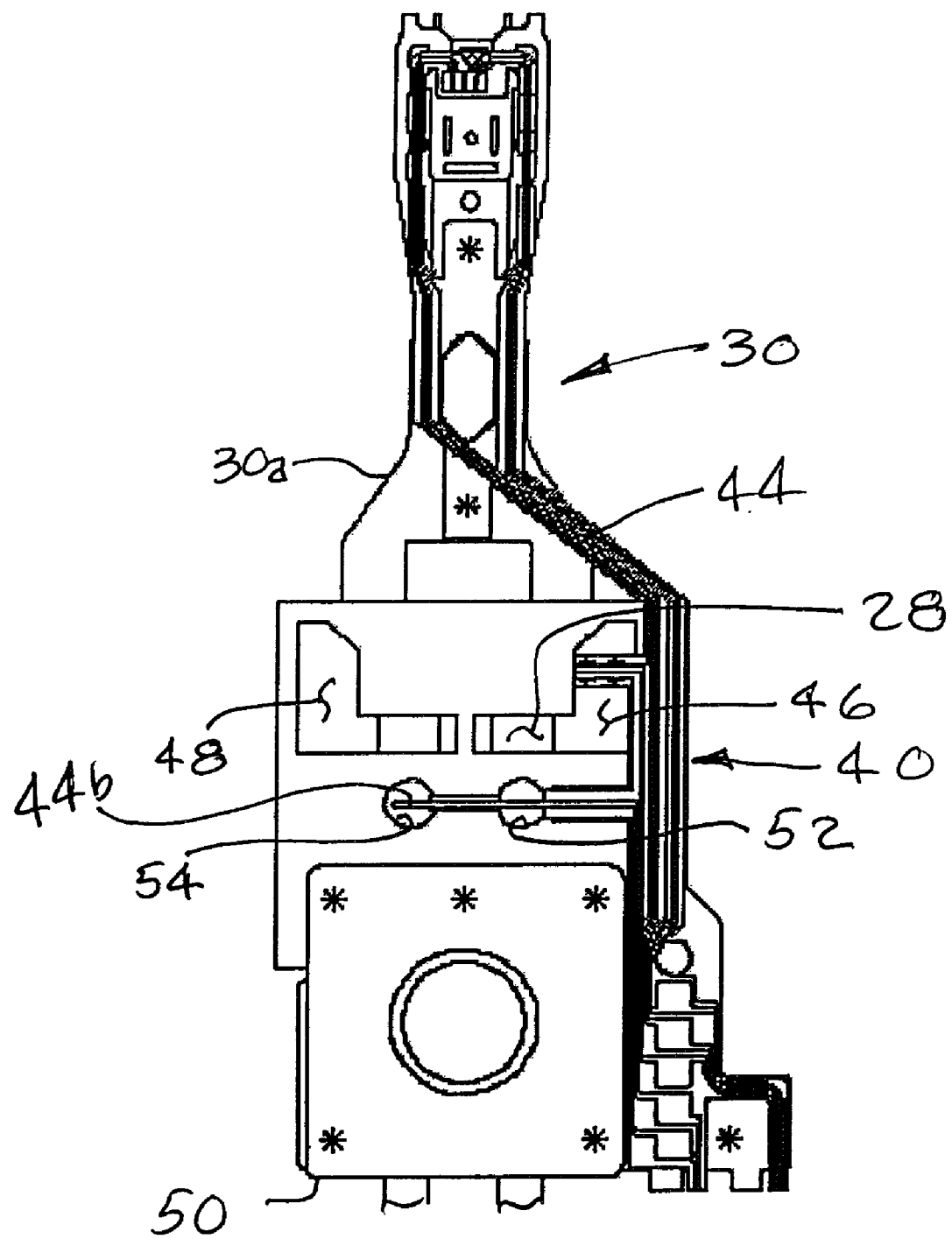
FIG. 10 is a bottom plan view of the version shown in FIG. 9.

Referring now most particularly to FIGS. 4 and 6, the second and third apertures 52 and 54 in the stainless steel load beam 30a are each aligned with one of the PZTs 22, 24 to permit electrical connection thereto. In this embodiment, the first aperture 46 (together with a mirror image aperture 48) also serves the purpose of providing a "hinge" to permit lateral movement of the distal end 62 of the load beam 30a when driven by the expansion and contraction of the PZT motors 22 and 24. FIGS. 7 and 8 show perspective views of the assembled version of the above described embodiment.

It is to be understood that the present invention is also applicable to an assembly having only one PZT motor. Furthermore, it is within the present invention to use ultrasonic bonding of conductive leads formed from the flexure material as shown in FIGS. 9–13 or formed from an additional add-on component as shown in FIGS. 14–18, similar in structure to the flexure to make the electrical connection to the PZT motor(s). Additionally, it is within the present invention to use conductive epoxy or solder as shown in FIGS. 19–23 to attach conductive leads formed from the flexure material or from an additional add-on component similar in structure to the flexure as shown in FIGS. 24–28 to make the electrical connection to the PZT motor(s).

Figure 11:
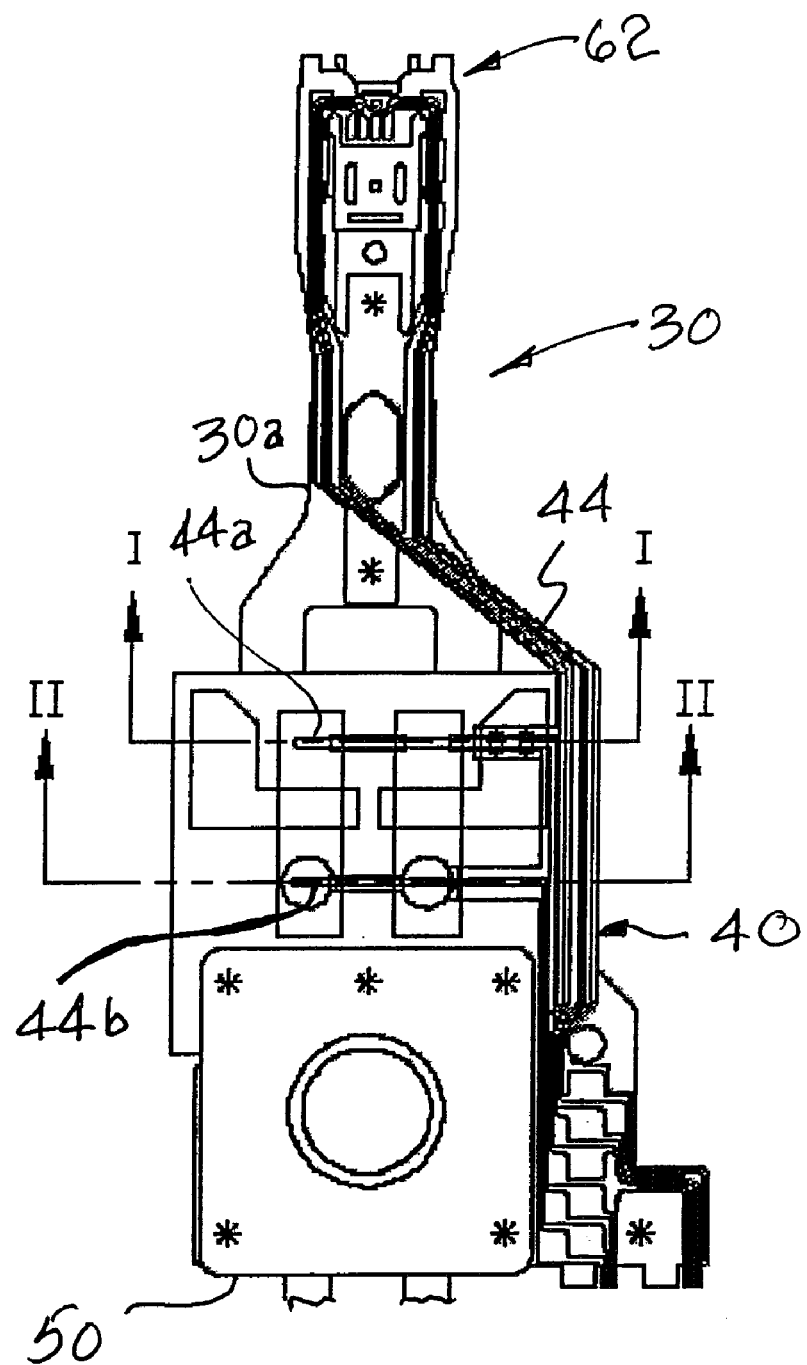
FIG. 11 is a composite view of FIGS. 9 and 10 with hidden lines shown for clarity.
Figure 12:
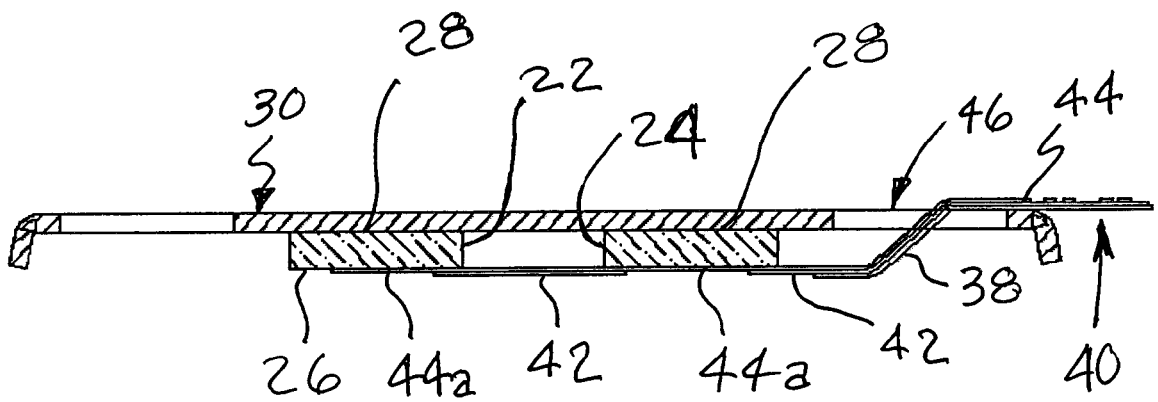
FIG. 12 is a section view along line I—I of FIG. 11.
Figure 13:
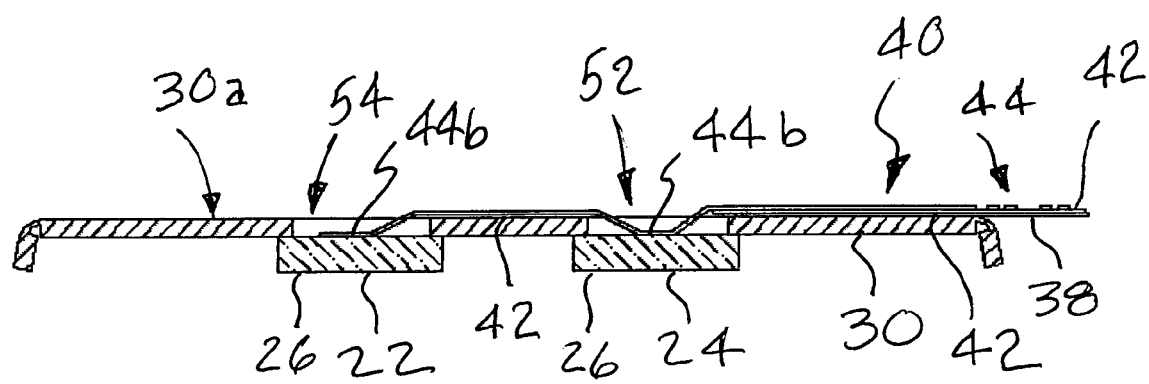
FIG. 13 is a section view along line II—II of FIG. 11.
Figure 14:
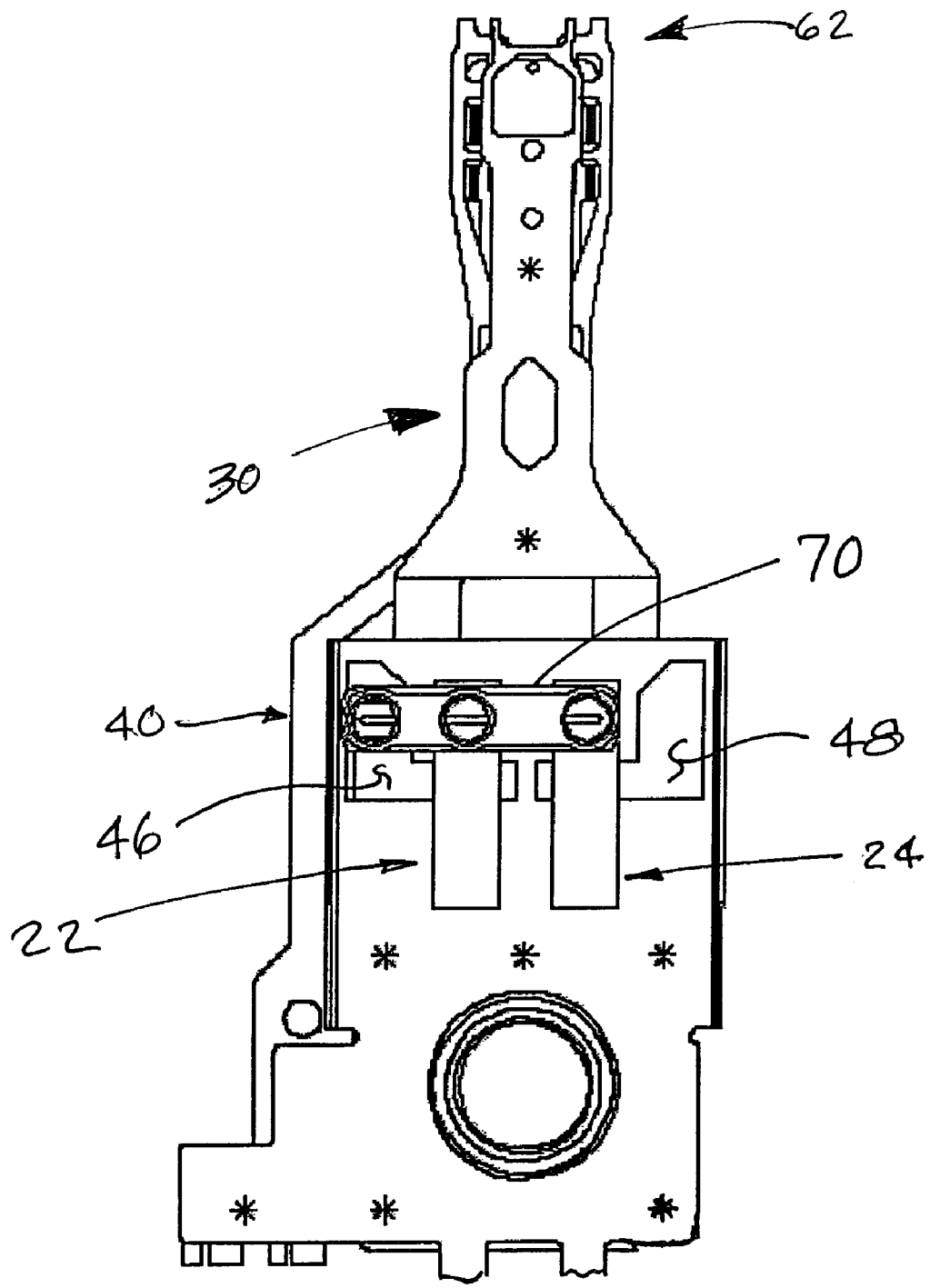
FIG. 14 is a top plan view of a second version of the first alternative embodiment wherein ultrasonic bonding using a pair of extra pieces electrically attach the PZT motors to the conductive leads formed from the flexure material.
Figure 15:
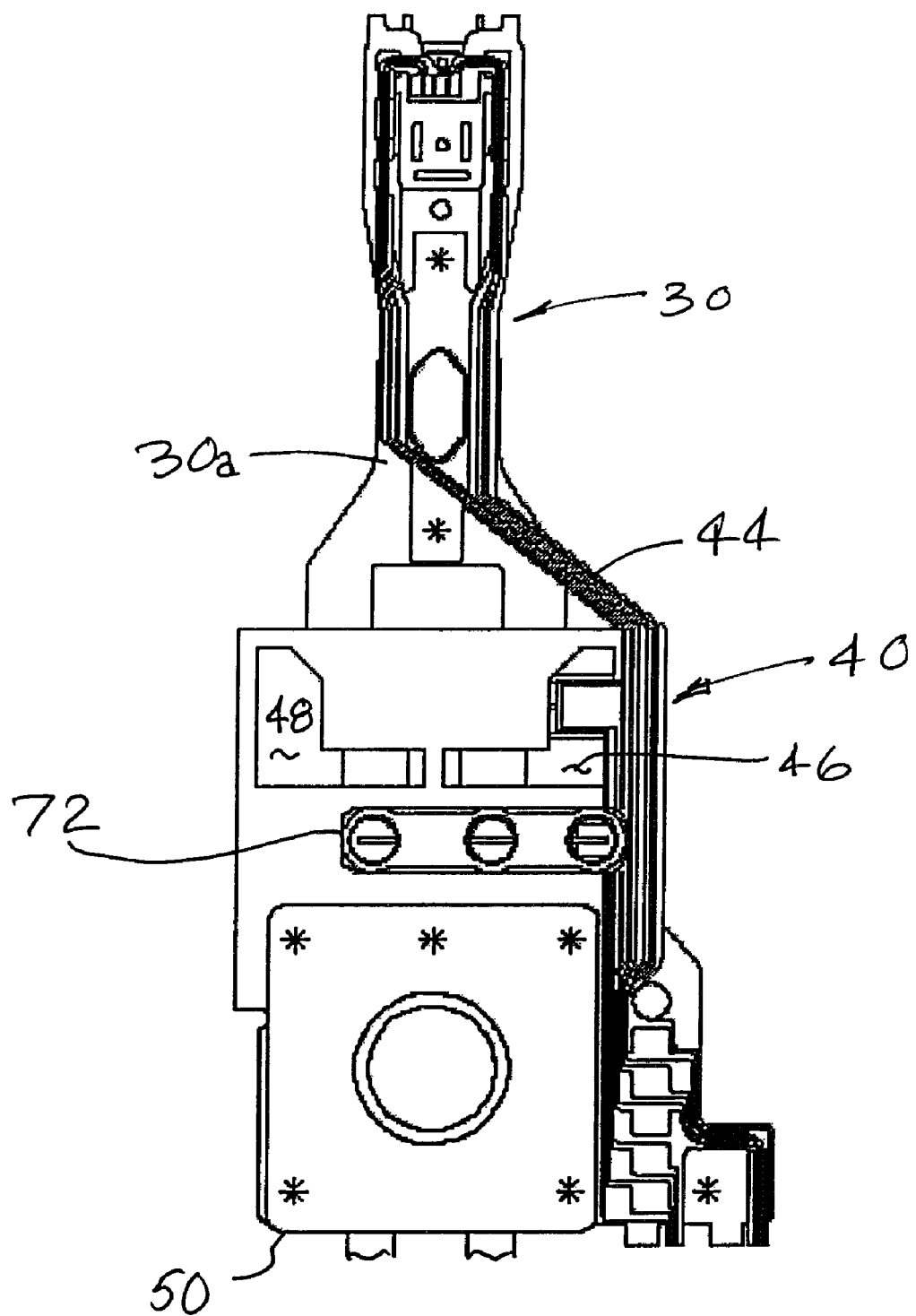
FIG. 15 is a bottom plan view of the version shown in FIG. 14.

Referring now most particularly to FIGS. 9 through 13, the version using ultrasonic bonding between the PZT motors 22, 24 and extensions of the conductive leads 44 formed from the flexure 40 may be seen. It is to be understood that FIG. 11 is a "composite" or wireform view of the details of FIGS. 9 and 10 as if the parts of the assembly 20 were transparent. In this version, leads 44 from the flexure 40 are extended as shown at 44a to overlap the PZT motors 22, 24 on the free side 26 and at 44b to overlap the opposite side 28 of the PZT motors 22, 24. Conventional ultrasonic bonding is used to mechanically and electrically secure the respective overlapping portions 44a and 44b of the leads 44 where they contact the PZTs 22, 24 to form electrical connections between the leads 44 and the PZTs 22, 24 in a manner analogous to the wire stitch version described above. The stainless steel layer 38 supports a portion of the respective lead extensions 44a and 44b, and the dielectric layer 42 insulates lead extension 44b from the substrate 30 or load beam 30a as lead extension passes over the region intermediate the second and third apertures 52 and 54, as shown in FIG. 13. The stainless steel layer 38 supports lead extension 44a (insulated by dielectric layer 42) as it passes through the first aperture 46, as shown in FIG. 12. The lead extension 44a is formed into an offset or "Z-shaped" configuration to position lead extension 44a in the plane of surface 26, as it extends from the main body portion of flexure 40, which in this embodiment, is mounted via stainless steel layer 38 on the opposite side of the load beam 30a.

Figure 16:
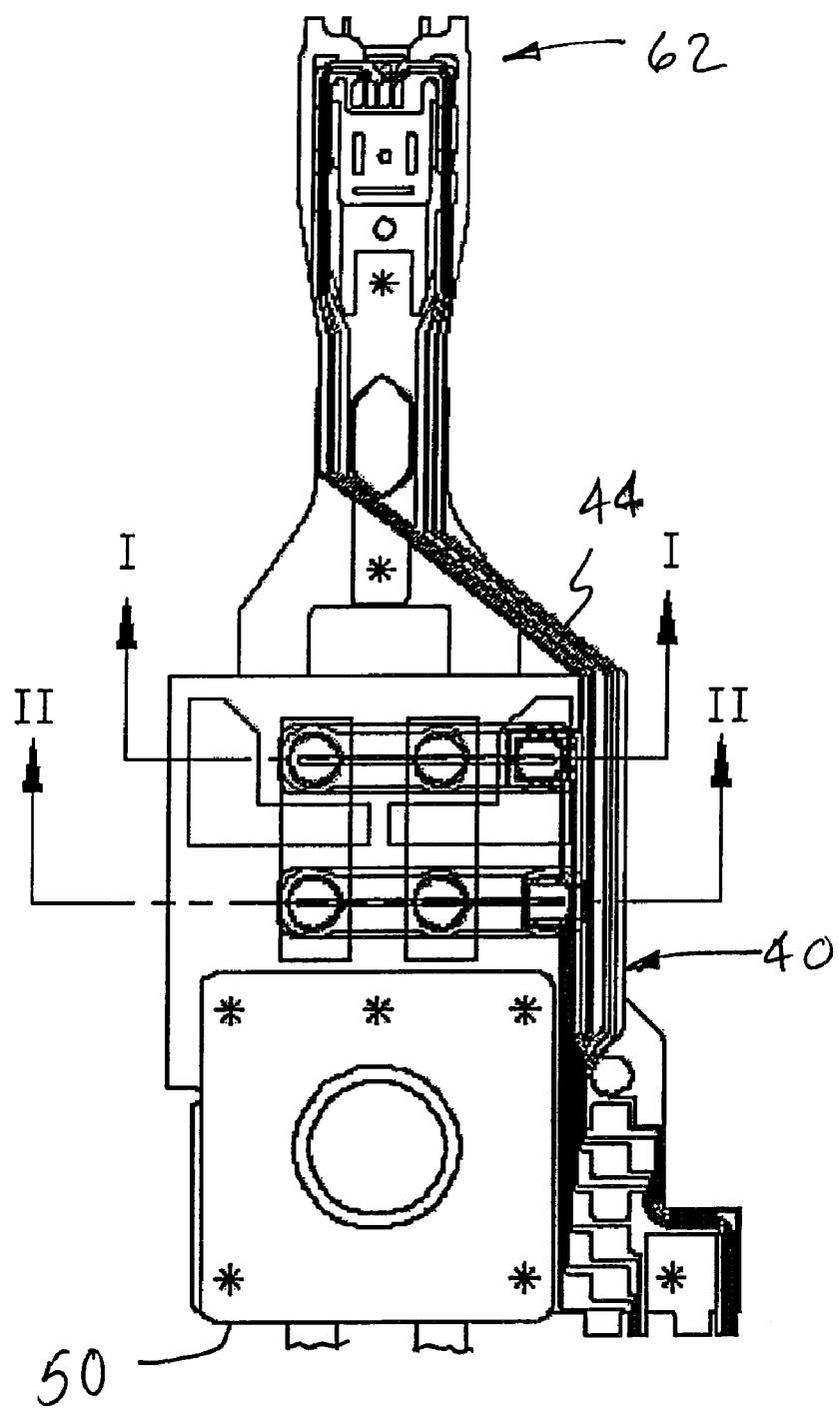
FIG. 16 is a composite view of FIGS. 14 and 15 with hidden lines shown for clarity.
Figure 17:
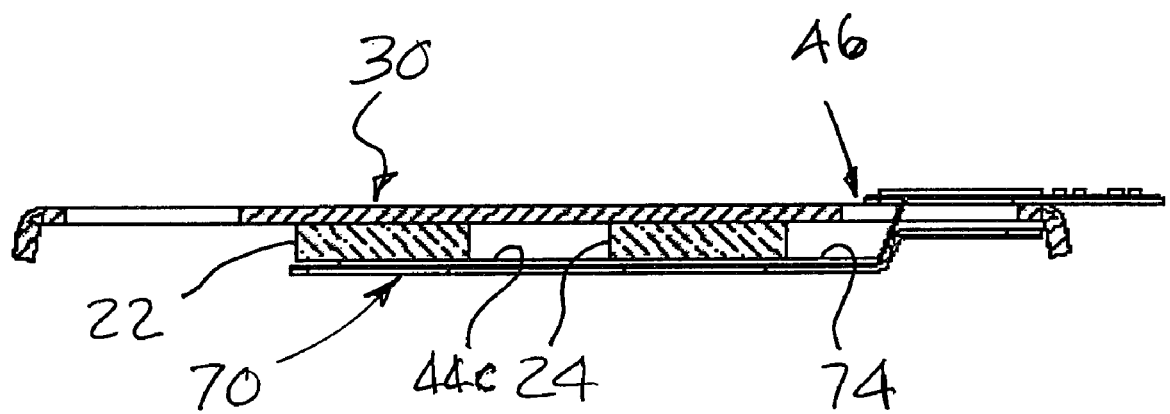
FIG. 17 is a section view along line I—I of FIG. 16.
Figure 18:
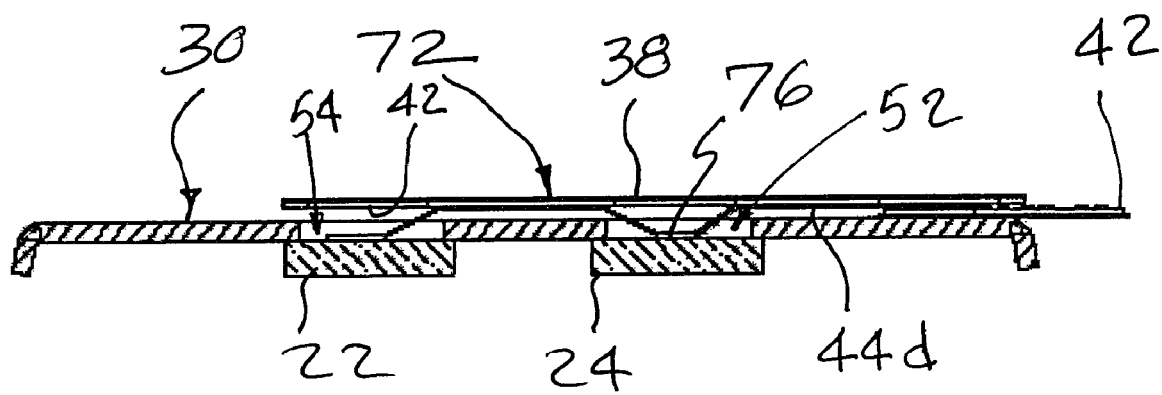
FIG. 18 is a section view along line II—II of FIG. 16.
Figure 19:
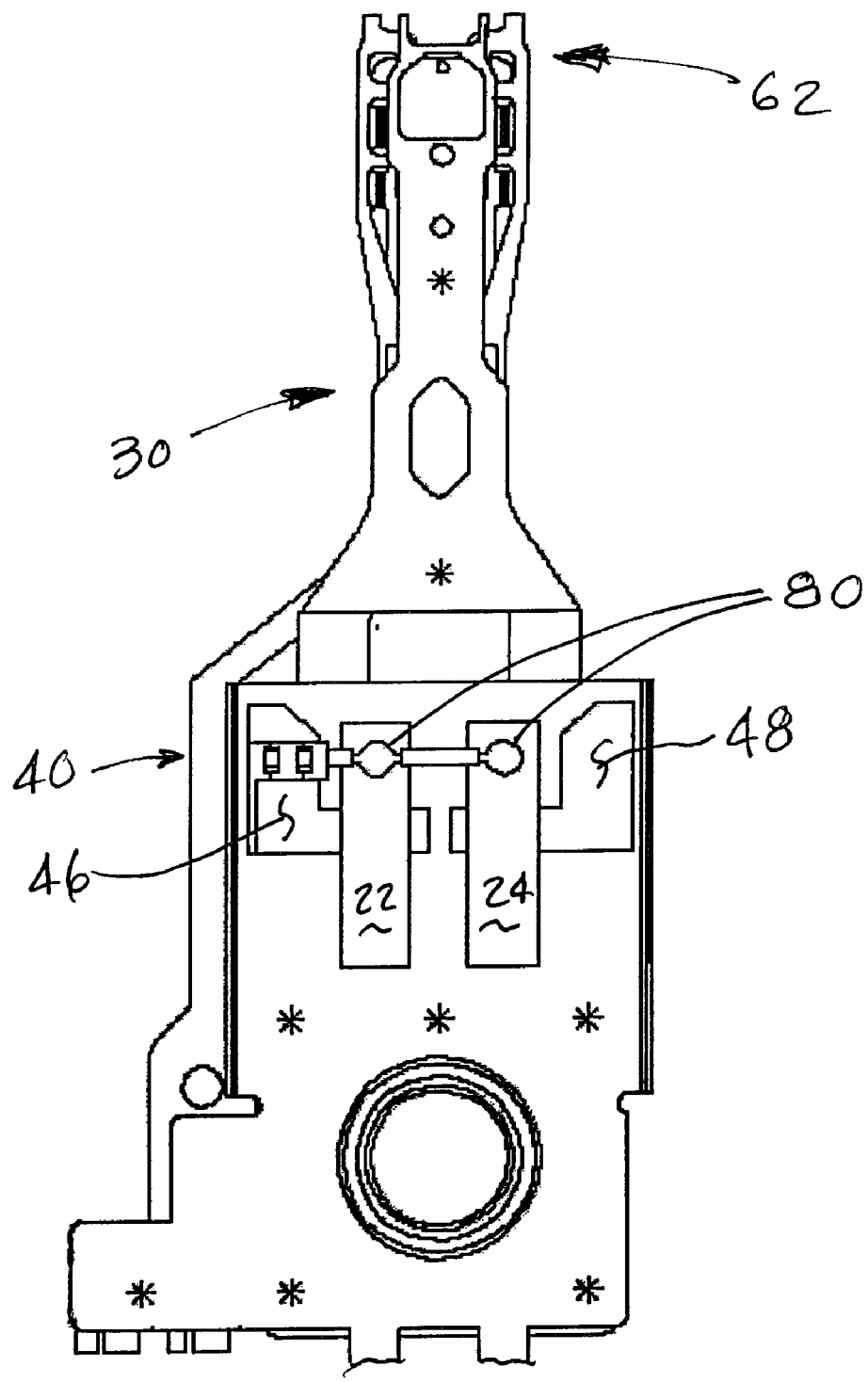
FIG. 19 is a top plan view of a third version of the first alternative embodiment wherein the PZT motors are attached using solder or conductive epoxy to extensions of the conductive leads formed from the flexure material.
Figure 20:
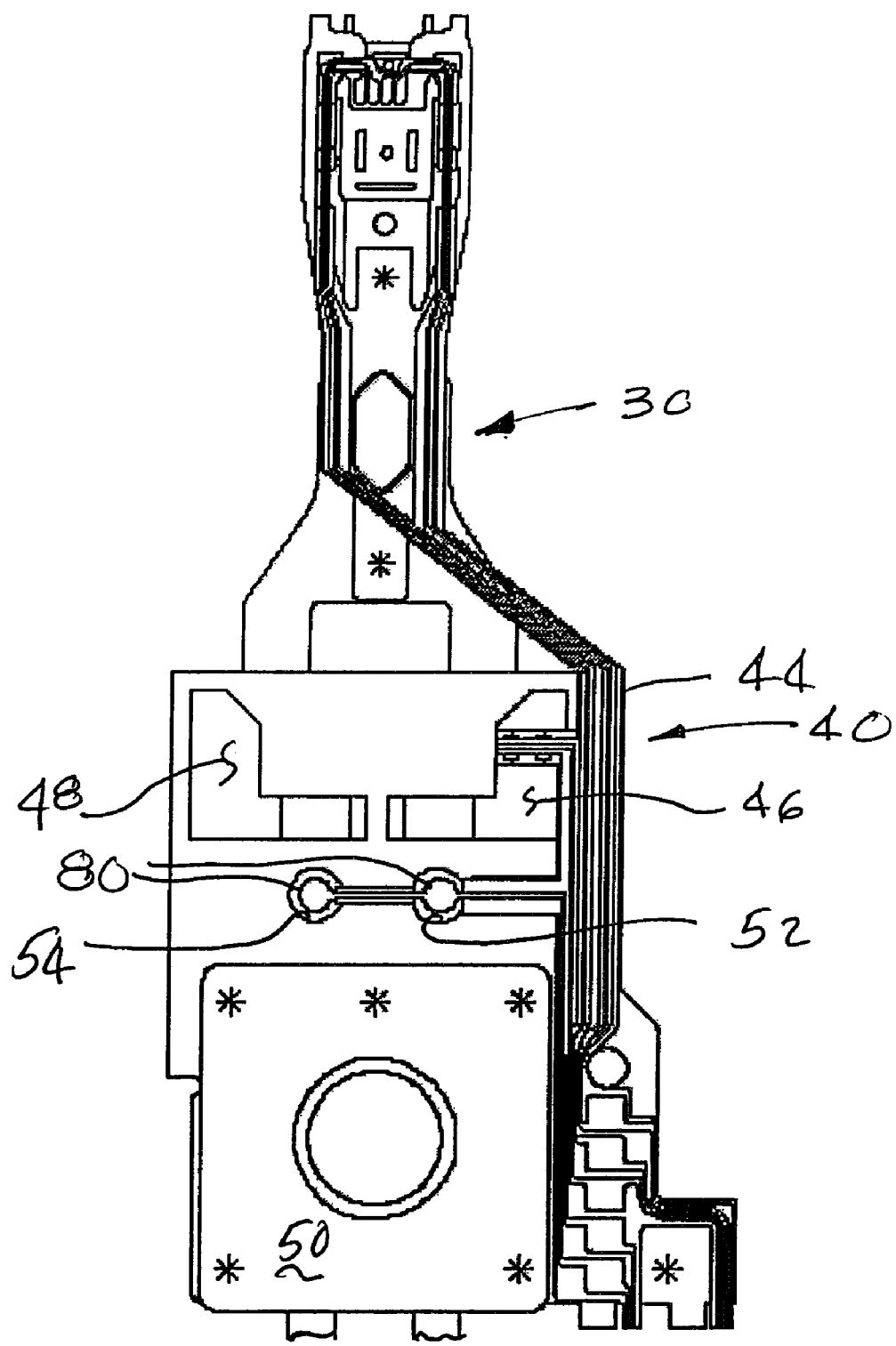
FIG. 20 is a bottom plan view of the version shown in FIG. 19.
Figure 21:
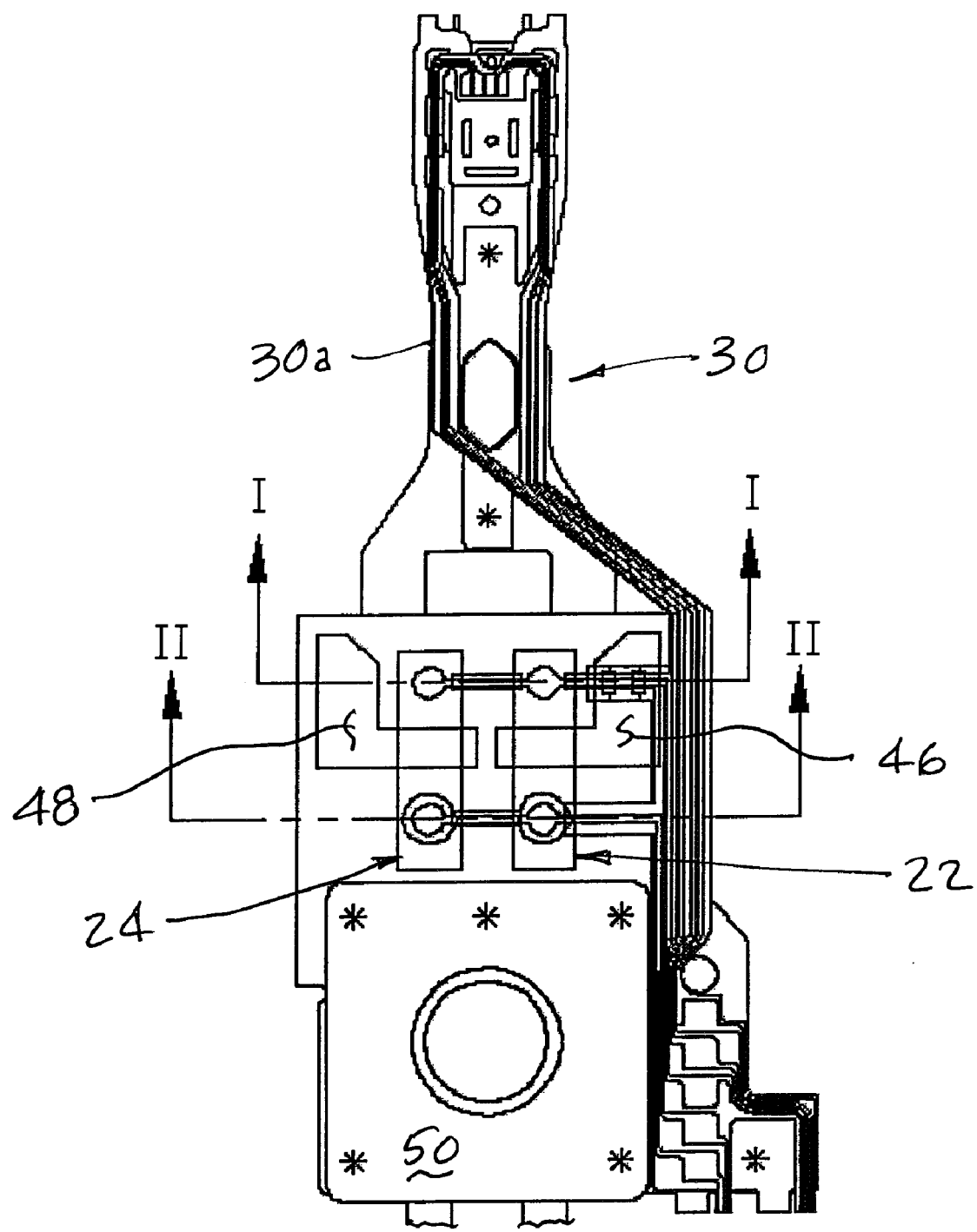
FIG. 21 is a composite view of FIGS. 19 and 20 with hidden lines shown for clarity.
Figure 22:
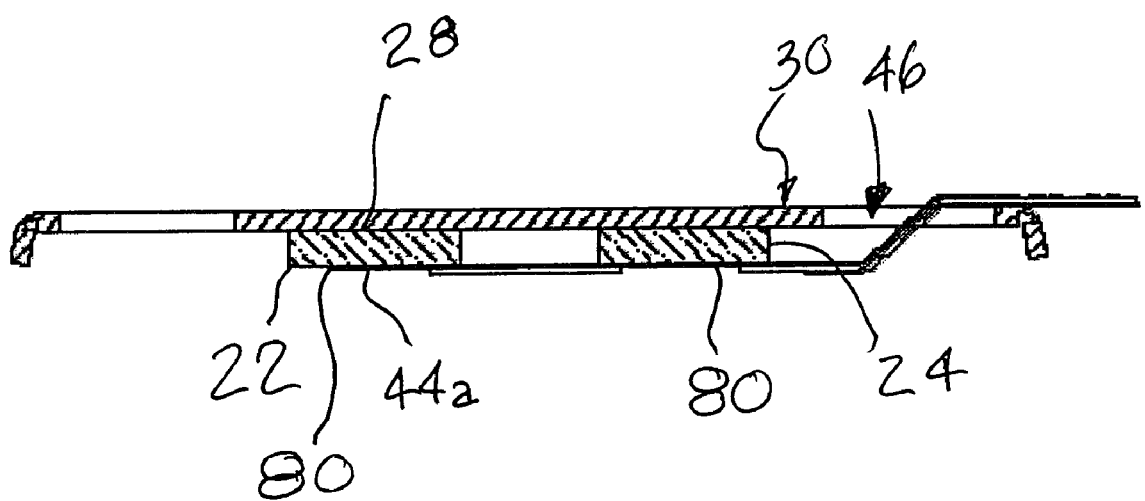
FIG. 22 is a section view along line I—I of FIG. 21.
Figure 23:
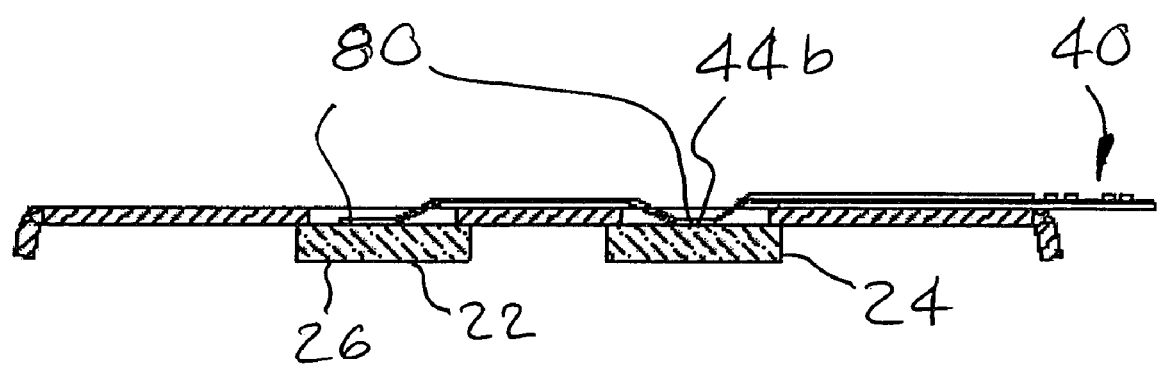
FIG. 23 is a section view along line II—II of FIG. 21.
Figure 24:
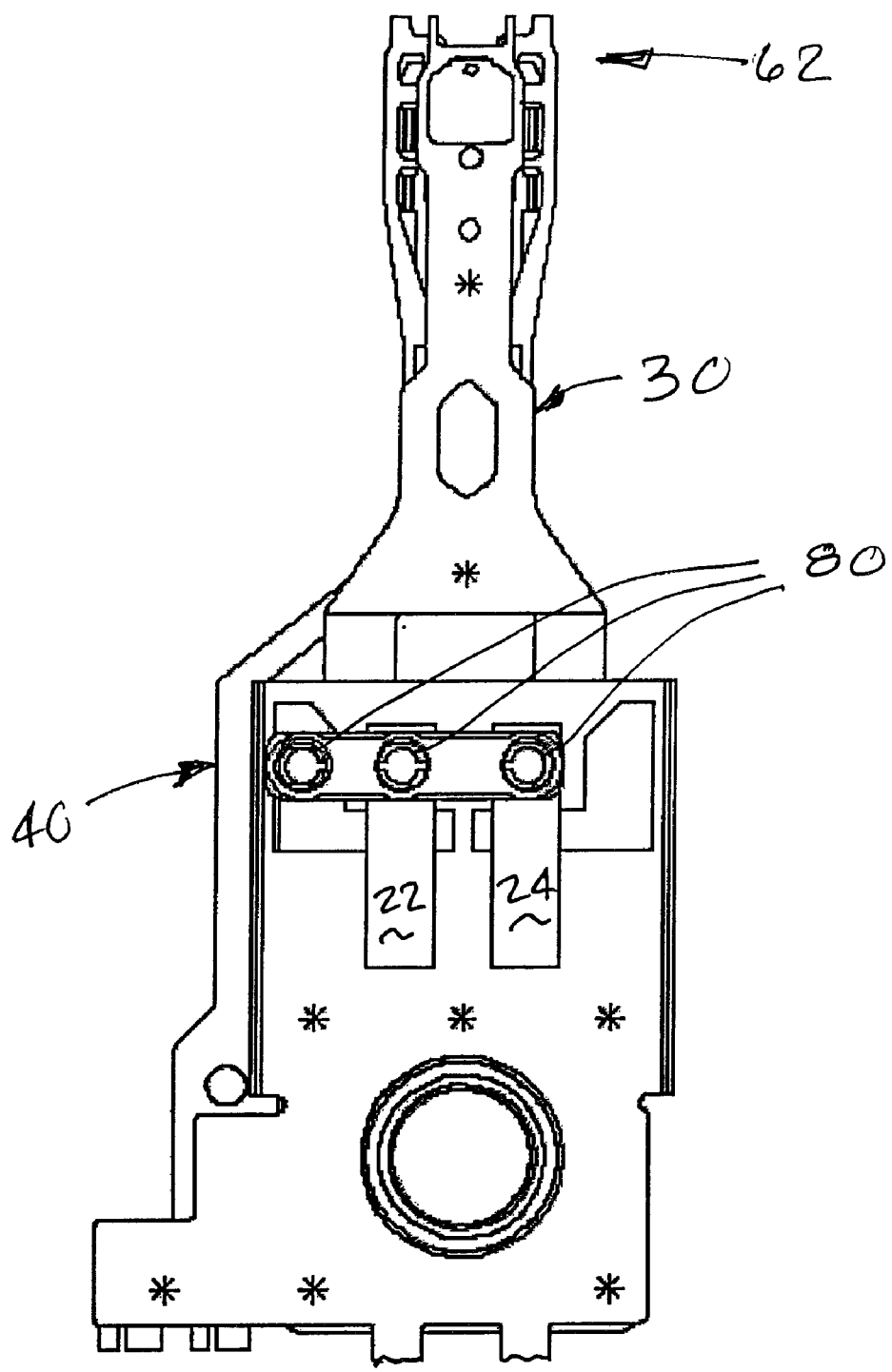
FIG. 24 is a top plan view of a fourth version of a first alternative embodiment wherein solder or conductive epoxy connections using a pair of extra pieces electrically attach the PZT motors to the conductive leads formed from the flexure material.
Figure 25:
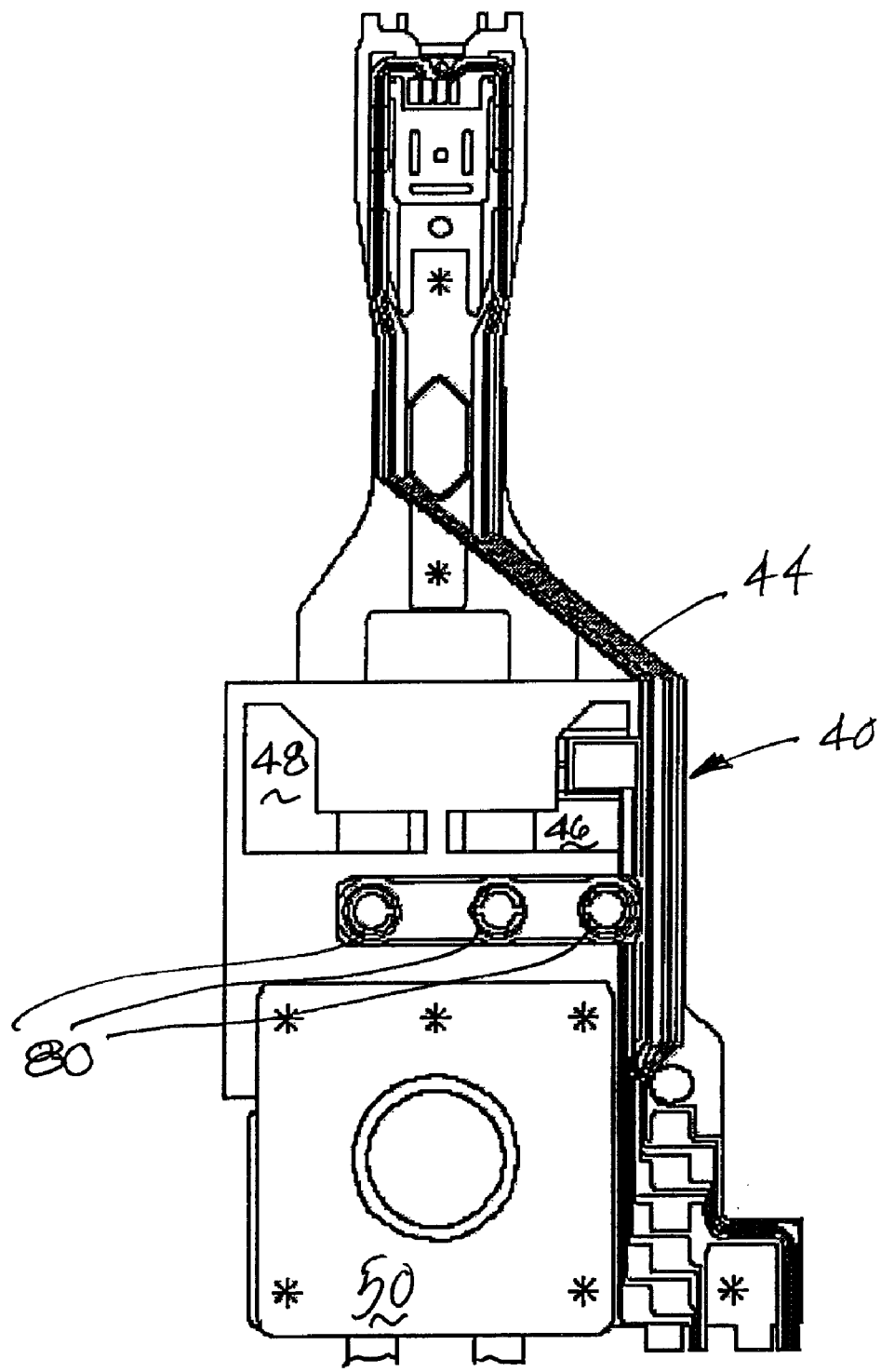
FIG. 25 is a bottom plan view of the version shown in FIG. 24.
Figure 26:
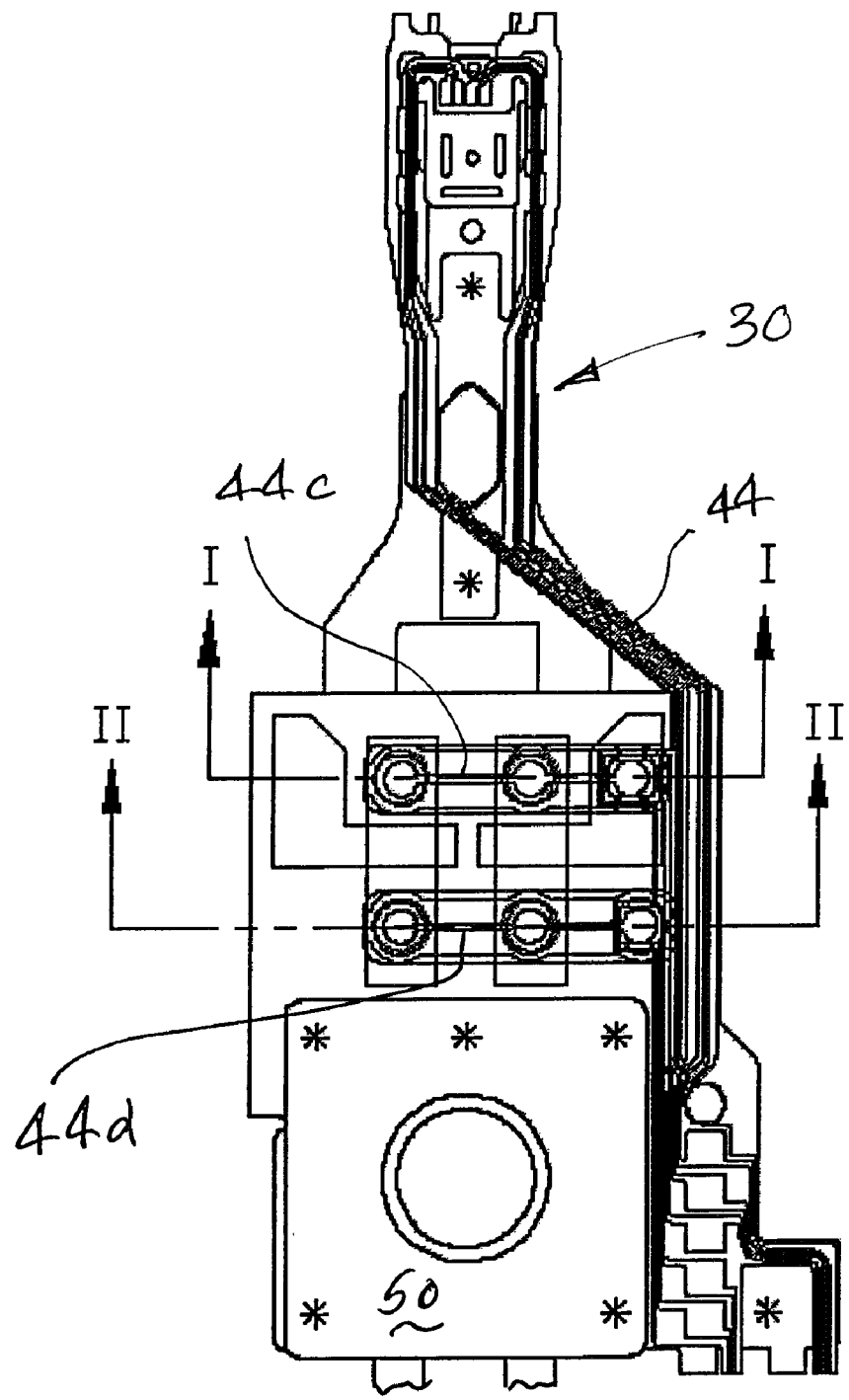
FIG. 26 is a composite view of FIGS. 24 and 25 with hidden lines shown for clarity.
Figure 27:
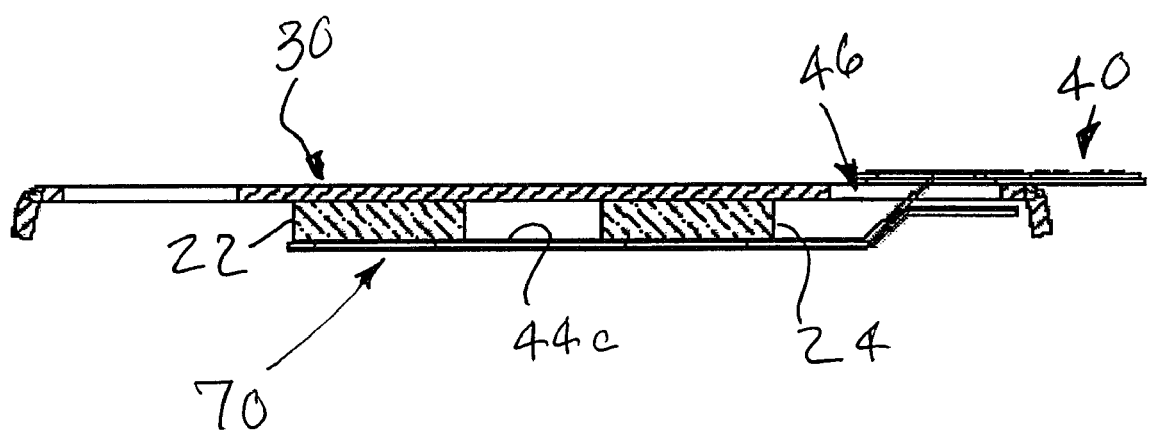
FIG. 27 is a section view along line I—I of FIG. 26.
Figure 28:
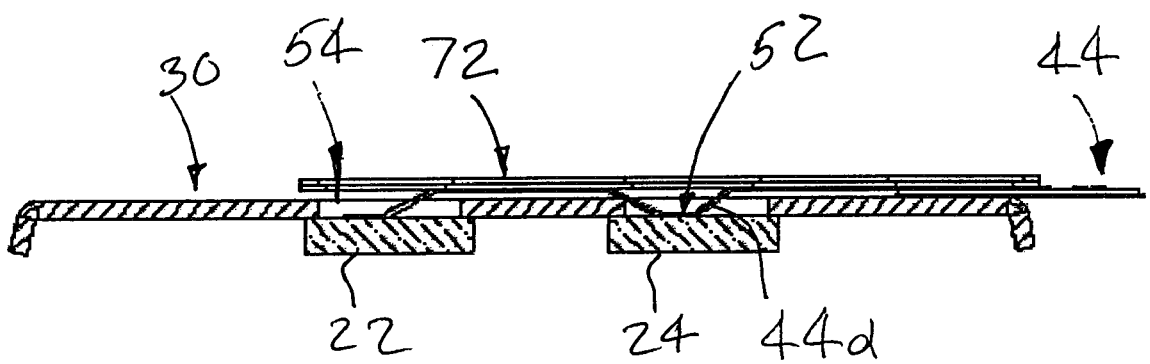
FIG. 28 is a section view along line II—II of FIG. 26.

Referring now to FIGS. 14 through 18, a further version of the present invention may be seen. In this version, ultrasonic bonding is used with a pair of intermediate pieces formed from a three layer laminate similar to the flexure 40. Again it is to be understood that FIG. 16 is a wireform view or composite of FIGS. 14 and 15. In this version, a pair of separate pieces 70, 72 connect the leads 44 with the PZT motors 22, 24. A conductor 74 in piece 70 connects to the free side 26 of the PZTs 22, 24. Similarly, a conductor 76 in piece 72 connects to the other side 28 of PZTs 22, 24. Conductors 74 and 76, formed, respectively as conductive traces 44c and 44d in the laminated pieces 70, 72 are connected, respectively, to individual leads from among the group of leads 44 in flexure 40 for powering the PZTs. An electrical connection is made through first aperture 46 to connect leads 44 to piece 70, and the conductor 76 extends through the second and third apertures 52 and 54 to provide electrical connection to side 28 of the PZTs. Ultrasonic bonding is used to form the connections mentioned with respect to this version.

Referring now to FIGS. 19 through 23, a version similar to that of FIGS. 9 through 13 may be seen. In this version, solder or conductive epoxy connections 80 replace the ultrasonic bonding of conductors 44 of lead extensions 44a and 44b to the PZTs 22, 24.

Referring now to FIGS. 24 through 28, a version similar to that of FIGS. 14 through 18 may be seen. In this version, solder connections 80 are used with separate pieces 70, 72 to electrically and mechanically bond conductors 44c and 44d to the PZTs 22, 24. The separate pieces 70 and 72 may be formed of a laminate of a trace layer, an insulating layer, and a support layer, similar or identical to the laminate of the flexure 40 described above.

Figures 29, 30:
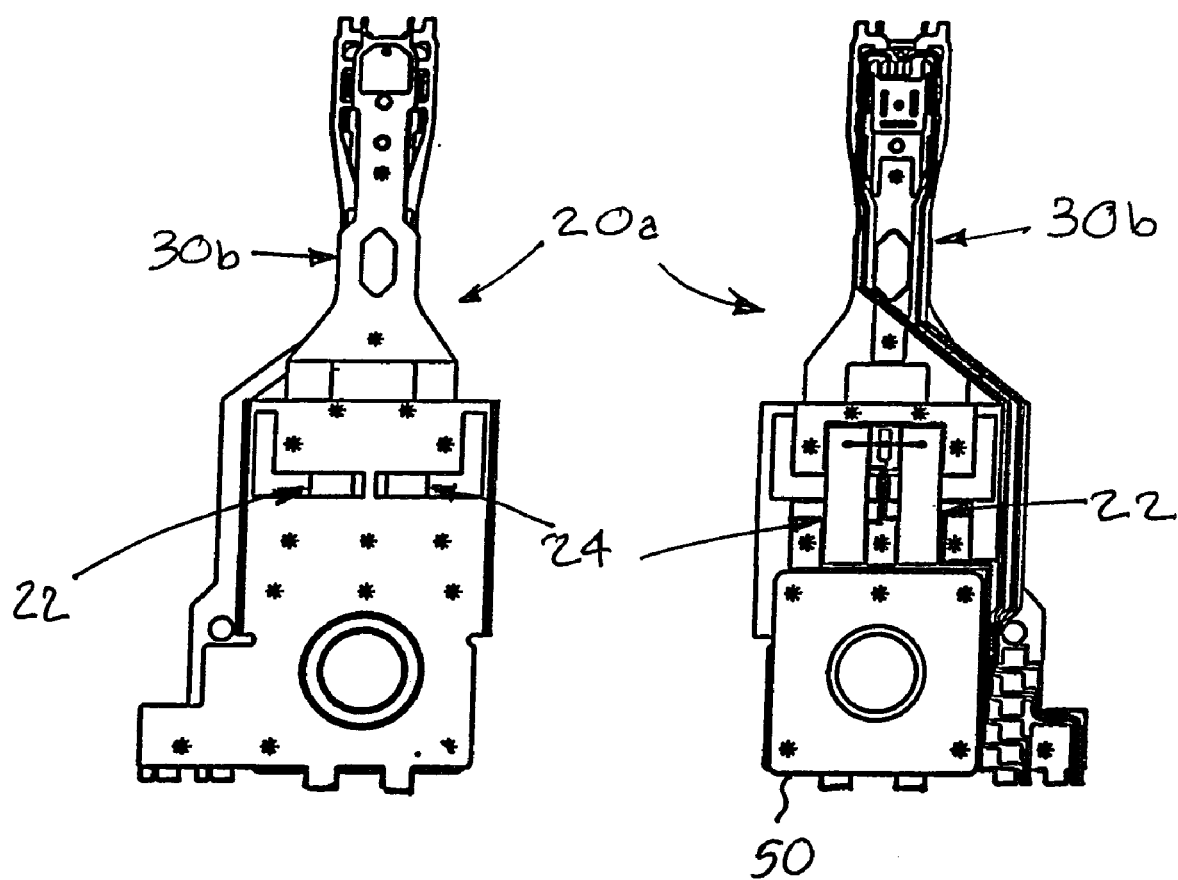
FIG. 29 shows a bottom plan view of another embodiment.
FIG. 30 shows a top plan view of the embodiment of FIG. 29.
Figure 31:
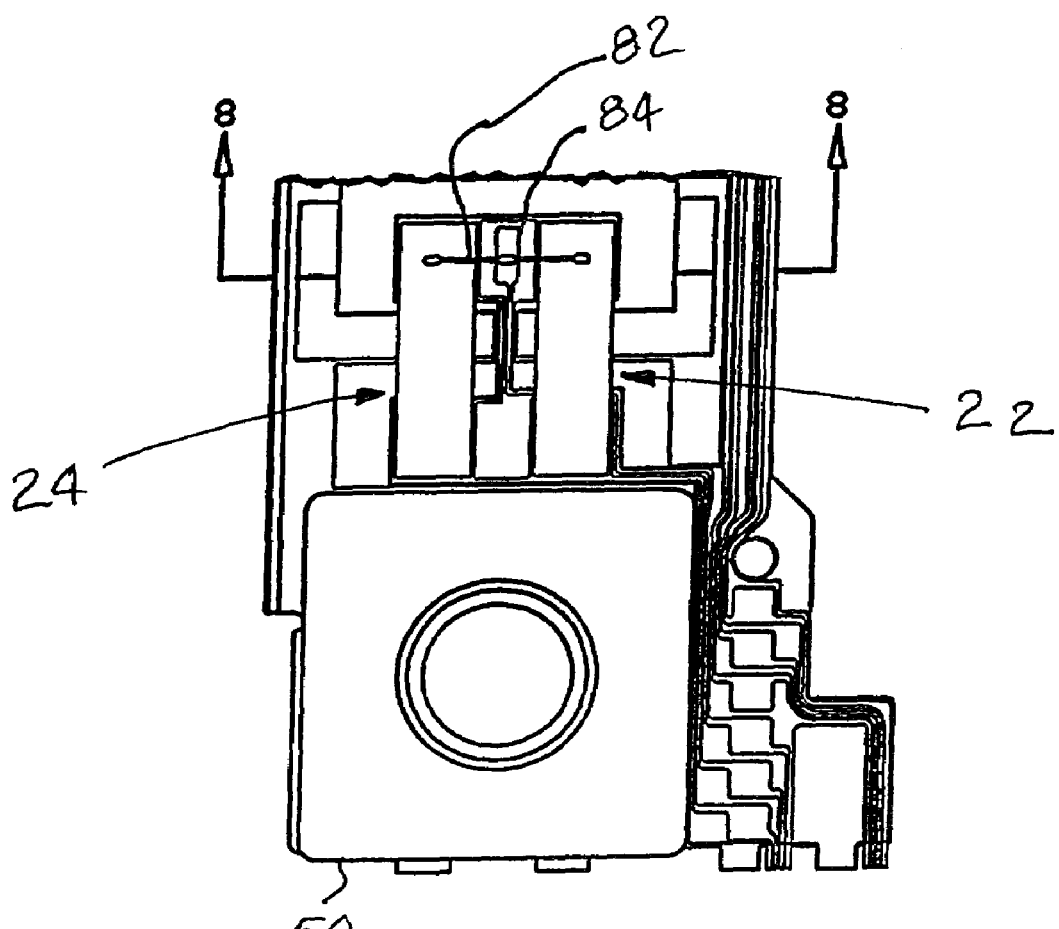
FIG. 31 is an enlarged fragmentary view of a portion of FIG. 30 showing details of the mounting arrangement for the PZT motors in this embodiment.
Figure 32:
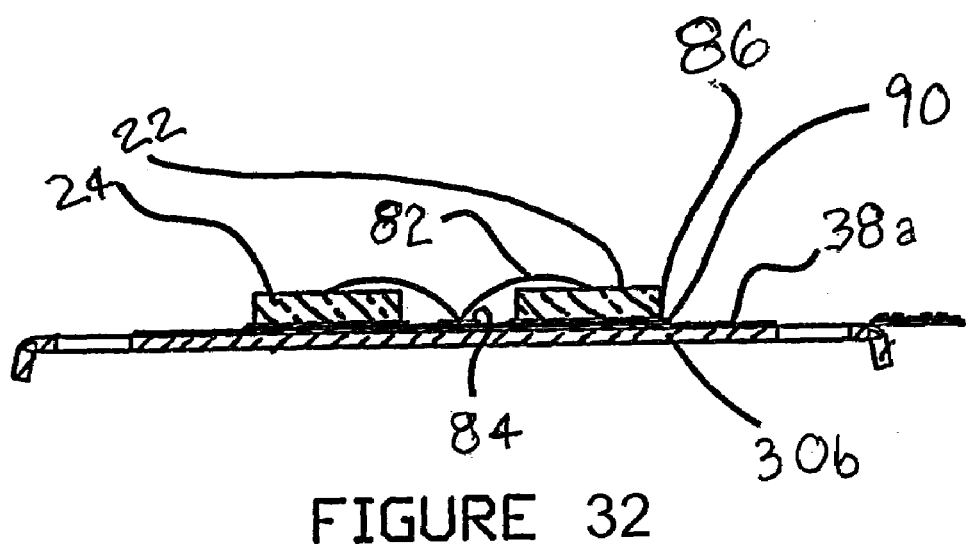
FIG. 32 is a section view taken along line 8—8 of FIG. 31.
Figure 33:
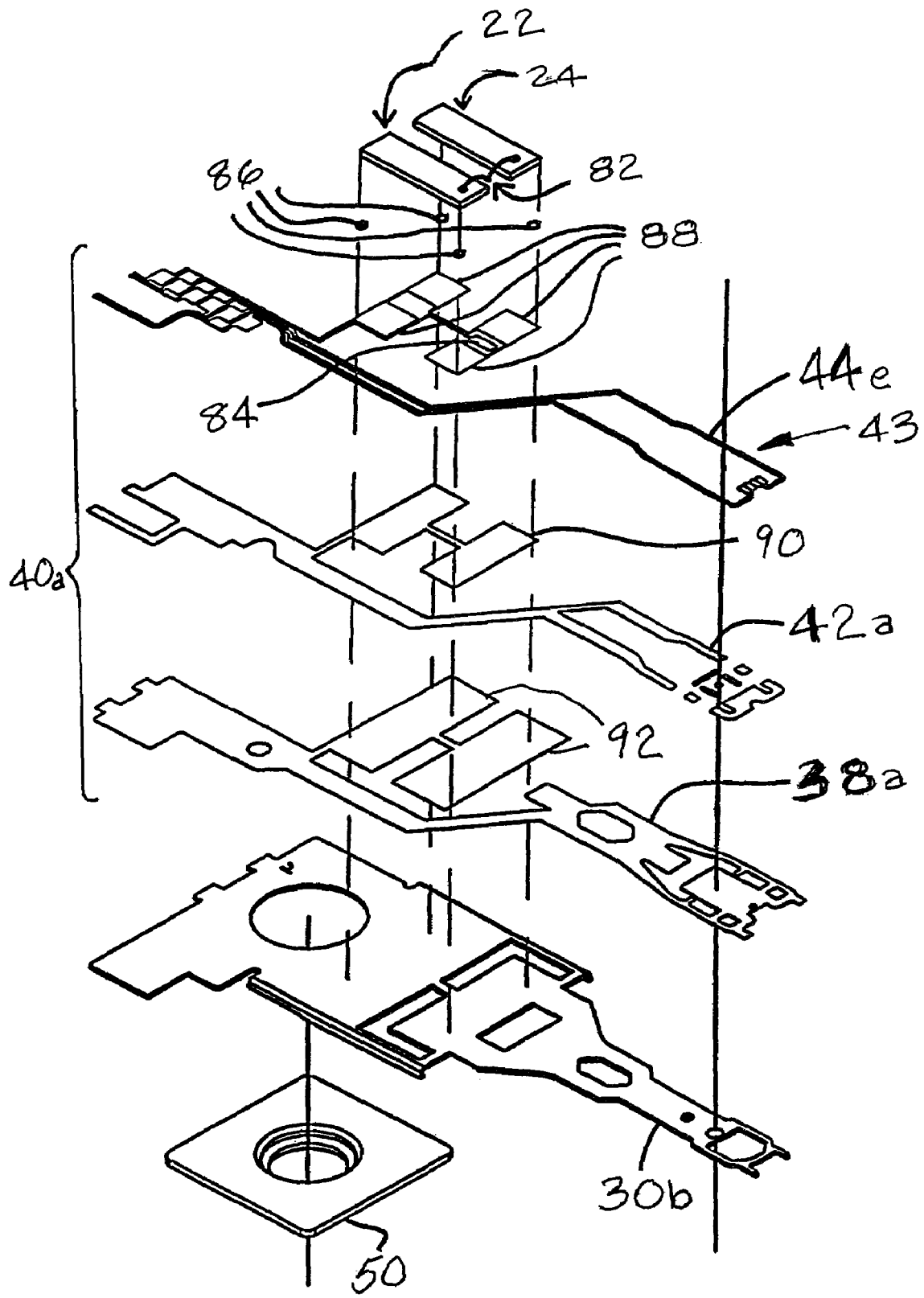
FIG. 33 is an exploded view of the suspension assembly of this embodiment.
Figure 34:
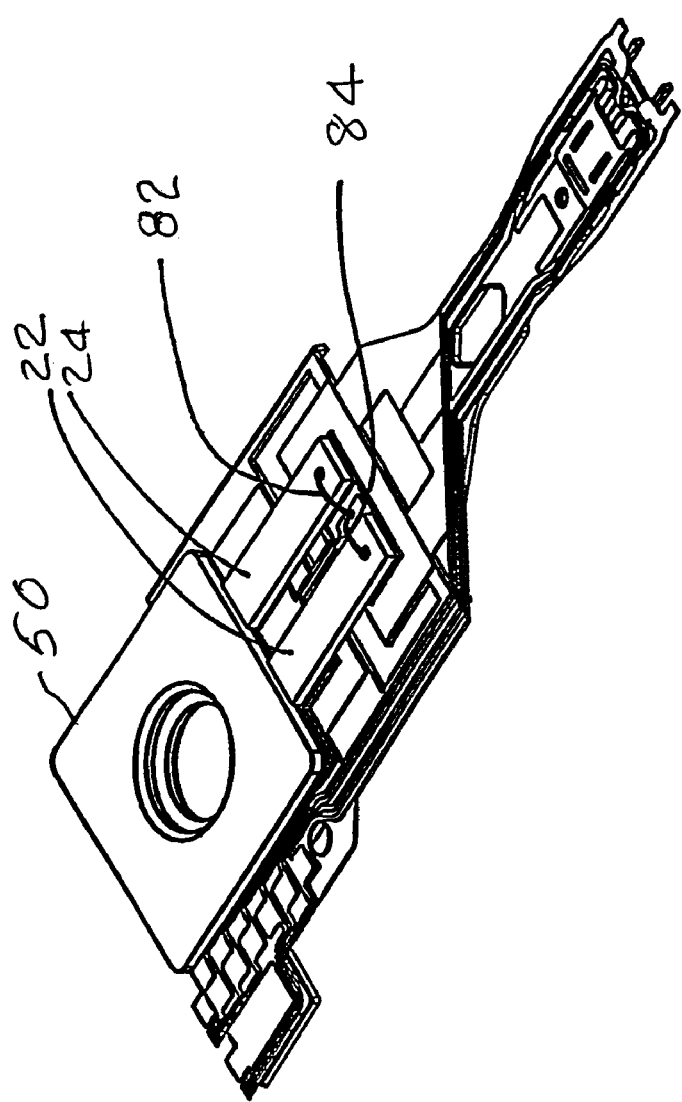
FIG. 34 is a perspective view of the suspension assembly of this embodiment.
Figure 35:
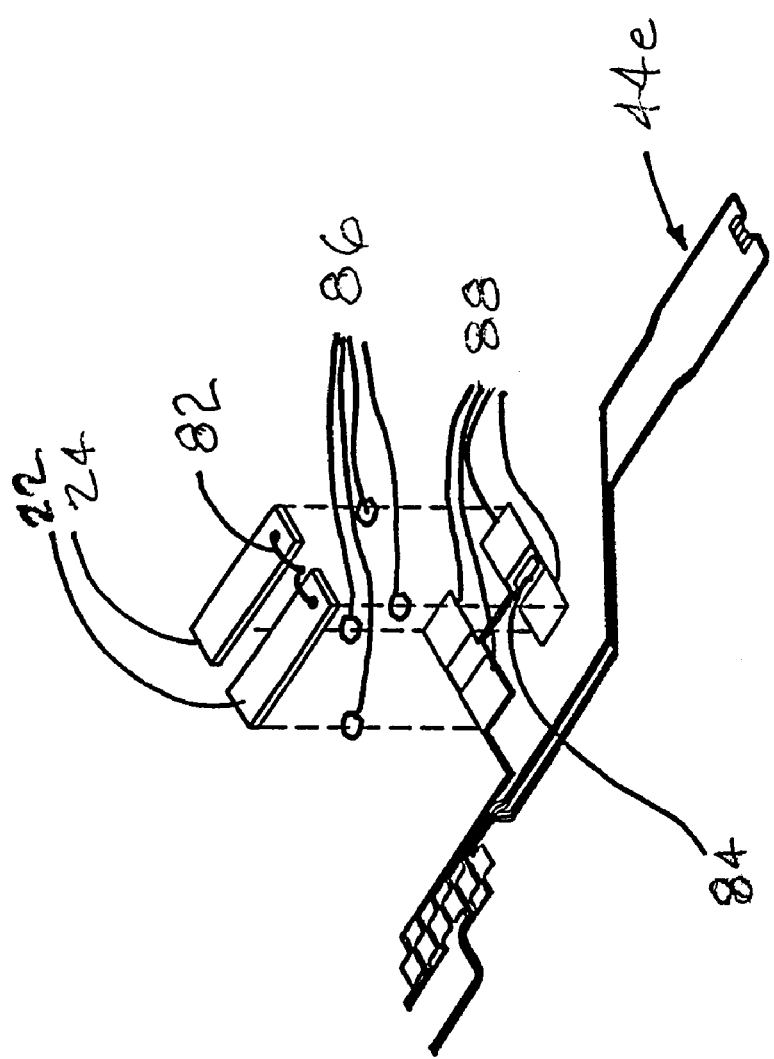
FIG. 35 is an exploded perspective view of the PZT motors, wire, and conductive trace layer showing details of the conductive pads for electrically powering the PZT motors.

There are also other embodiments of the innovation which allow differential actuation as follows. Referring now most particularly to FIGS. 29–36, a second wire stitch type embodiment of the present invention may be seen. In this embodiment, the PZT motors 22, 24 are mounted on the disk side of the suspension 20a. FIGS. 29 and 30 show bottom and top plan views of this embodiment, and FIG. 31 is an enlarged fragmentary view of a portion of FIG. 30 showing details of the mounting arrangement and a wire or wire bond 82 and wire bond pad 84 for the PZT motors 22, 24 in this embodiment. FIG. 32 is a section view taken along line 8—8 of FIG. 31. FIG. 33 is an exploded view of the suspension assembly of this embodiment. FIG. 34 is a perspective view of the suspension assembly 20a of this embodiment. FIG. 35 is an exploded perspective view of the PZT motors, wire bond pad 84 for the top wire stitch connection 82, and conductive trace layer 44e showing details of the conductive epoxy pads 86 and trace pads 88 for mechanically bonding and electrically connecting to the PZT motors 22, 24.

Figure 36:
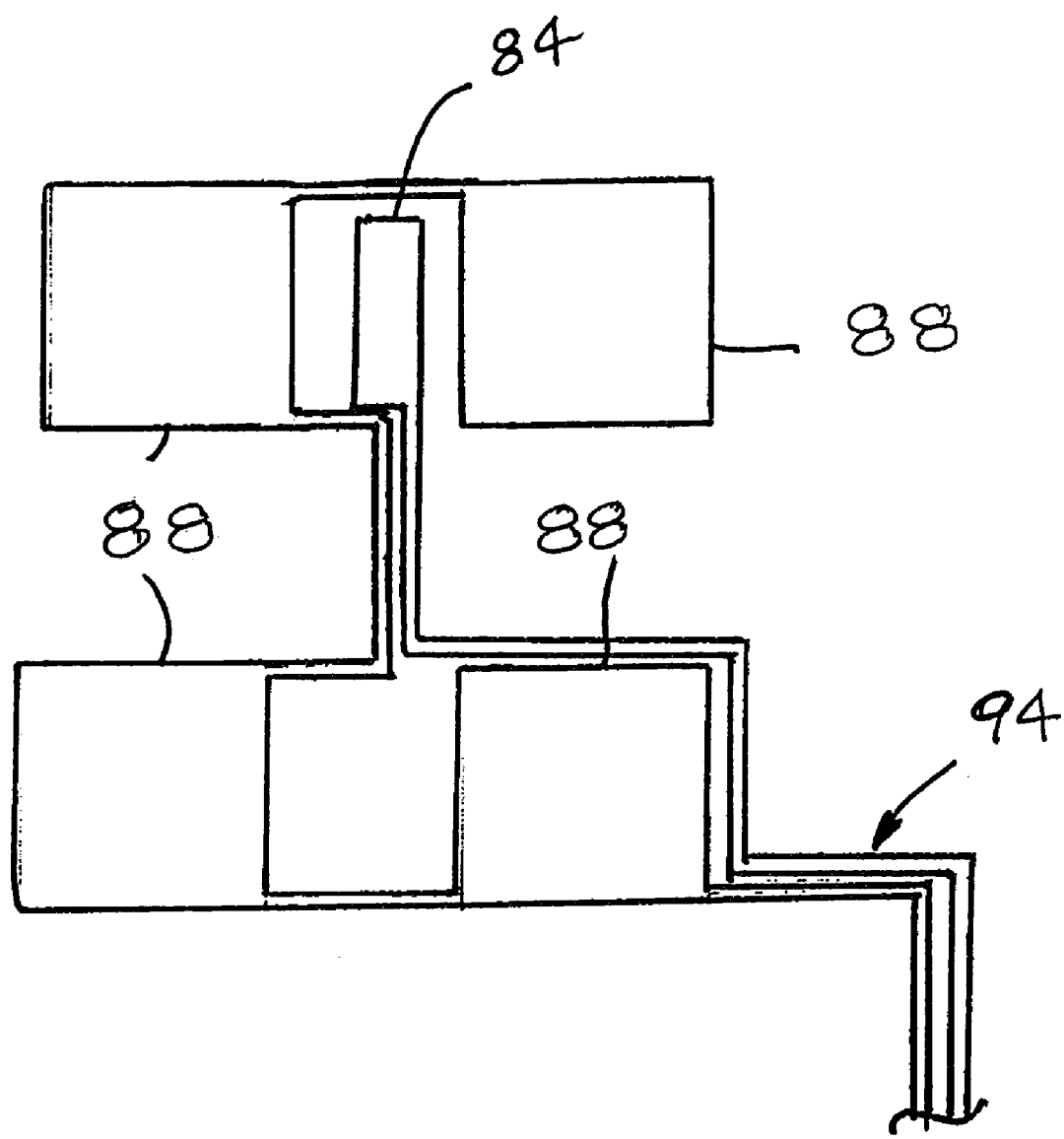
FIG. 36 is an enlarged plan view of a portion of the conductive trace layer of FIG. 35 showing a layout for a wire bond pad used to connect to a first surface of the PZT motors and a plurality of trace pads used to connect to a second surface of the PZT motors.
Figure 37:
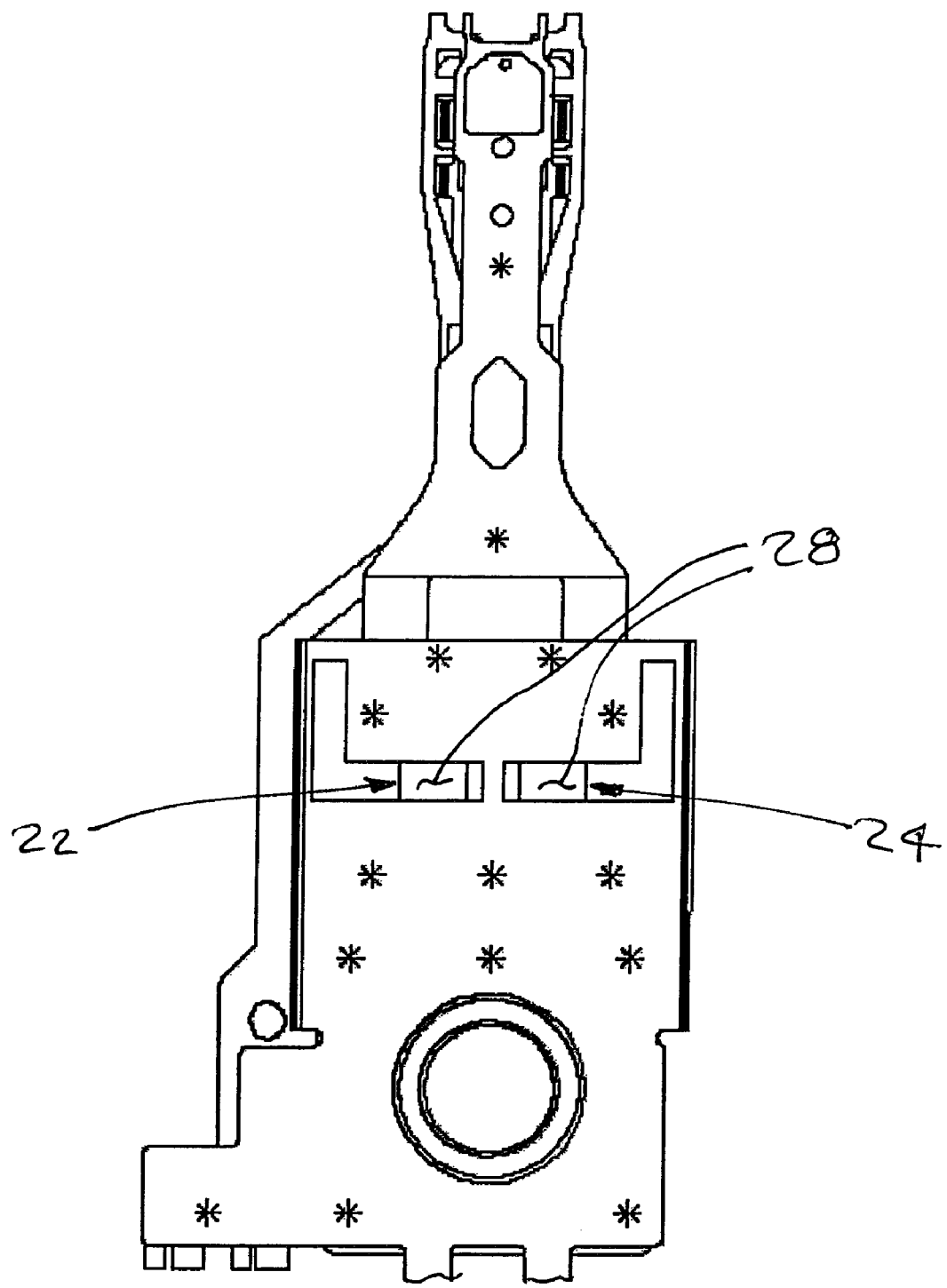
FIG. 37 is a top plan view of a first version of a second alternative embodiment wherein the PZT motors are ultrasonically bonded to extensions of the conductive leads formed from the flexure material.
Figure 38:
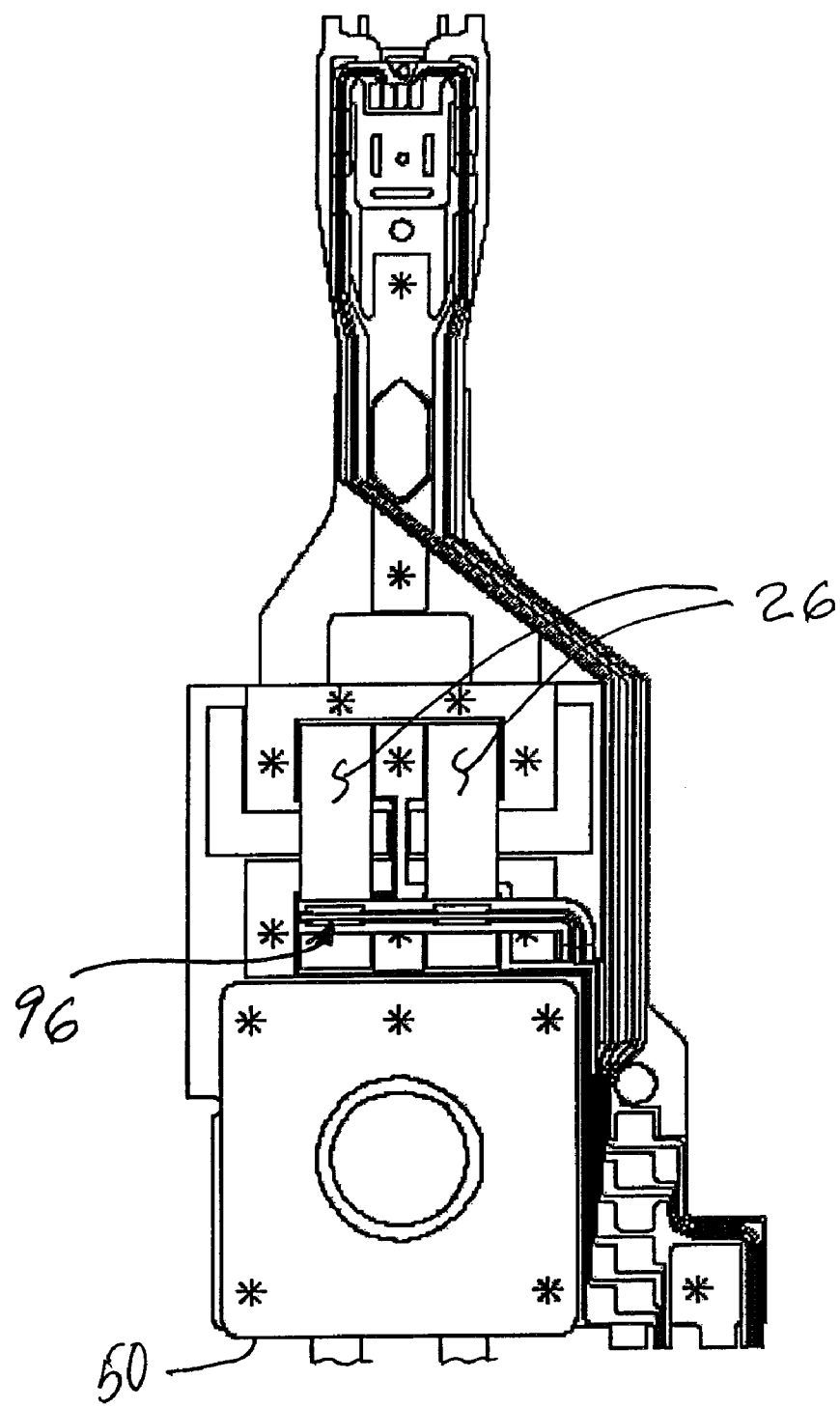
FIG. 38 is a bottom plan view of the version shown in FIG. 37.
Figure 39:
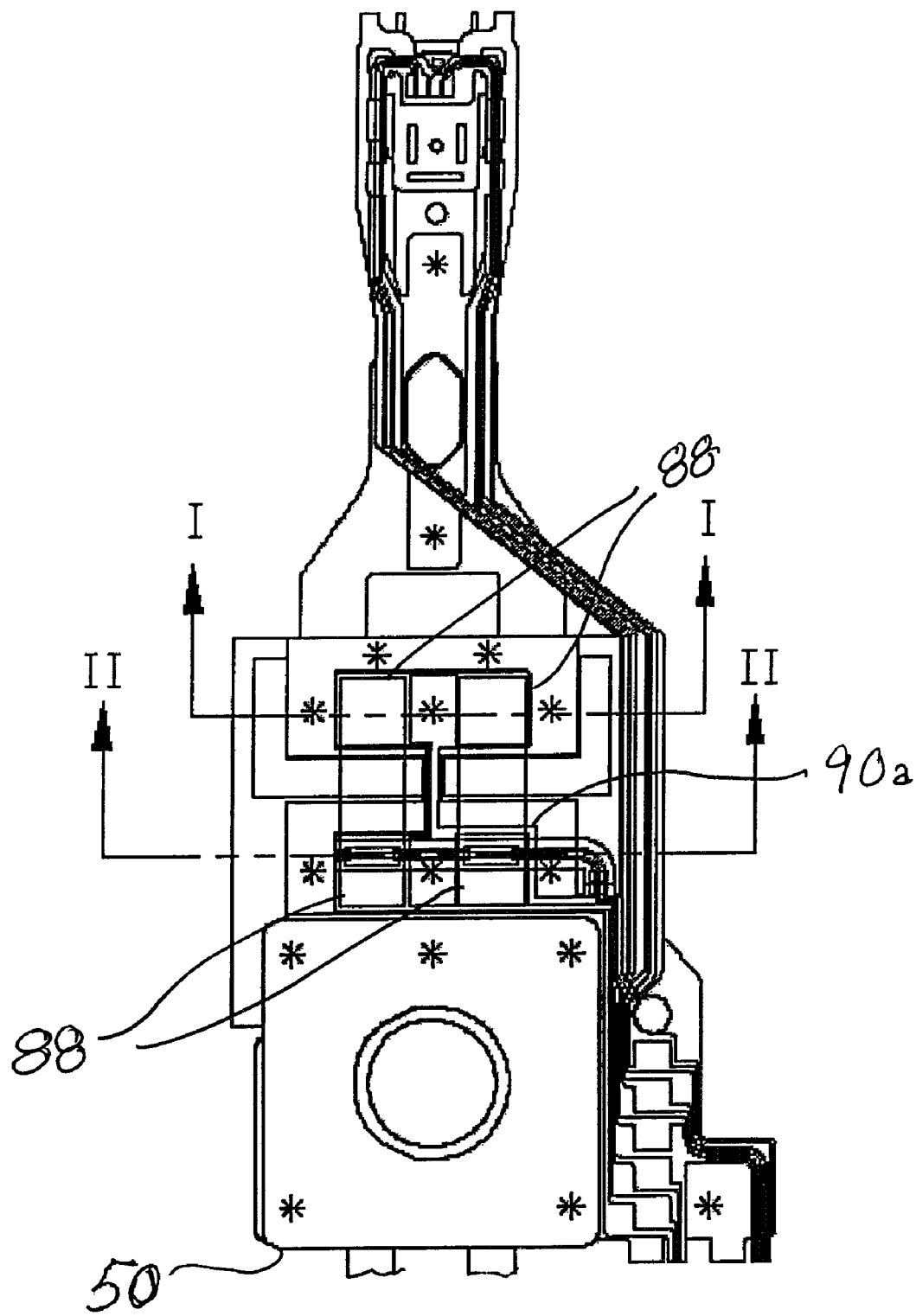
FIG. 39 is a composite view of FIGS. 37 and 38 with hidden lines shown for clarity.
Figure 40:
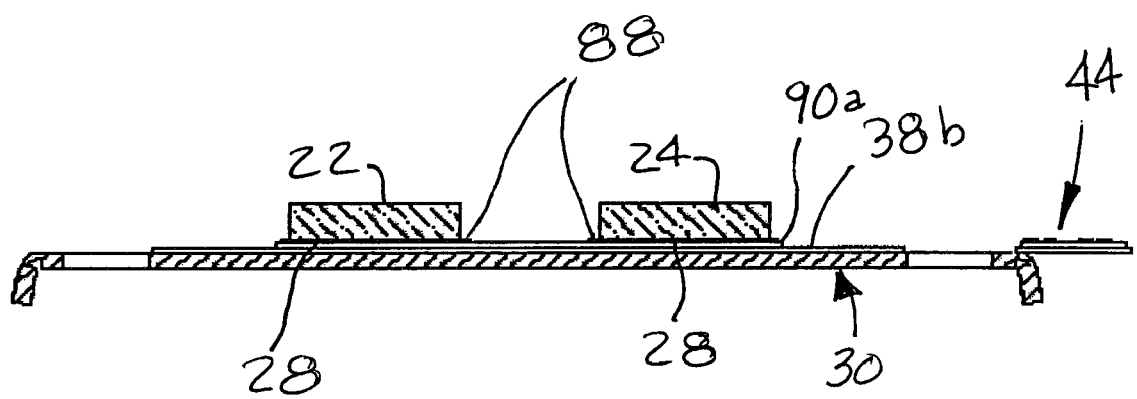
FIG. 40 is a section view along line I—I of FIG. 39.
Figure 41:
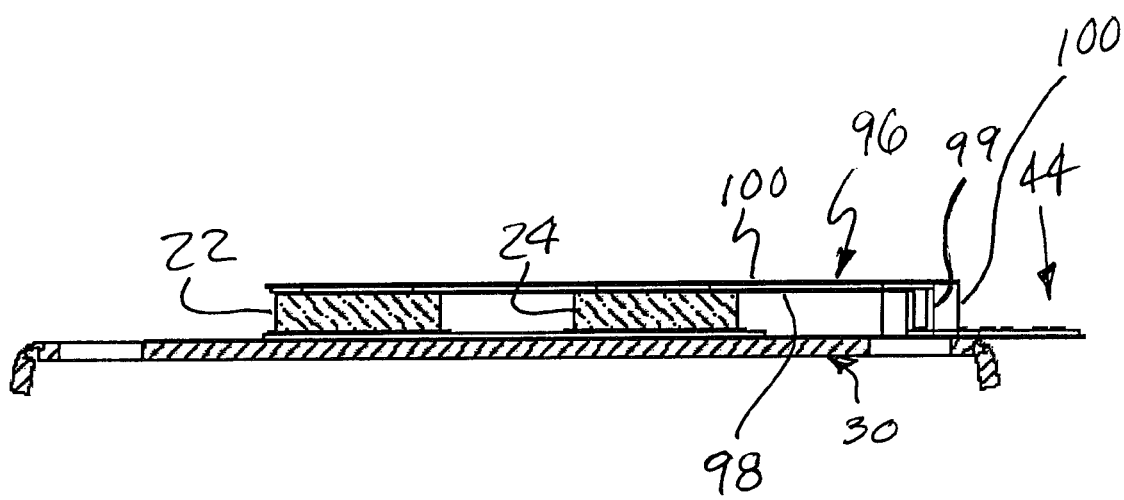
FIG. 41 is a section view along line II—II of FIG. 39.
Figure 42:
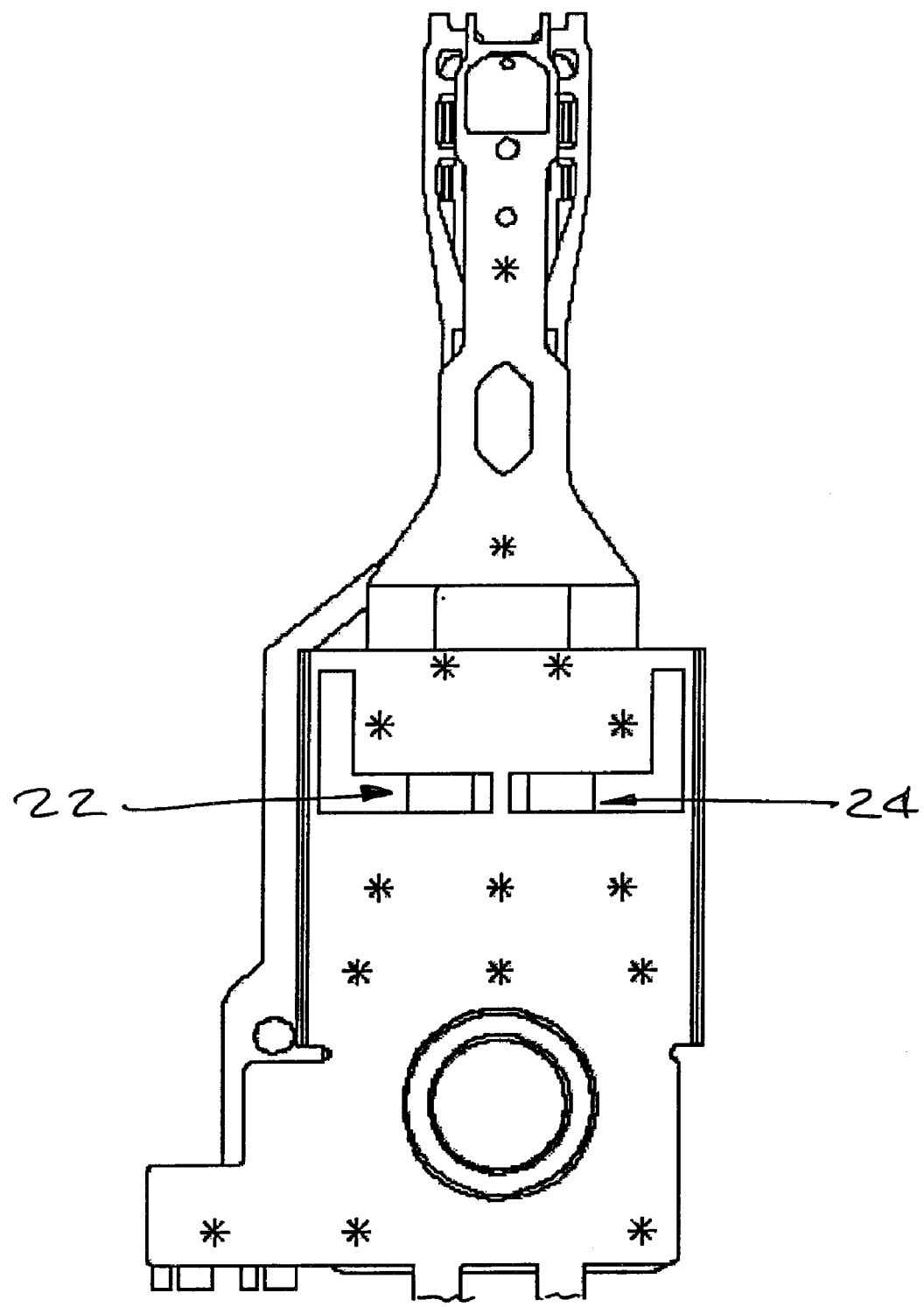
FIG. 42 is a top plan view of a second version of the second alternative embodiment wherein ultrasonic bonding using a separate piece to electrically attach one side of the PZT motors to the conductive leads formed from the flexure material.
Figure 43:
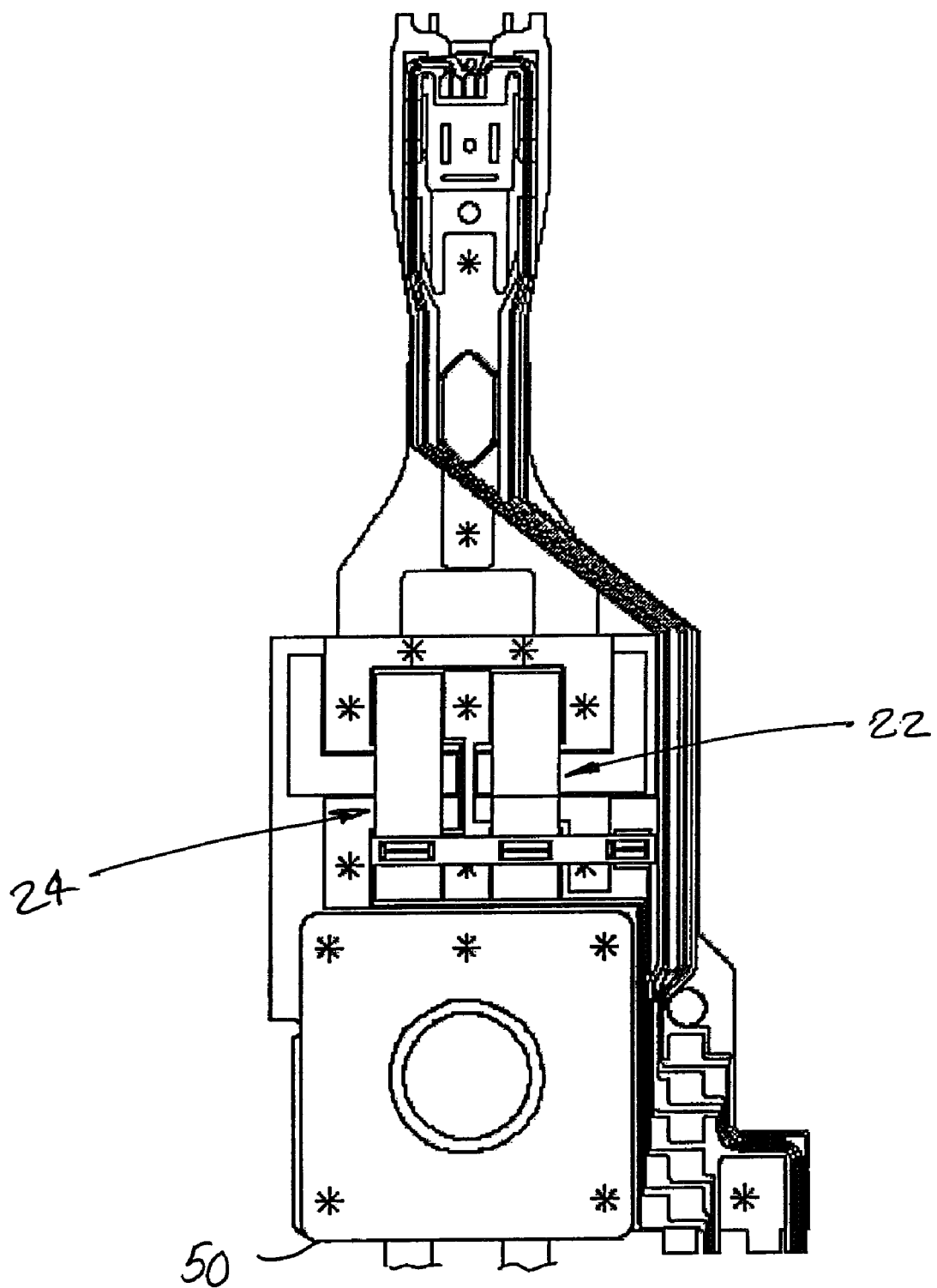
FIG. 43 is a bottom plan view of the version shown in FIG. 42.

In this embodiment, the PZT motors are mechanically and electrically bonded to trace pads 88 (or conductive pads), preferably made of gold plated copper on a flexure on the disk side of the suspension. The flexure 40a is made up of a stainless steel substrate 38a, a dielectric layer 42a (preferably of polyimide), and a conductive trace layer 43 containing conductive traces 44e (preferably of copper). The mechanical and electrical bonding is accomplished simultaneously using a conventional conductive epoxy adhesive to electrically connect one side (the bottom) of the PZT to the trace pads 88. In this embodiment, all four trace pads are at the same electrical potential. The remaining (top) electrical connection to the PZT is completed using the wire bond pad 84 in the conductive trace layer 43 electrically connected to an ultrasonically bonded gold wire (top wire stitch connection or "wire bond") on the disk side of the suspension. It is to be understood that each PZT is otherwise electrically isolated from the stainless steel substrate (and load beam) by the dielectric layer 42a, as may be seen in FIG. 33. More particularly, dielectric layer 42a has insulating pads 90 interposed between copper pads 88 and areas 92 of the stainless steel flexure substrate 38a. FIG. 36 illustrates the electrical layout of the wire bond pad 84 and trace pads 88 and connections 94 to individual traces in the conductive trace layer 43.

It is to be understood to be within the scope of the present invention to provide an assembly having only one PZT motor. Furthermore, it is within the present invention to use ultrasonic bonding of conductive leads formed from the flexure material as shown in FIGS. 37–41 or to use ultrasonic bonding of conductive leads formed from an additional add-on component as shown in FIGS. 42–49 to make the electrical connection to the PZT motor. Additionally, it is within the present invention to use conductive epoxy or solder as shown in FIGS. 52–56 to attach conductive leads formed from the flexure material or from an additional add-on component shown in FIGS. 57–61 to make the electrical connection to the PZT motor. The versions shown in FIGS. 37 through 61 each have the PZT motors 22, 24 mounted on the disk side of the suspension, as were shown in FIGS. 29–36.

In the version shown in FIGS. 37–41, electrical connection is made to the surface 28 of the PZTs 22 and 24 in a manner similar to that shown in the previous version using trace pads 88 insulated from the stainless steel layer 38b by insulating pads 90a, except that ultrasonic bonding is used, as was done with respect to the version shown in FIGS. 9–13. A lead extension 96 is used to make electrical connection to the free side 26 of the PZTs 22 and 24, again using ultrasonic bonding. As may be seen most clearly in FIG. 41, the lead extension 96 has its laminate "inverted" by being folded over, such that the conductive trace 98 is facing and abutting side 26 of the PZTs, while being insulated by layer 99 and supported by the stainless steel layer 100.

Figure 44:
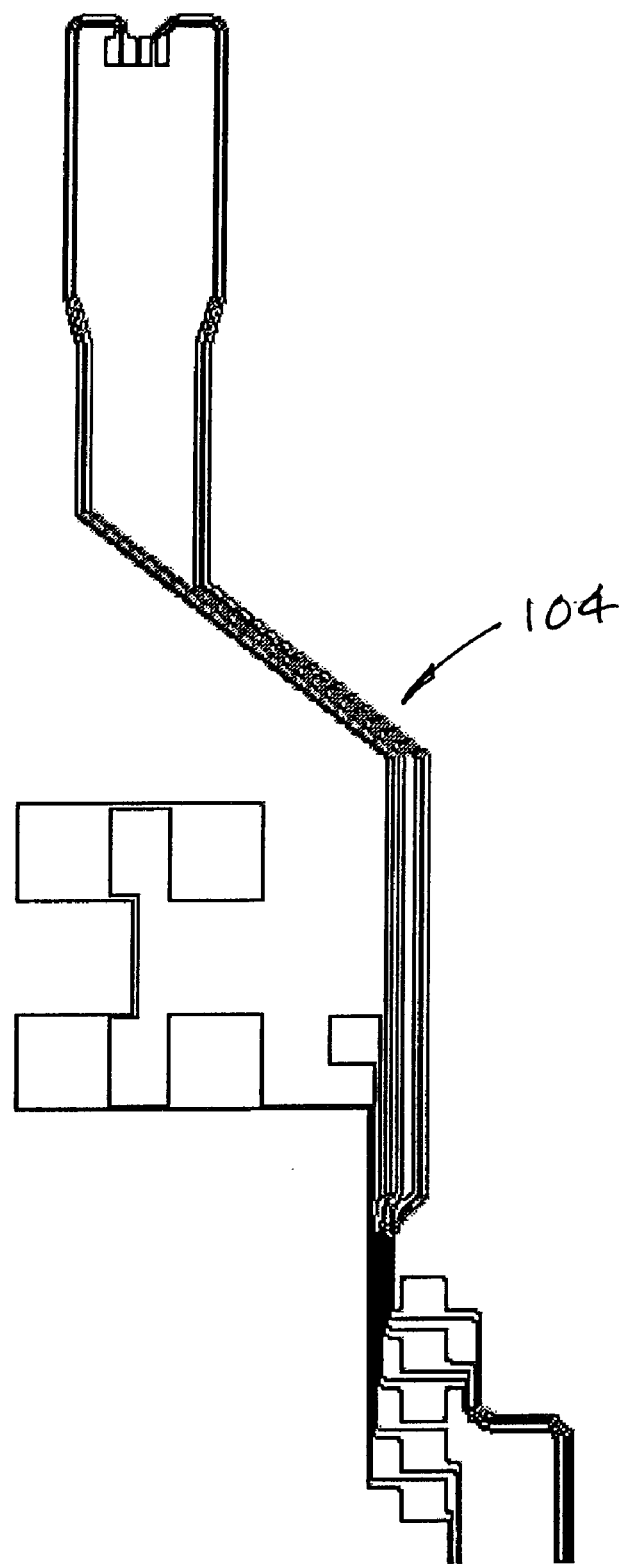
FIG. 44 is a plan view of the trace layer for the version shown in FIG. 43.
Figure 45:
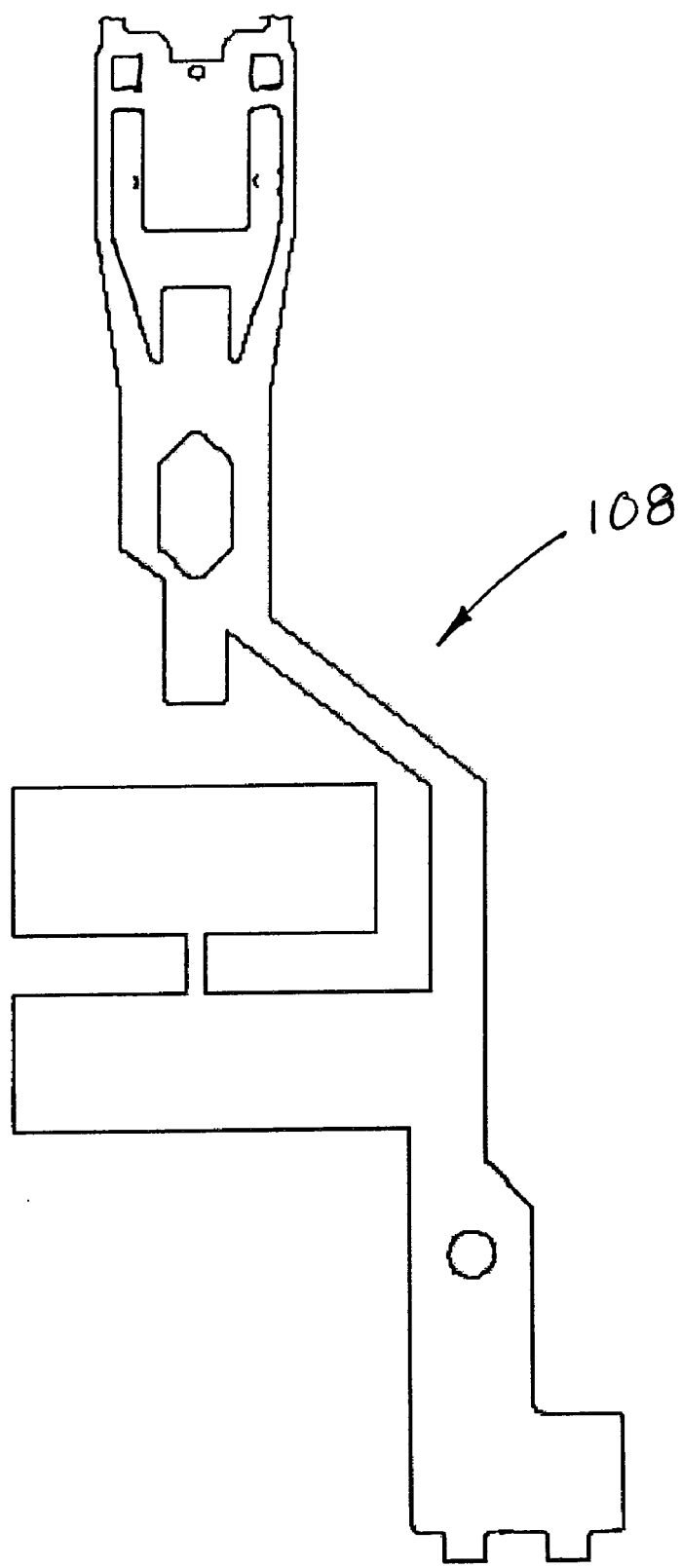
FIG. 45 is a plan view of the substrate layer for the version shown in FIG. 43.
Figure 46:
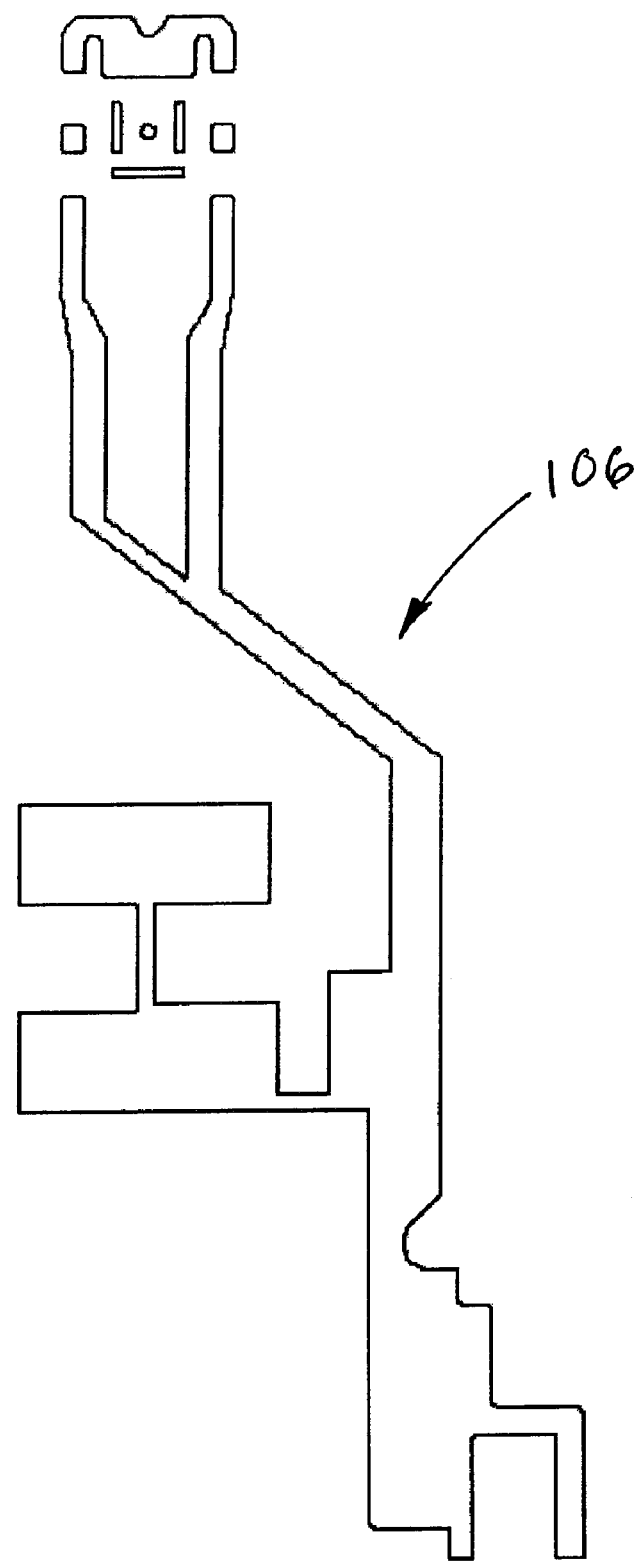
FIG. 46 is a plan view of the dielectric layer for the version shown in FIG. 43.
Figure 47:
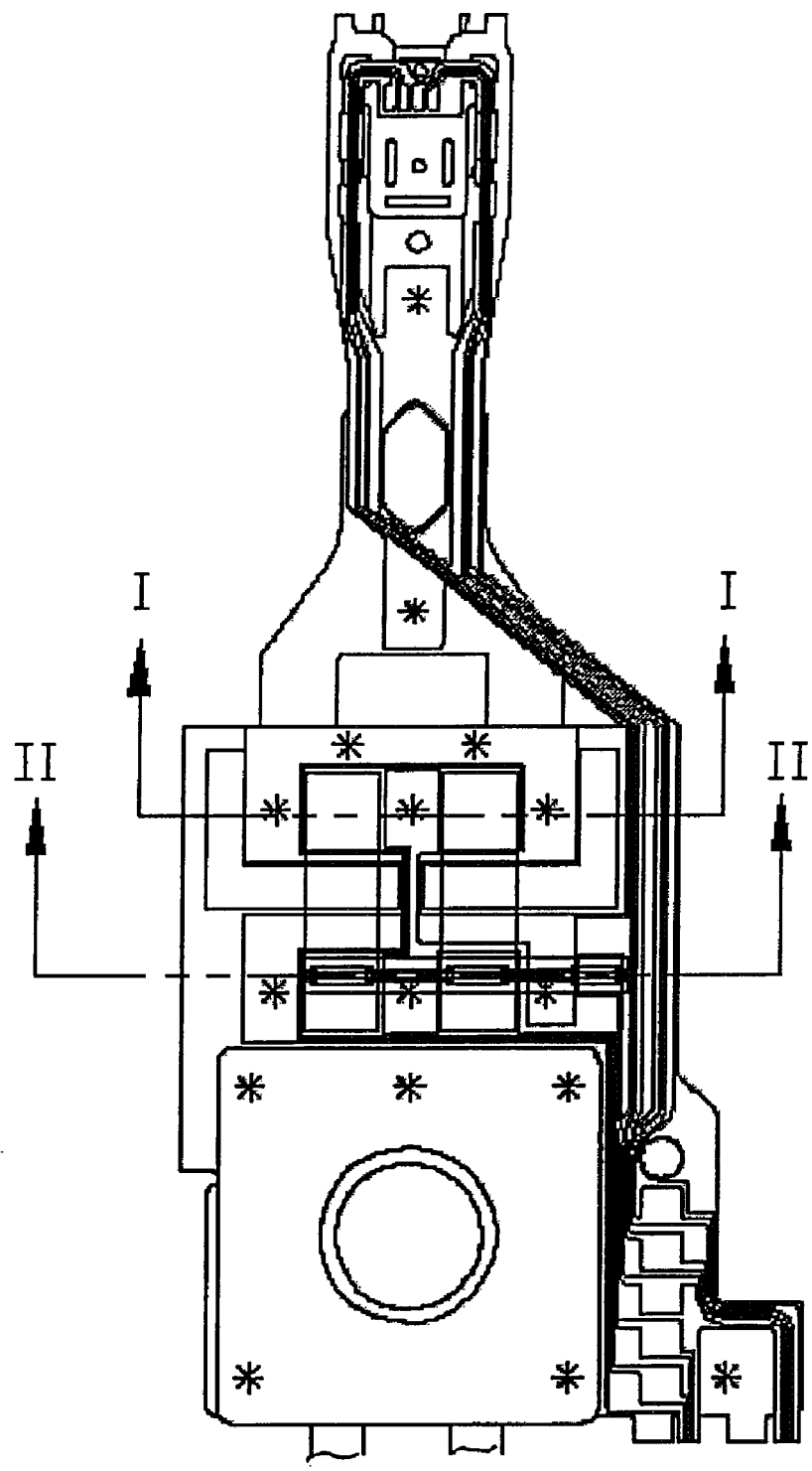
FIG. 47 is a composite view of FIGS. 42 and 43 with hidden lines shown for clarity.
Figure 48:
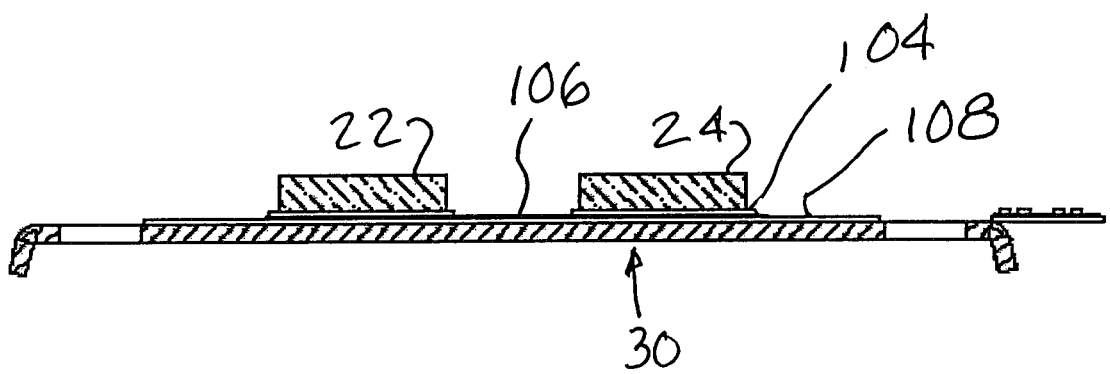
FIG. 48 is a section view along line I—I of FIG. 47.
Figure 49:
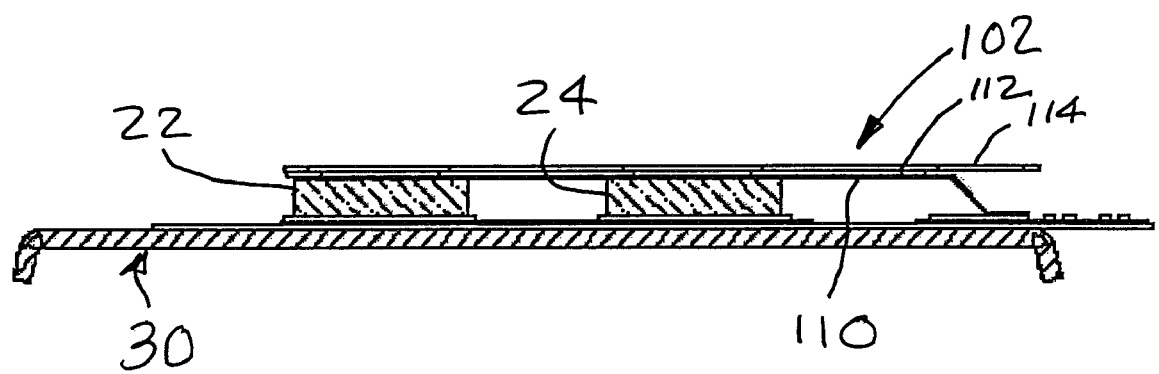
FIG. 49 is a section view along line II—II of FIG. 47.
Figure 50:
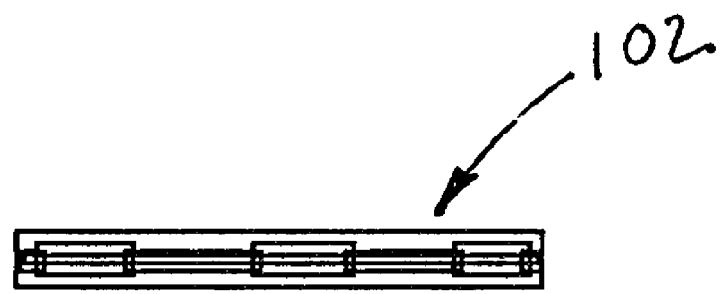
FIG. 50 is a plan view of the separate piece used in the version shown in FIG. 43.
Figure 51:
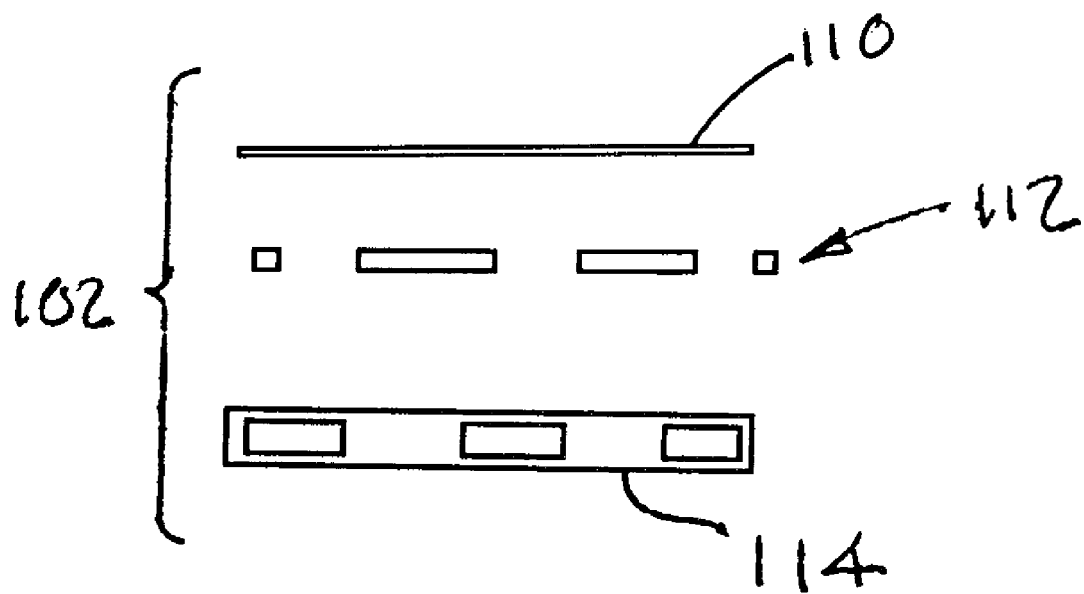
FIG. 51 is an exploded view of the various layers of the separate piece shown in FIG. 50.
Figure 52:
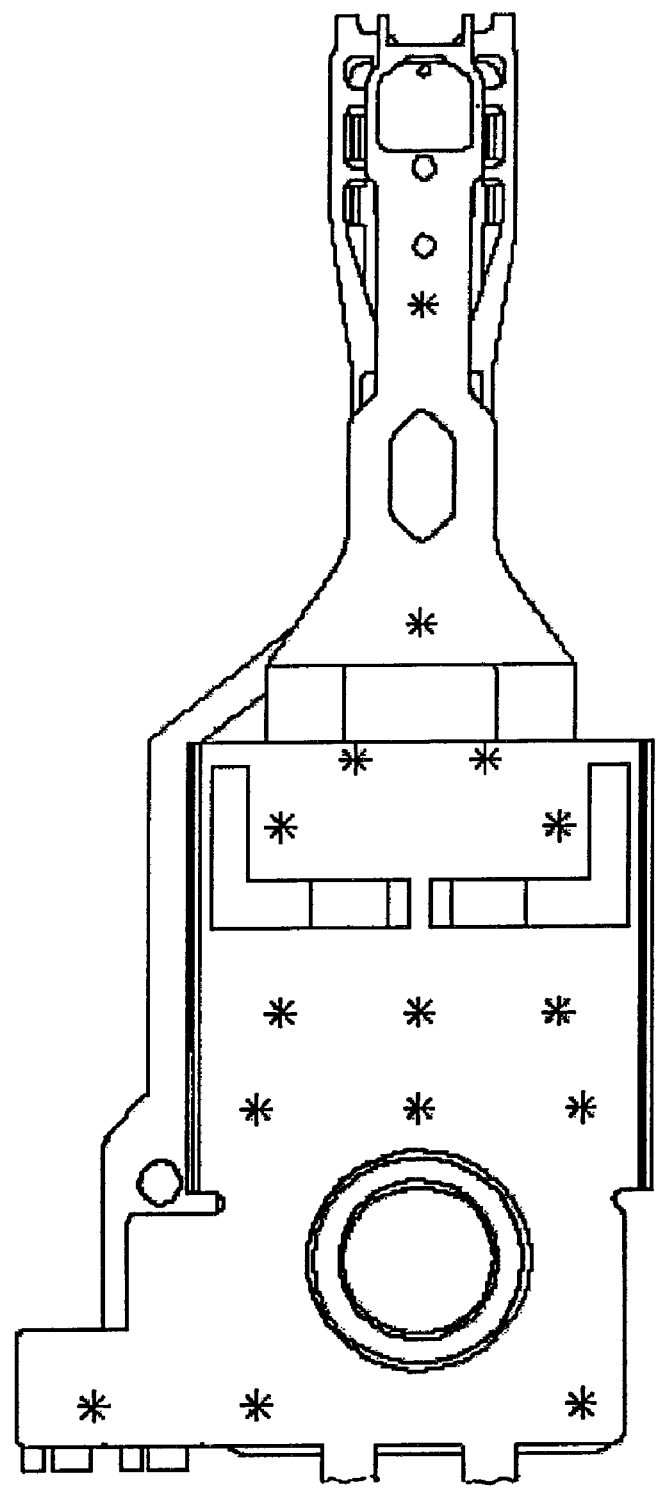
FIG. 52 is a top plan view of a third version of the second alternative embodiment wherein the PZT motors are attached using solder or conductive epoxy to extensions of the conductive leads formed from the flexure material.
Figure 53:
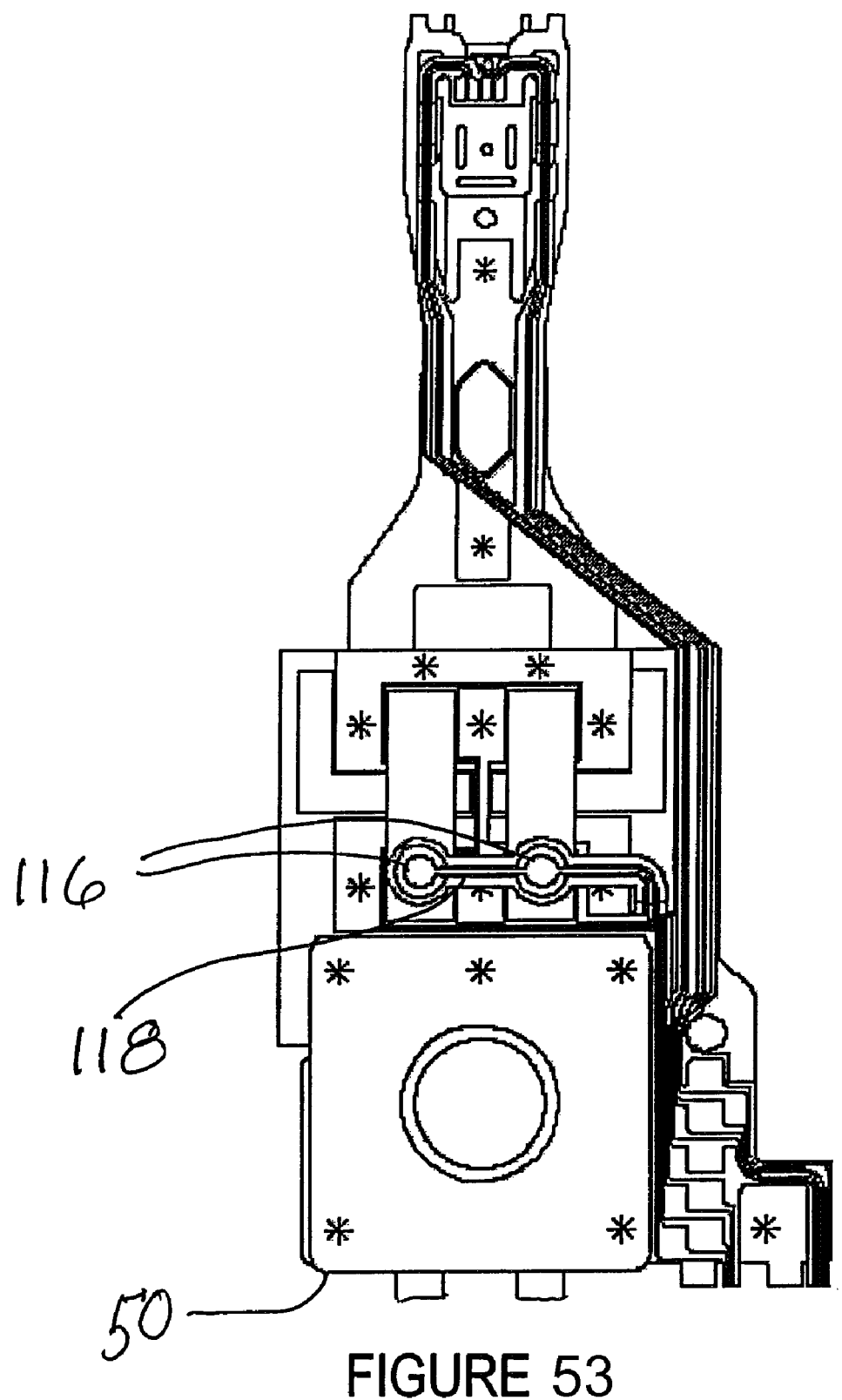
FIG. 53 is a bottom plan view of the version shown in FIG. 52.
Figure 54:
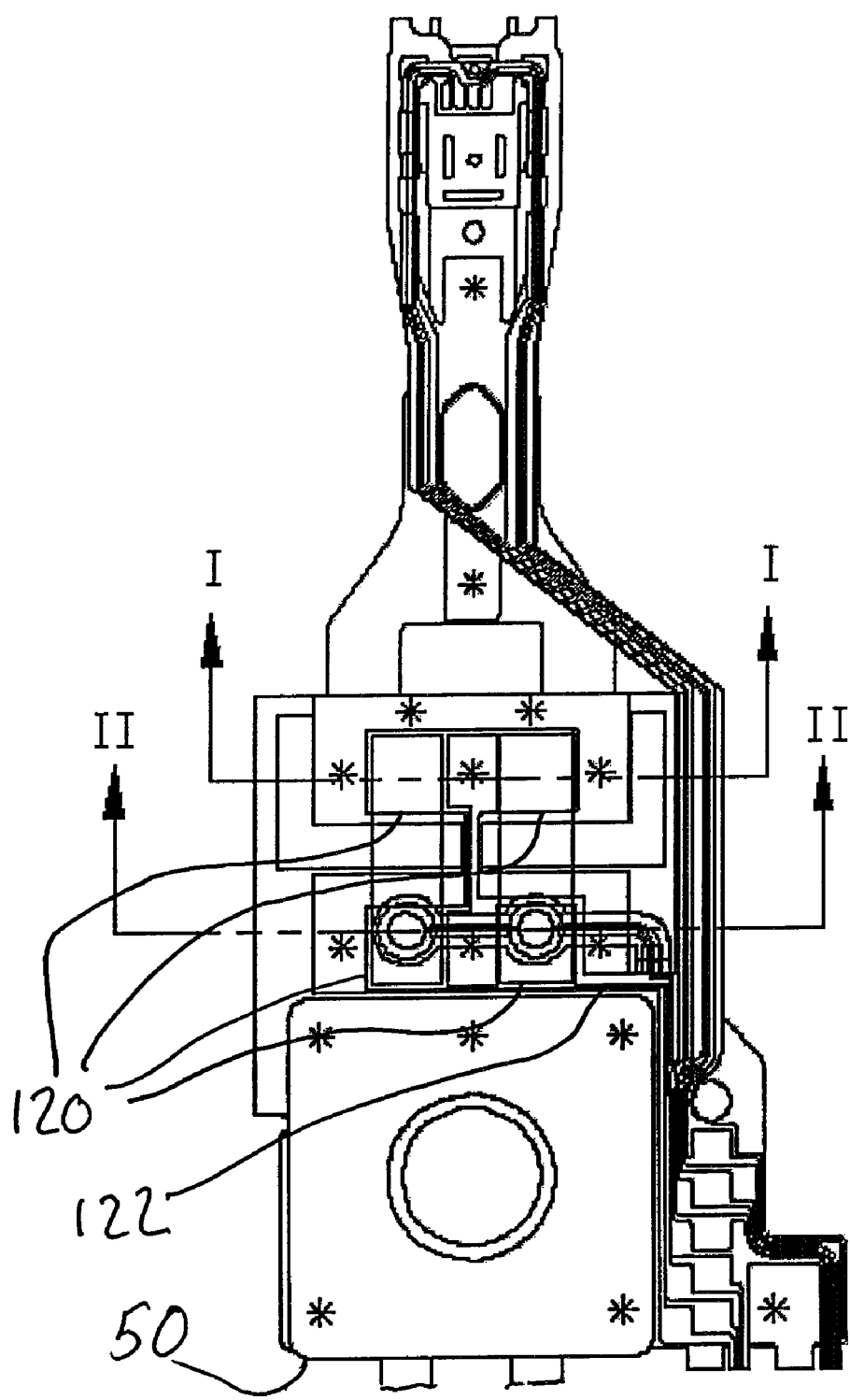
FIG. 54 is a composite view of FIGS. 52 and 53 with hidden lines shown for clarity.
Figure 55:
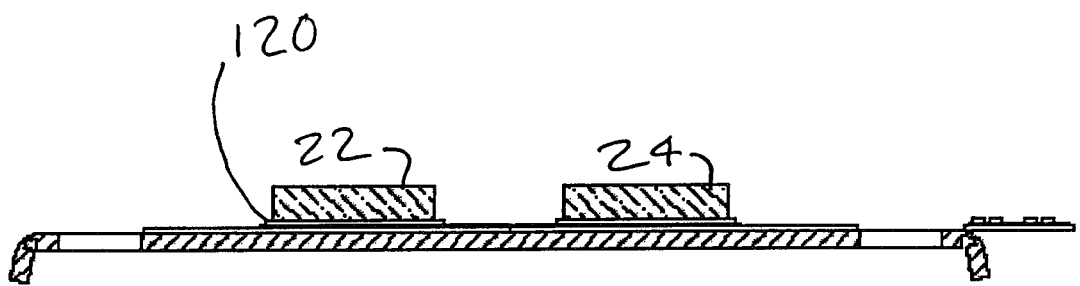
FIG. 55 is a section view along line I—I of FIG. 54.
Figure 56:
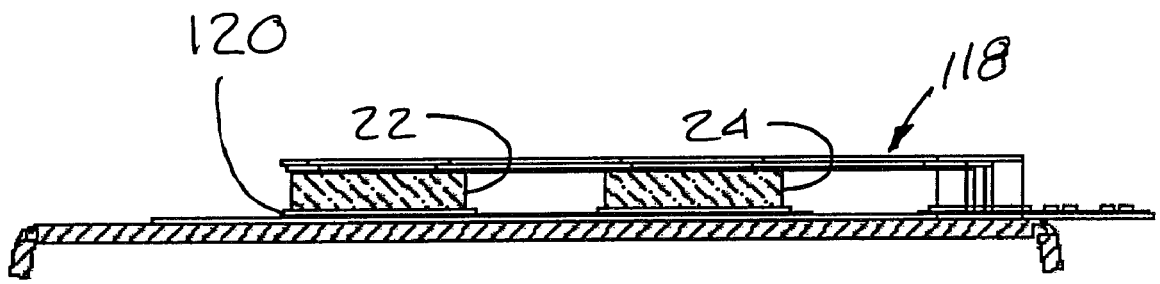
FIG. 56 is a section view along line II—II of FIG. 54.
Figure 57:
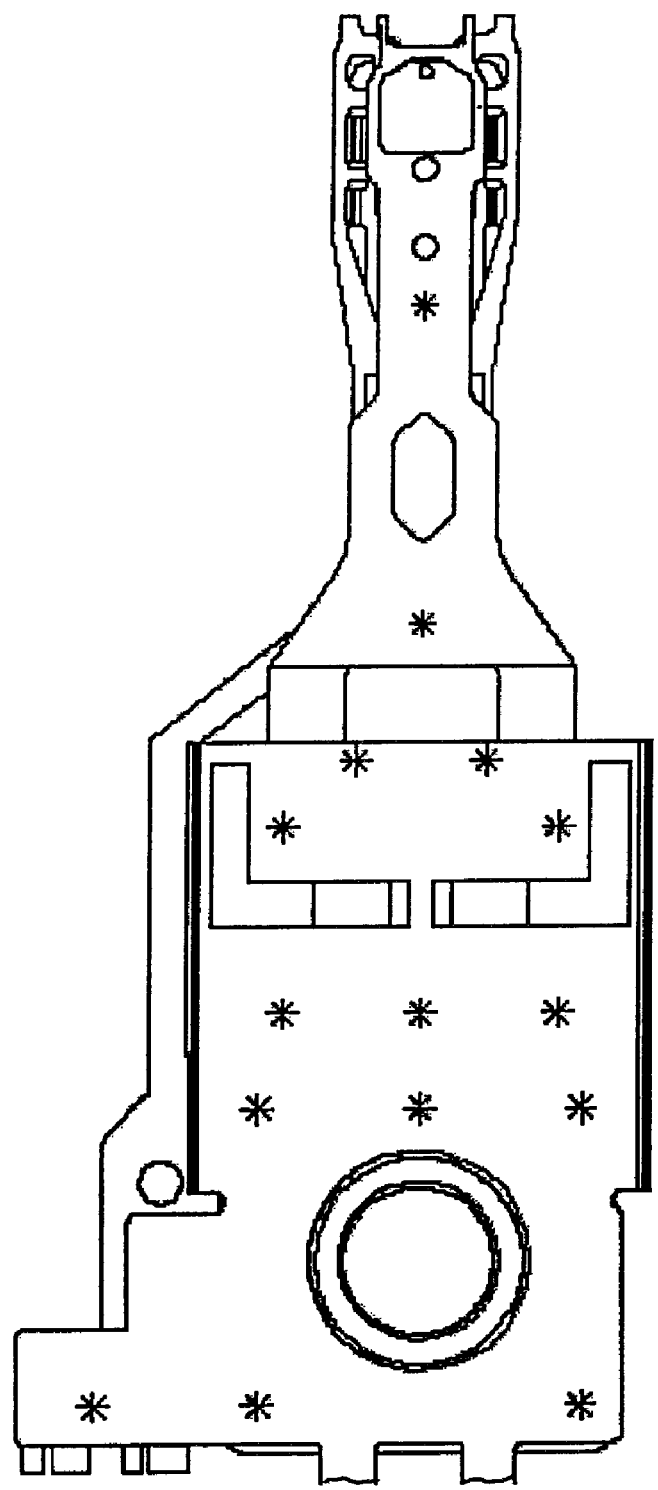
FIG. 57 is a top plan view of a fourth version of the second alternative embodiment wherein solder or conductive epoxy connections using a pair of extra pieces electrically attach the PZT motors to the conductive leads formed from the flexure material.
Figure 58:
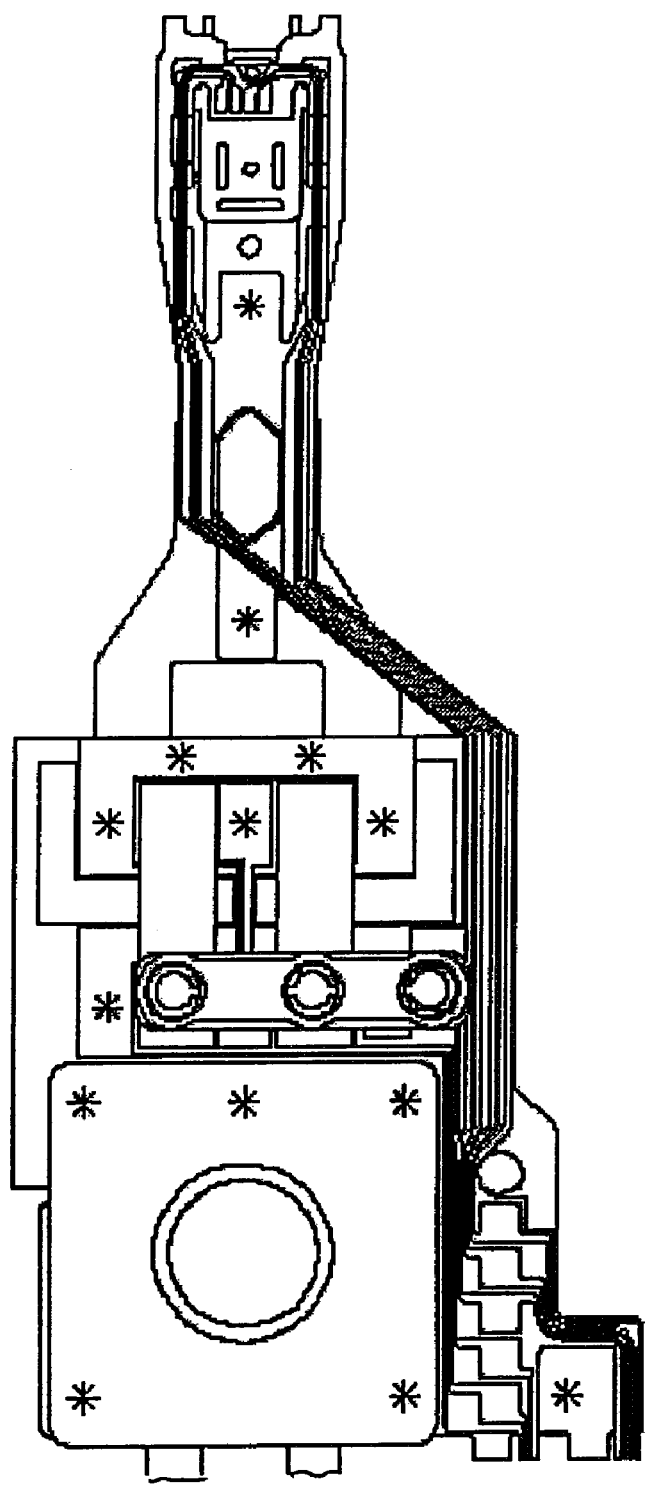
FIG. 58 is a bottom plan view of the version shown in FIG. 57.
Figure 59:
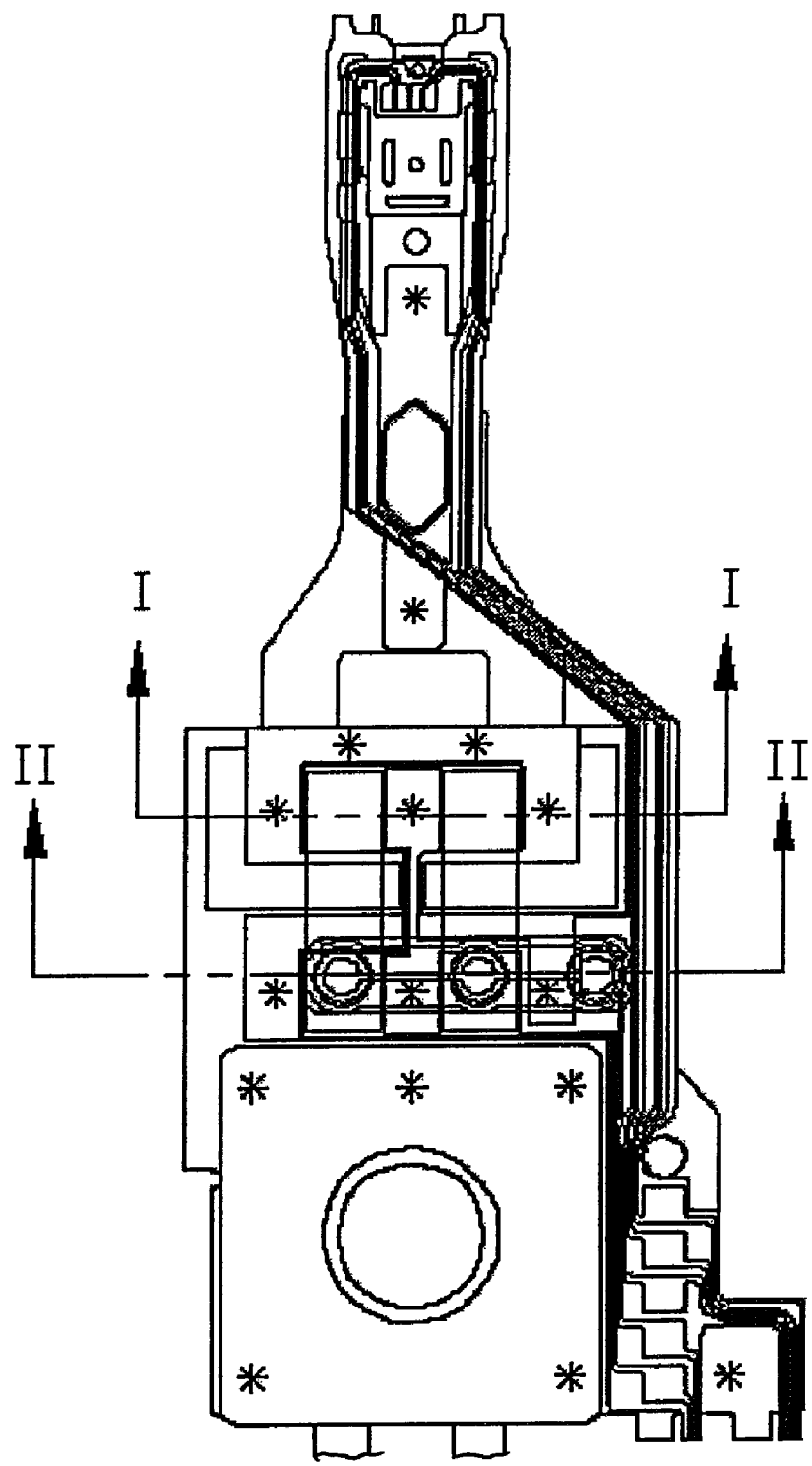
FIG. 59 is a composite view of FIGS. 57 and 58 with hidden lines shown for clarity.
Figure 60:
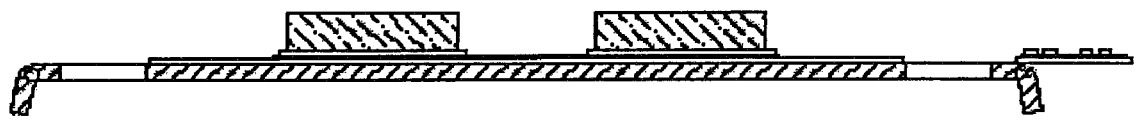
FIG. 60 is a section view along line I—I of FIG. 59.
Figure 61:
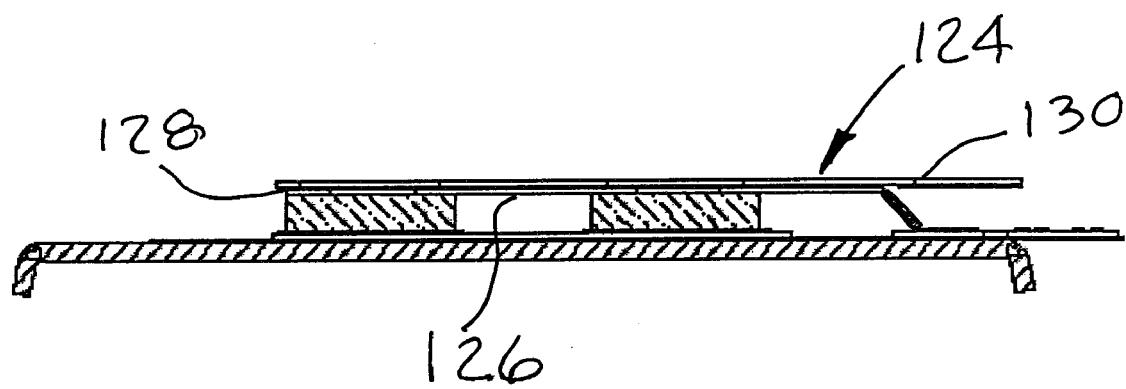
FIG. 61 is a section view along line II—II of FIG. 59.

Referring now most particularly to FIGS. 42–49, another version of the present invention may be seen in which one separate piece is used to connect the leads in the flexure to the free side 26 of the PZTs. In this version, a separate piece 102 is formed of the same laminate as the flexure material may be used to connect leads 44 to the PZTs 22 and 24. FIGS. 44 45, and 46 show a trace layer 104, a dielectric layer 106, and a stainless steel layer 108 useful in the practice of this version. FIGS. 50 and 51 show, respectively, the separate piece 102 in plan view, and the various layers in a separated or exploded view. Layer 110 is a conductive trace layer, layer 112 is a dielectric layer, and layer 114 is a substrate which may be formed of stainless steel.

Referring now to FIGS. 52 through 56, a version of the present invention may be seen in which the PZT motors are electrically and mechanically connected to extensions of the conductive traces by solder connections 116. In this version, the free side 26 of the PZTs 22 and 24 is connected to an extension 118, and the other side 28 of the PZTs is connected to trace pads 120 forming part of a trace extension 122 similar to that shown in FIG. 44.

Figure 62:
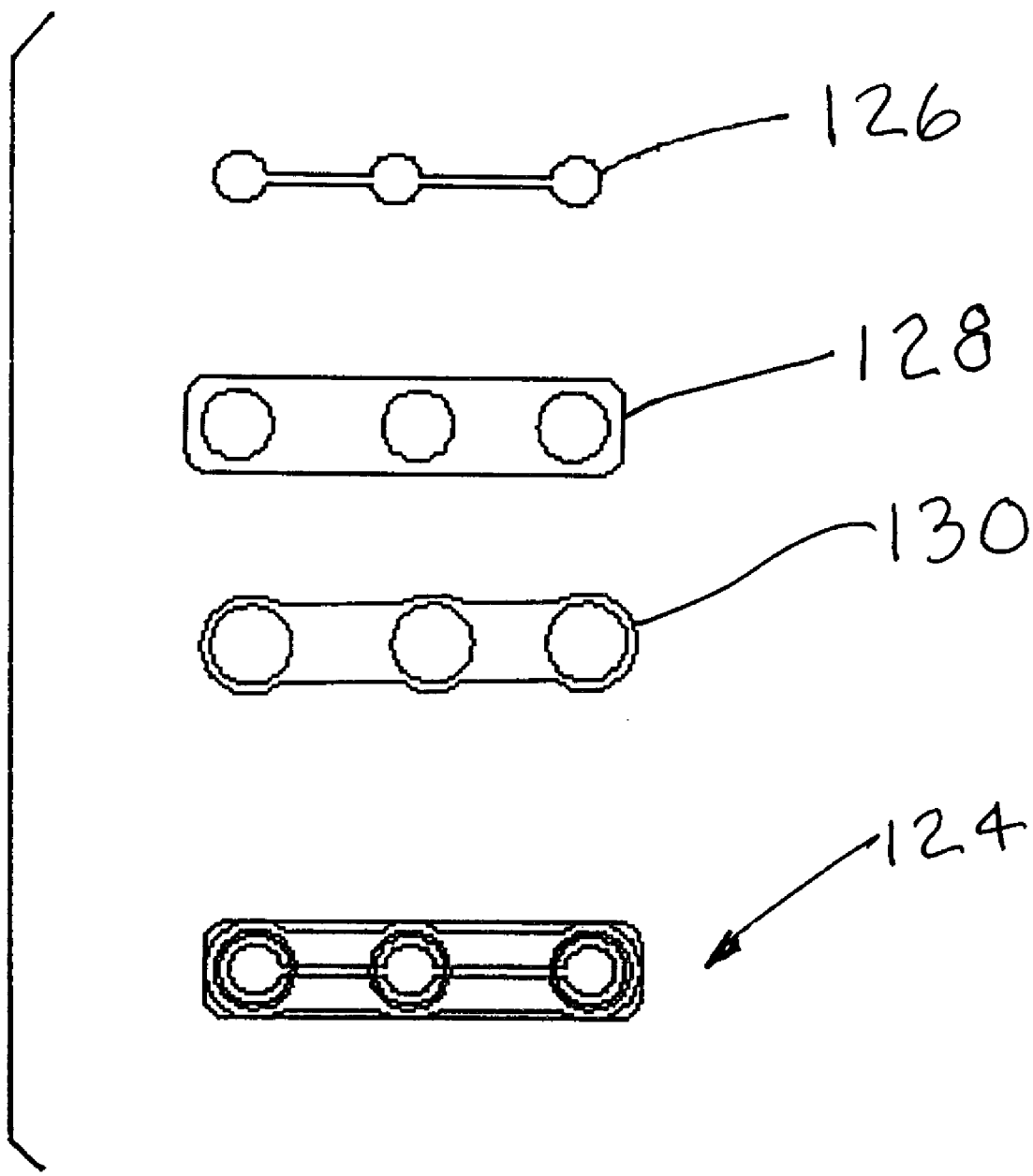
FIG. 62 shows an exploded and composite view of the separate piece shown in FIG. 58.

In FIGS. 57 through 61, a version using solder connections 116 with a separate piece 124 to connect to side 26 of the PZTs may be seen. FIG. 62 shows the various layers of the separate piece 124, and also shows a plan view of the laminated separate piece 124. Piece 124 includes a conductor layer 126 (which may be formed of copper or a copper alloy), a dielectric layer 128 (which may be formed of polyimide), and a substrate layer 130, (which may be formed of stainless steel). The trace pads and extension shown in FIG. 44 (or a similar arrangement) may be used to connect to side 28 of the PZT motors 22 and 24.

Figure 63:
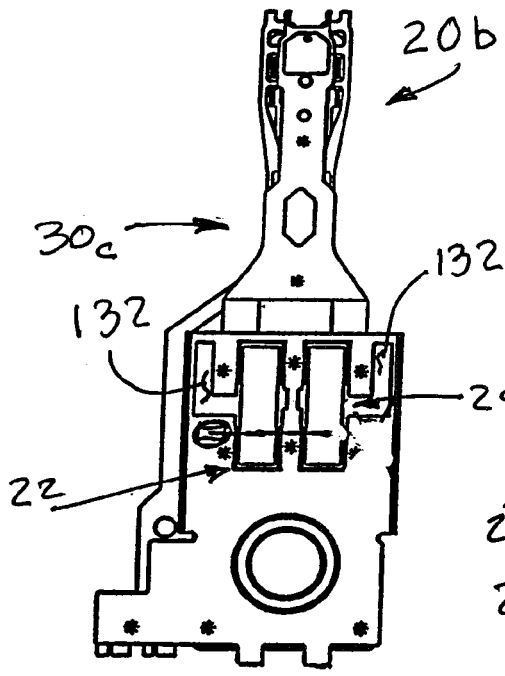
FIG. 63 shows a top plan view of a third embodiment.
Figure 64:
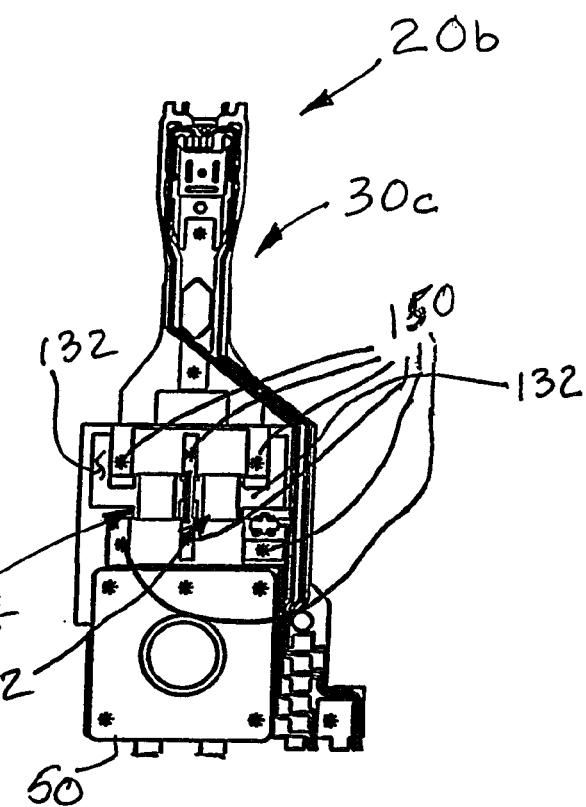
FIG. 64 is bottom plan view of the embodiment of FIG. 63.
Figure 65:
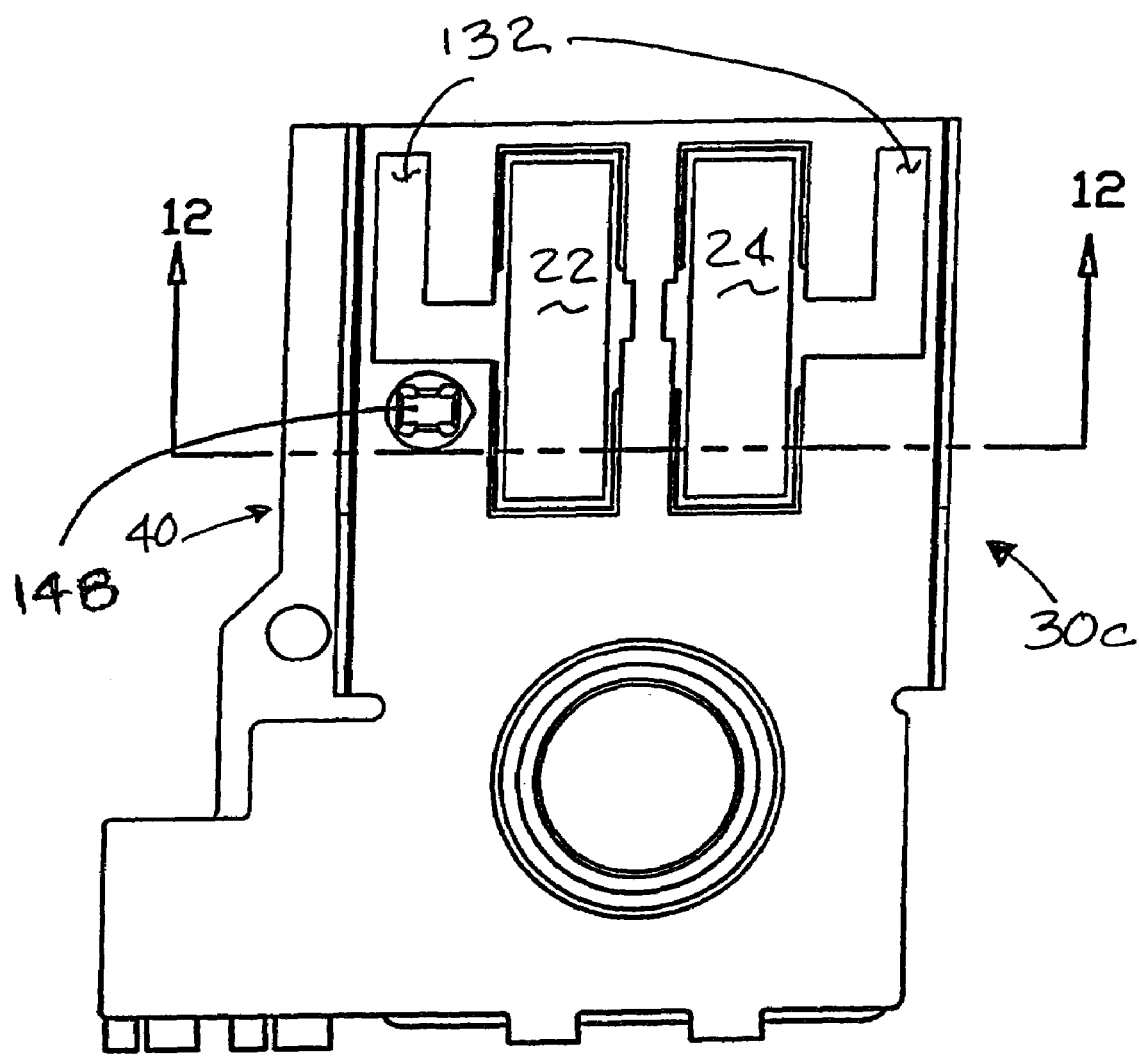
FIG. 65 is an enlarged fragmentary view of a portion of FIG. 63 showing details of the mounting arrangement for the PZT motors in this embodiment.
Figure 66:
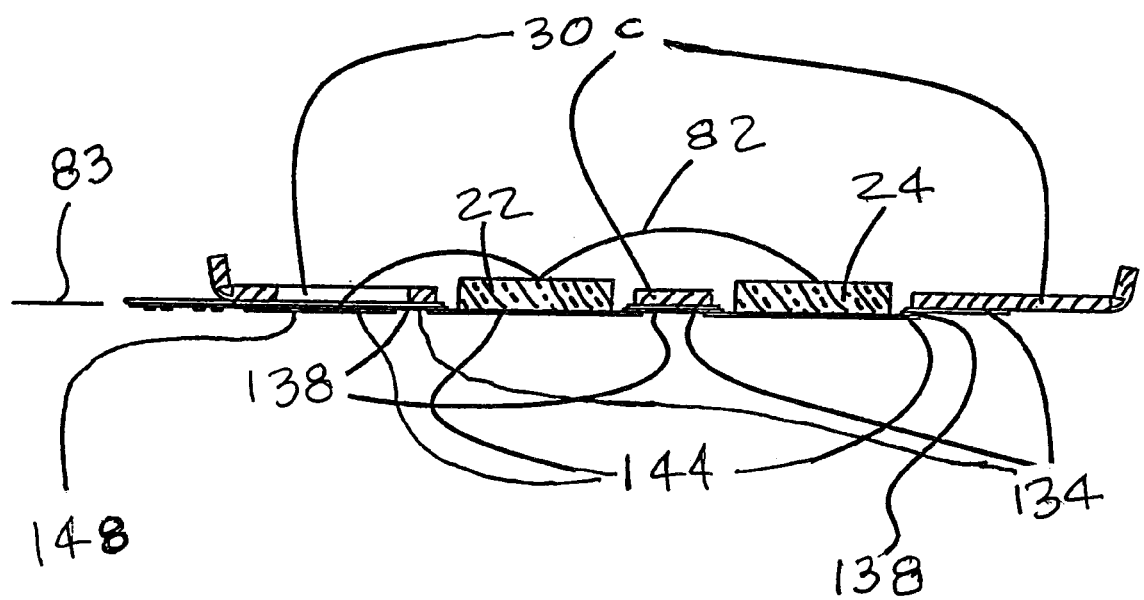
FIG. 66 is a still further enlarged section view taken along line 12—12 of FIG. 65.
Figure 67:
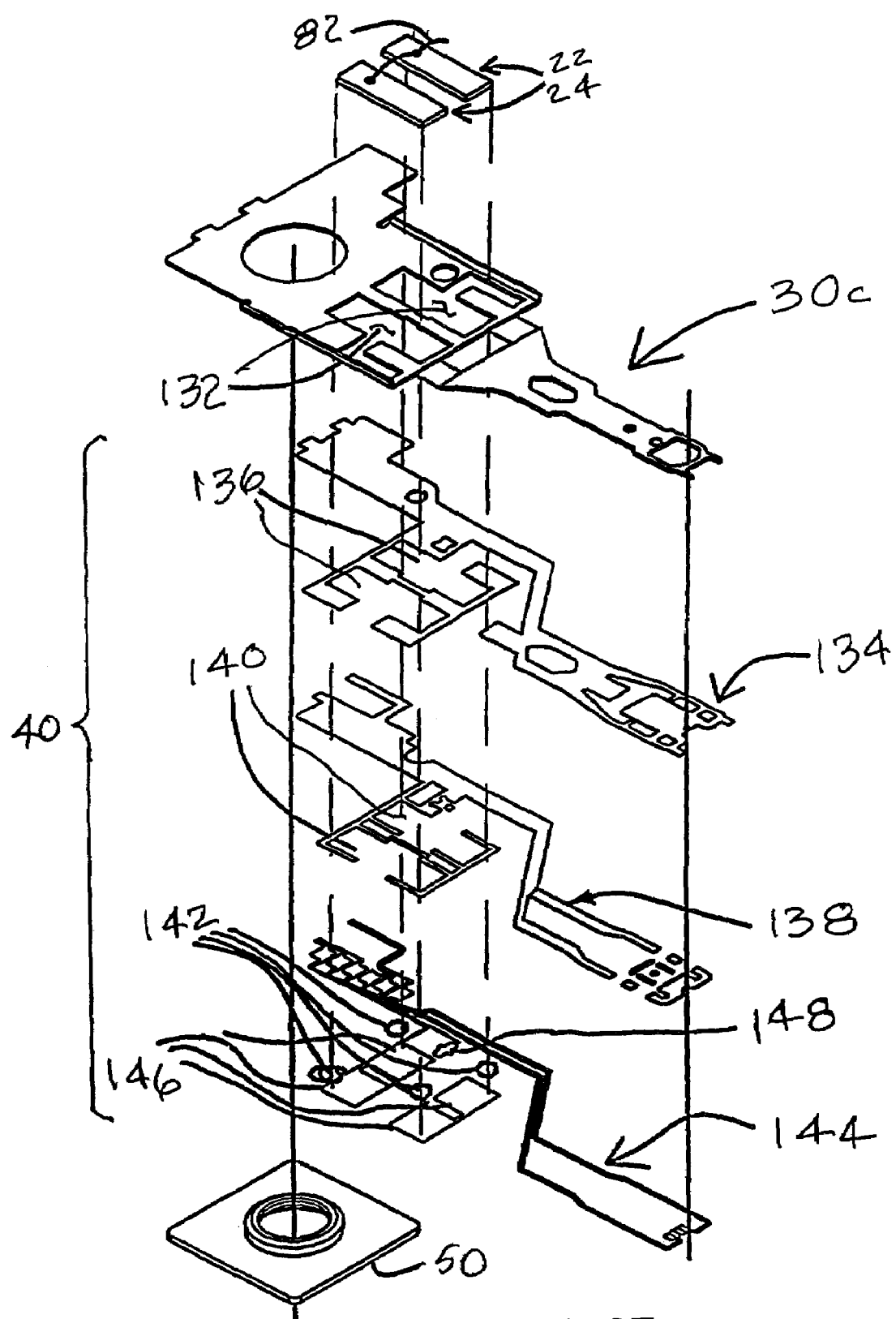
FIG. 67 is an exploded perspective view of the suspension assembly of FIG. 63.
Figure 68:
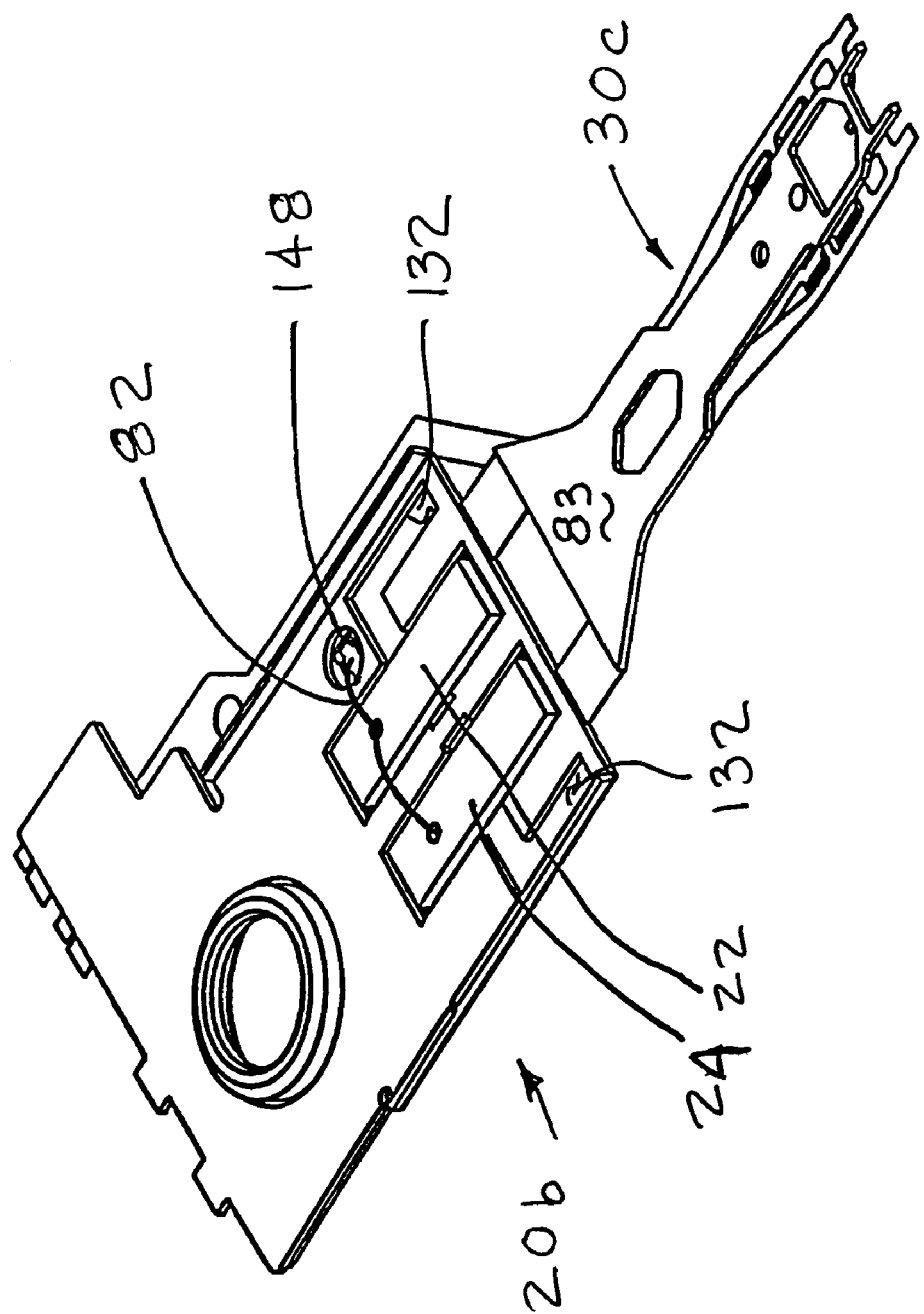
FIG. 68 is a perspective view of the suspension assembly of FIG. 63.
Figure 69:
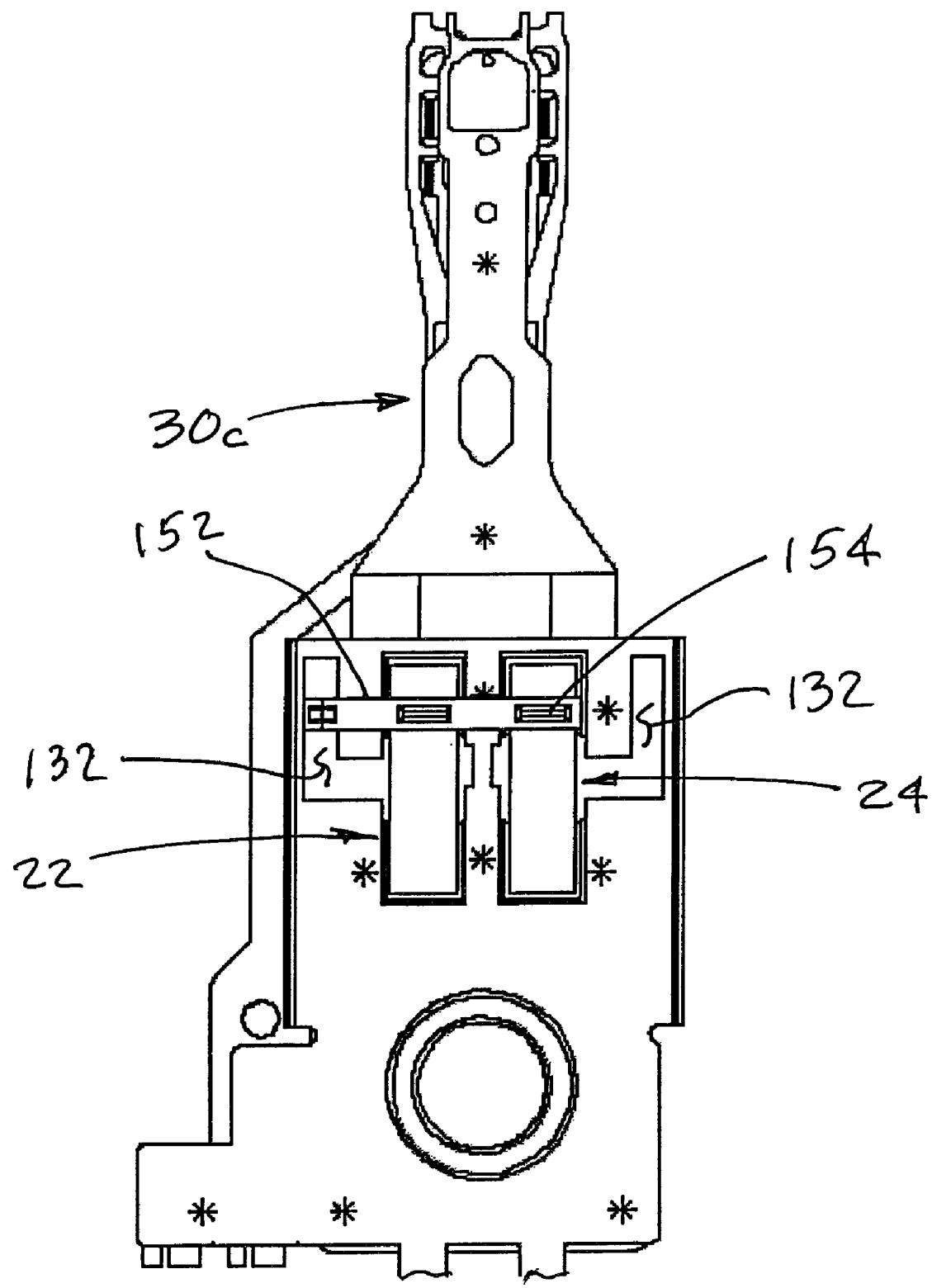
FIG. 69 is a top plan view of a first version of a third alternative embodiment wherein the PZT motors are ultrasonically bonded to extensions of the conductive leads formed from the flexure material.
Figure 70:
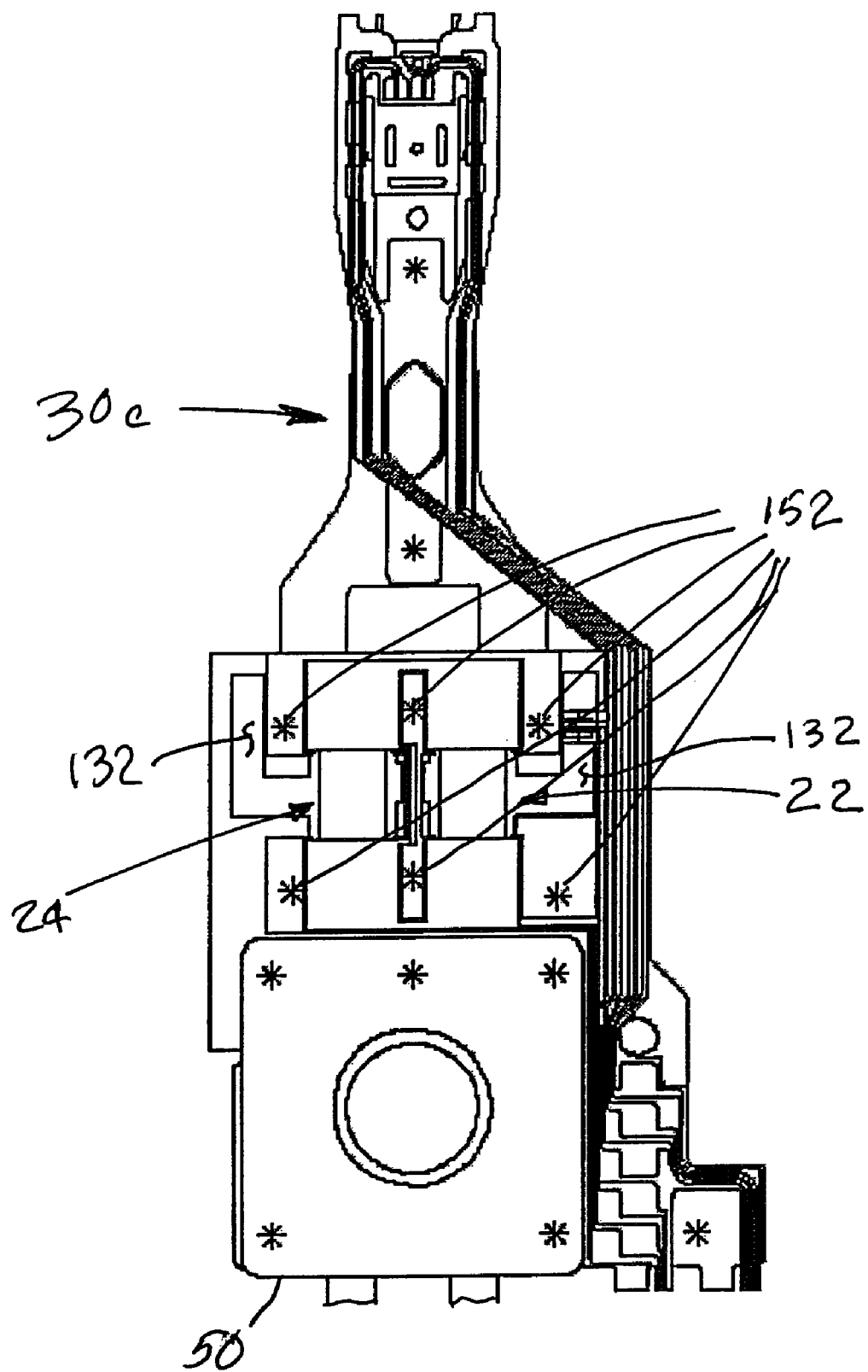
FIG. 70 is a bottom plan view of the version shown in FIG. 69.
Figure 71:
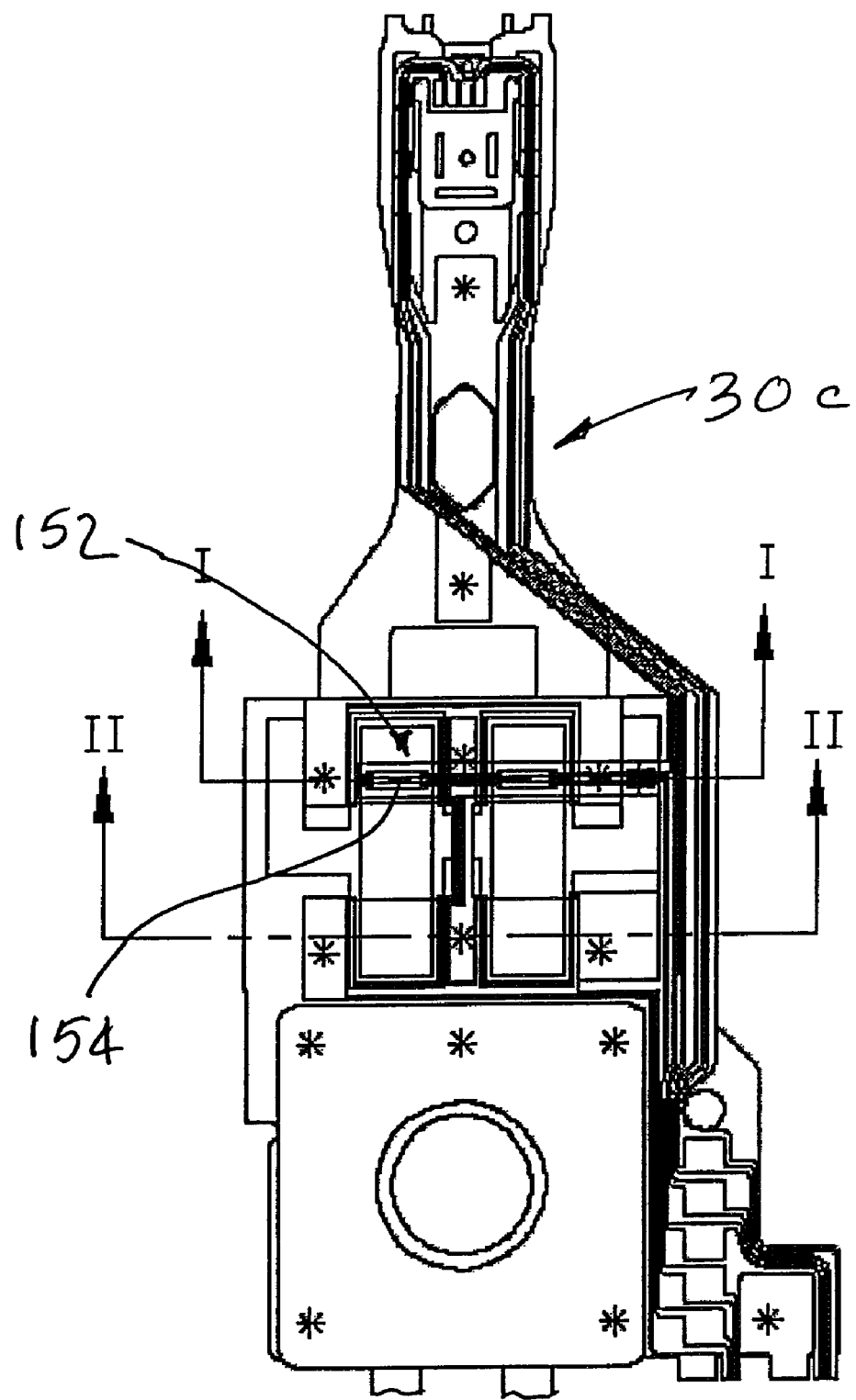
FIG. 71 is a composite view of FIGS. 69 and 70 with hidden lines shown for clarity.
Figure 72:
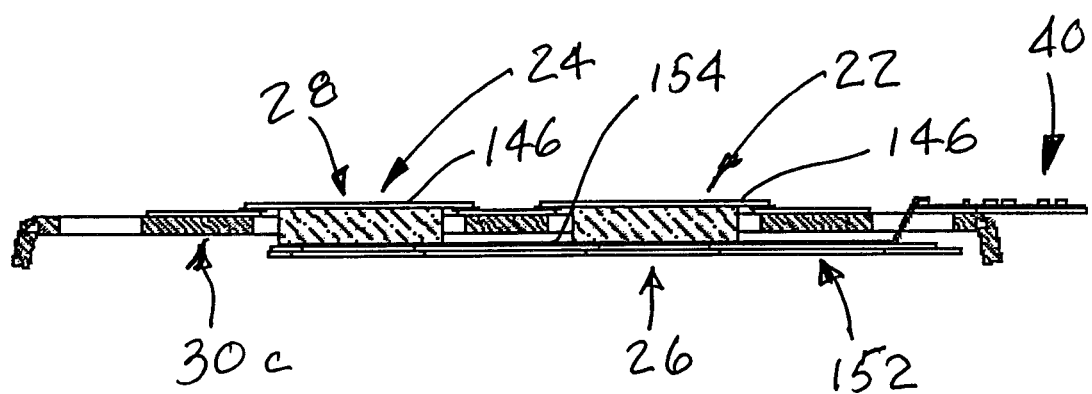
FIG. 72 is a section view along line I—I of FIG. 71.
Figure 73:
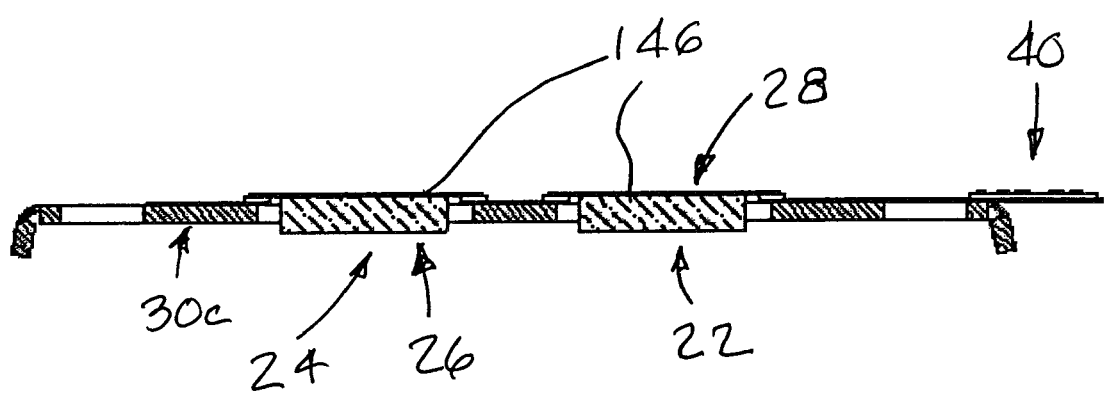
FIG. 73 is a section view along line II—II of FIG. 71.
Figure 74:
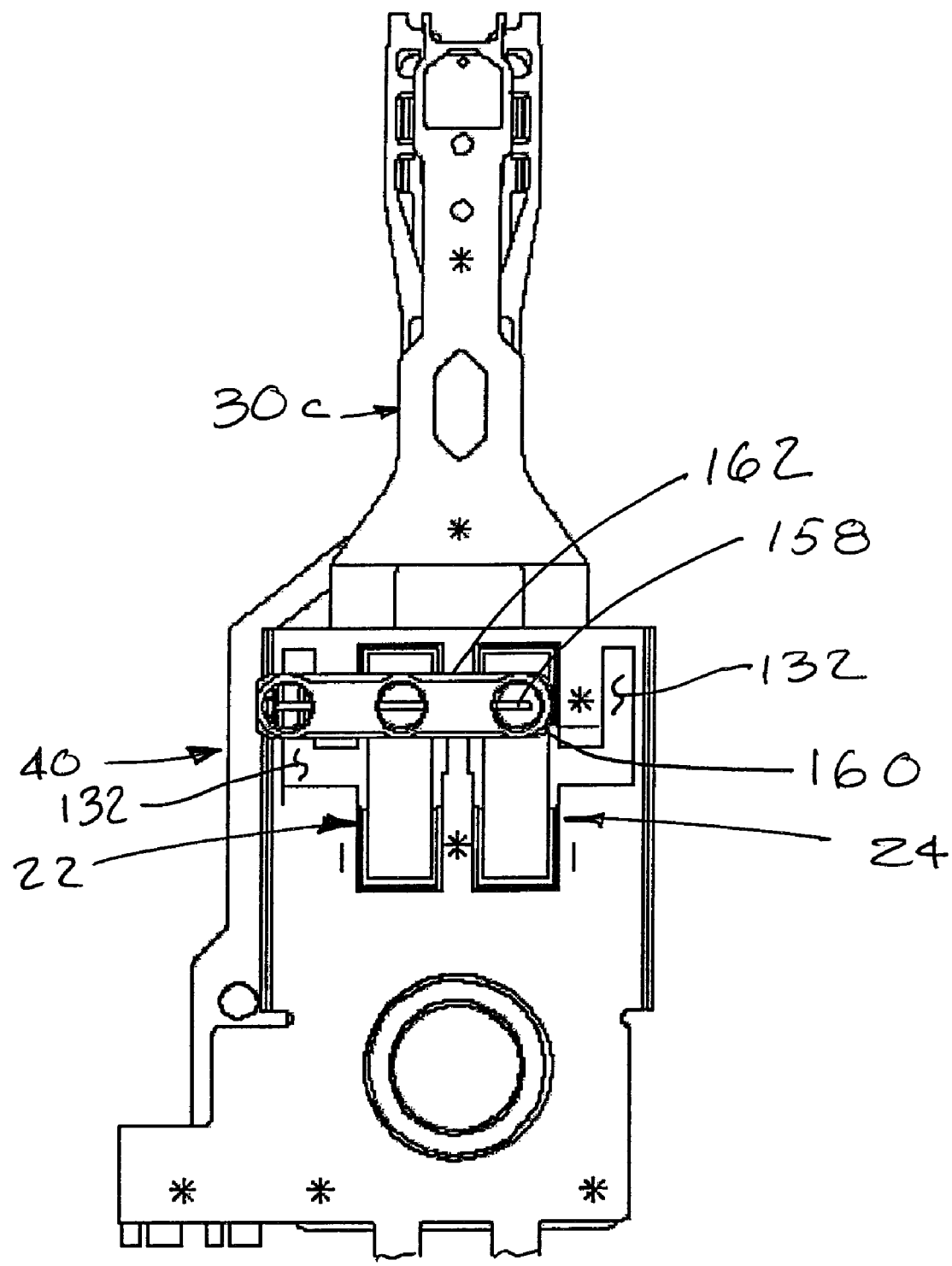
FIG. 74 is a top plan view of a second version of the third alternative embodiment using ultrasonic bonding of a separate piece to electrically attach one side of the PZT motors to the conductive leads formed from the flexure material.
Figure 75:
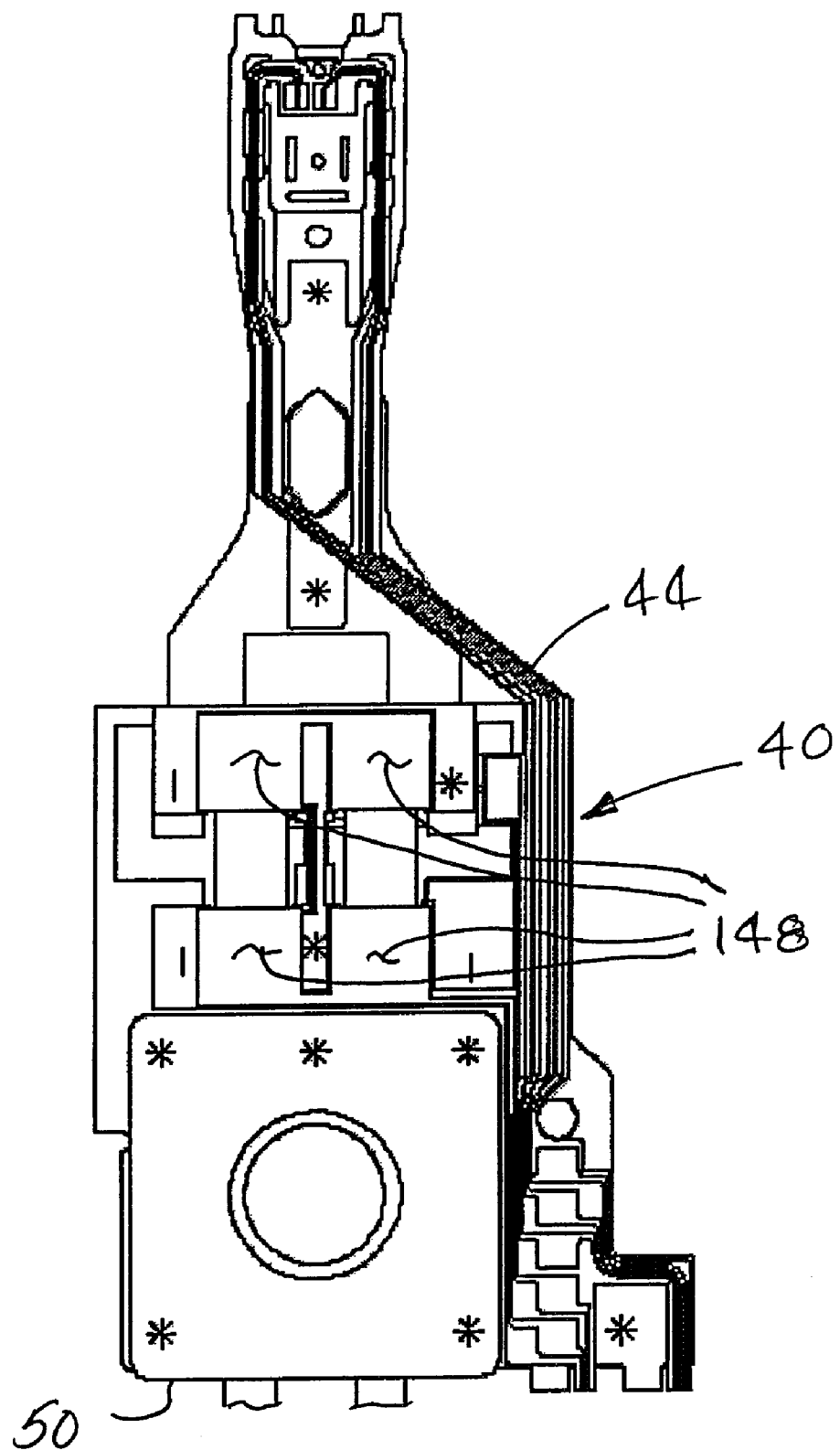
FIG. 75 is a bottom plan view of the version shown in FIG. 74.
Figure 76:
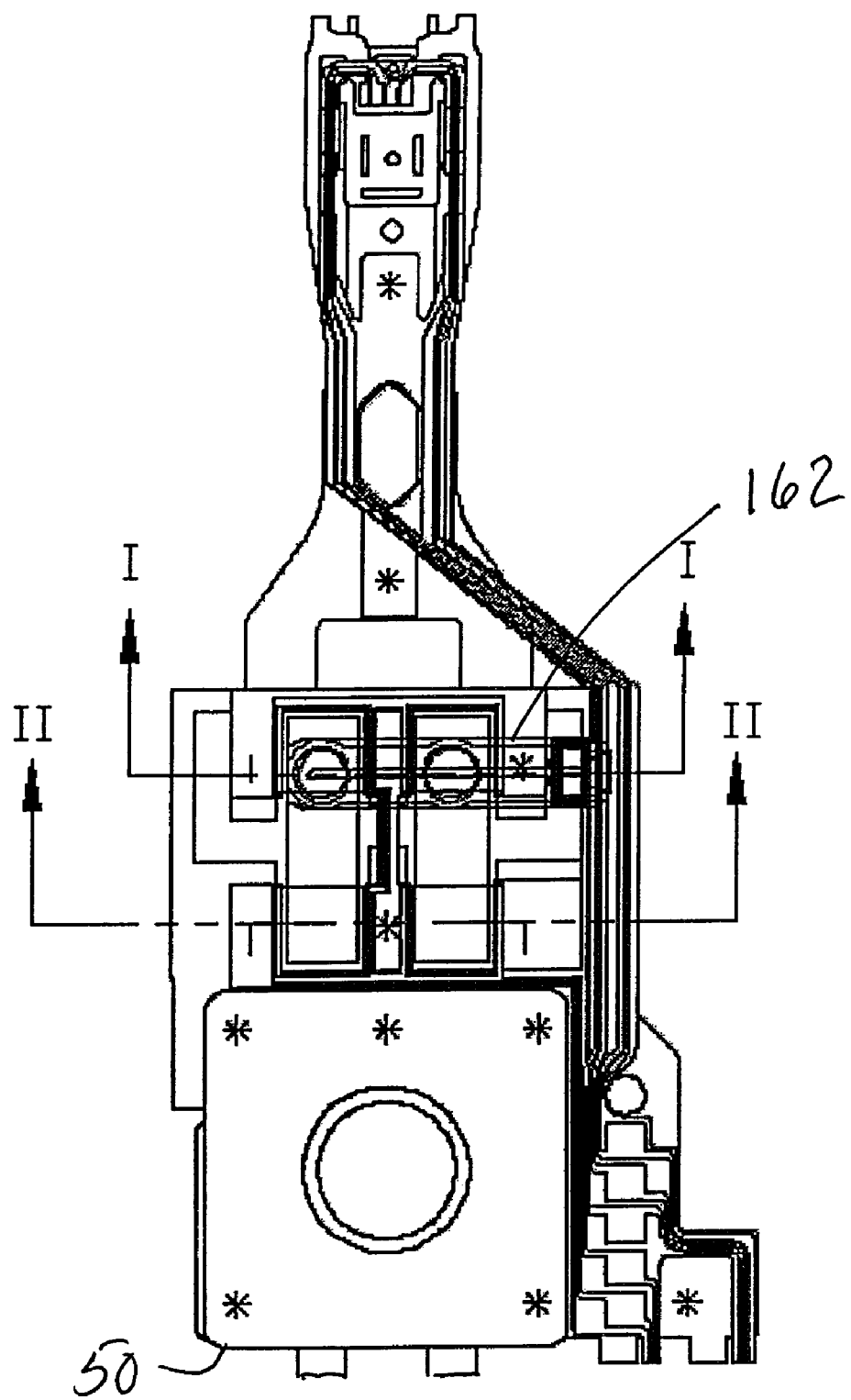
FIG. 76 is a composite view of FIGS. 74 and 75 with hidden lines shown for clarity.
Figure 77:
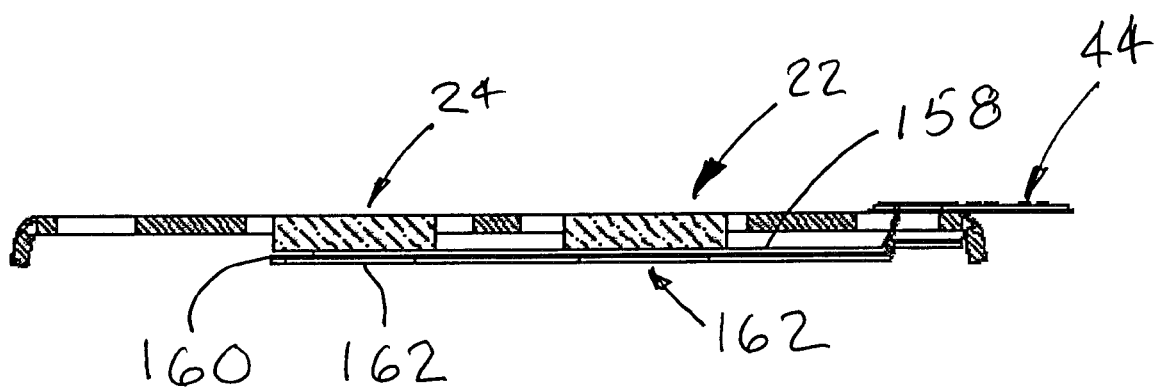
FIG. 77 is a section view along line I—I of FIG. 76.
Figure 78:
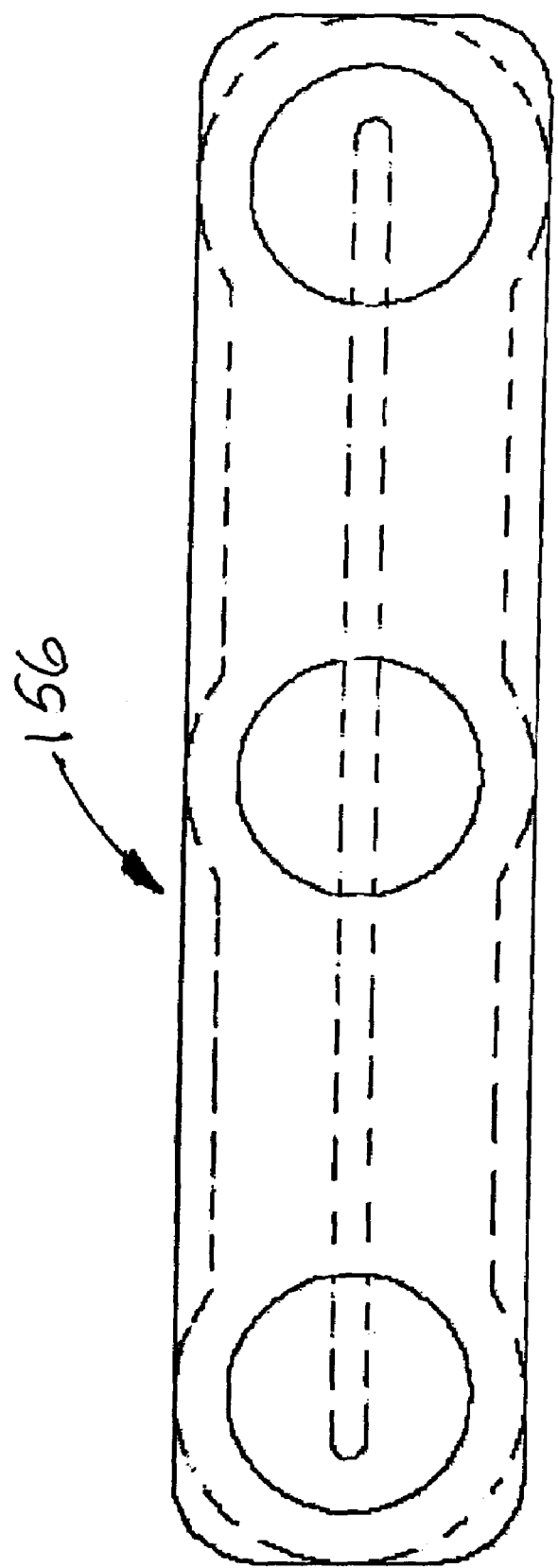
FIG. 78 is an enlarged plan view of the separate piece useful in the practice of the version shown in FIG. 74.
Figure 79:
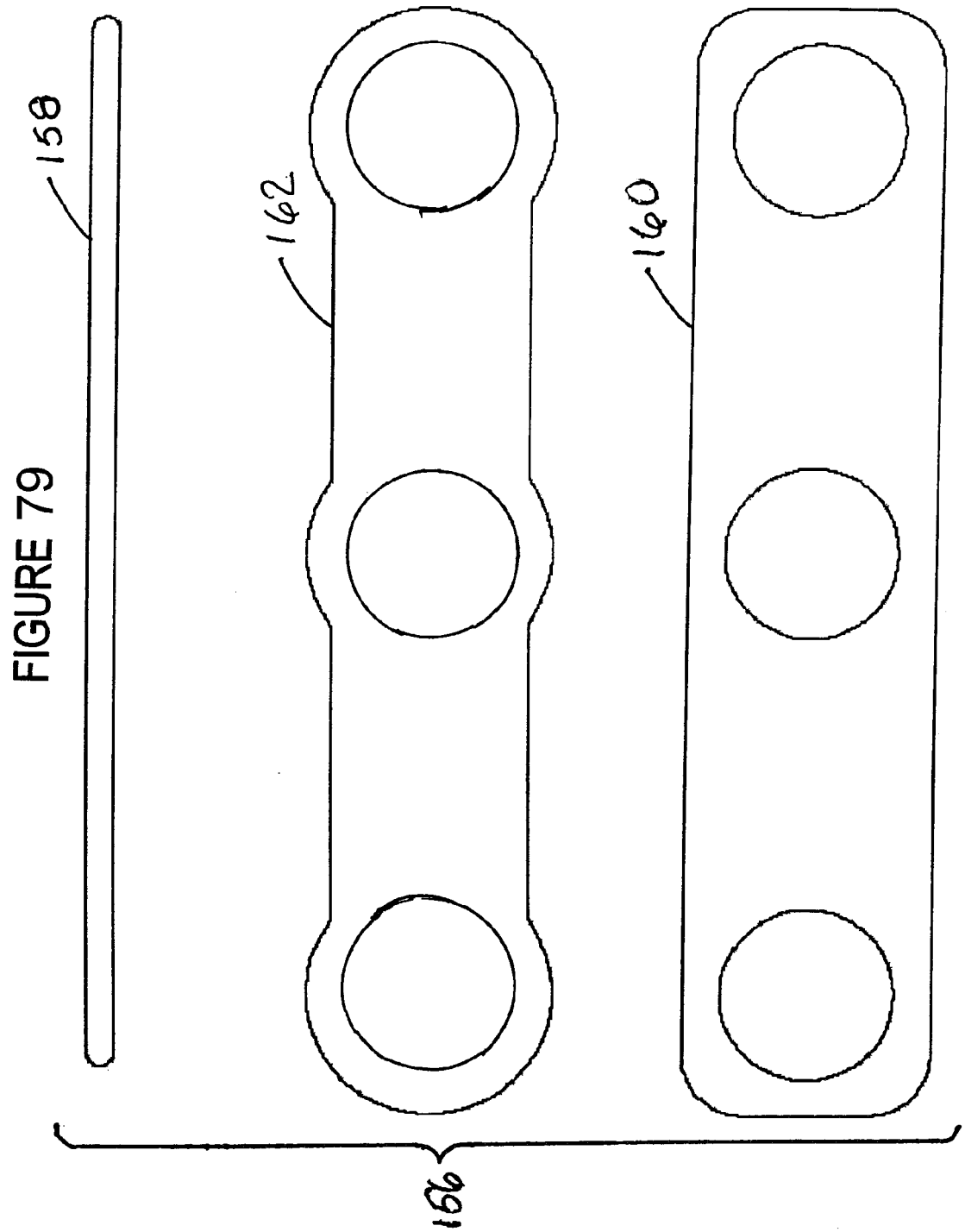
FIG. 79 is an exploded view of the layers making up the separate piece of FIG. 77.
Figure 80:
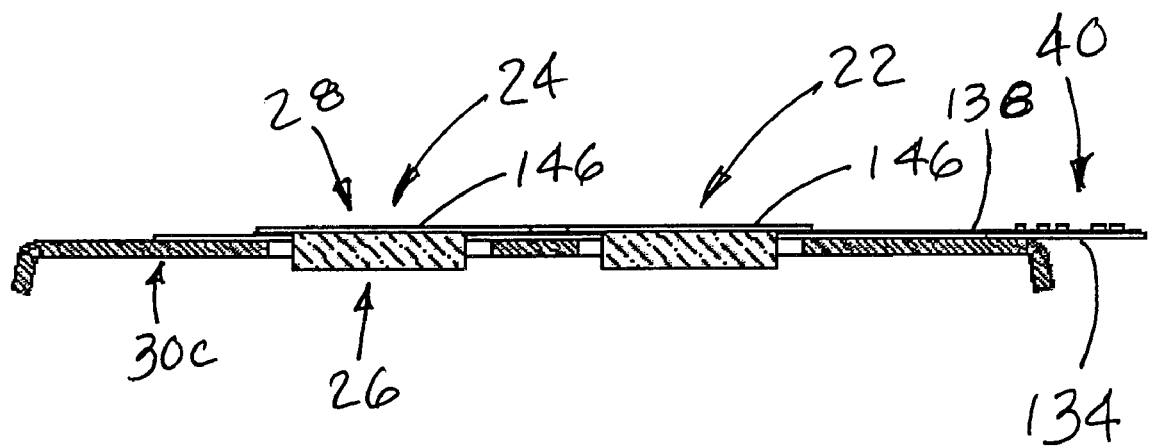
FIG. 80 is a section view along line II—II of FIG. 76.
Figure 81:
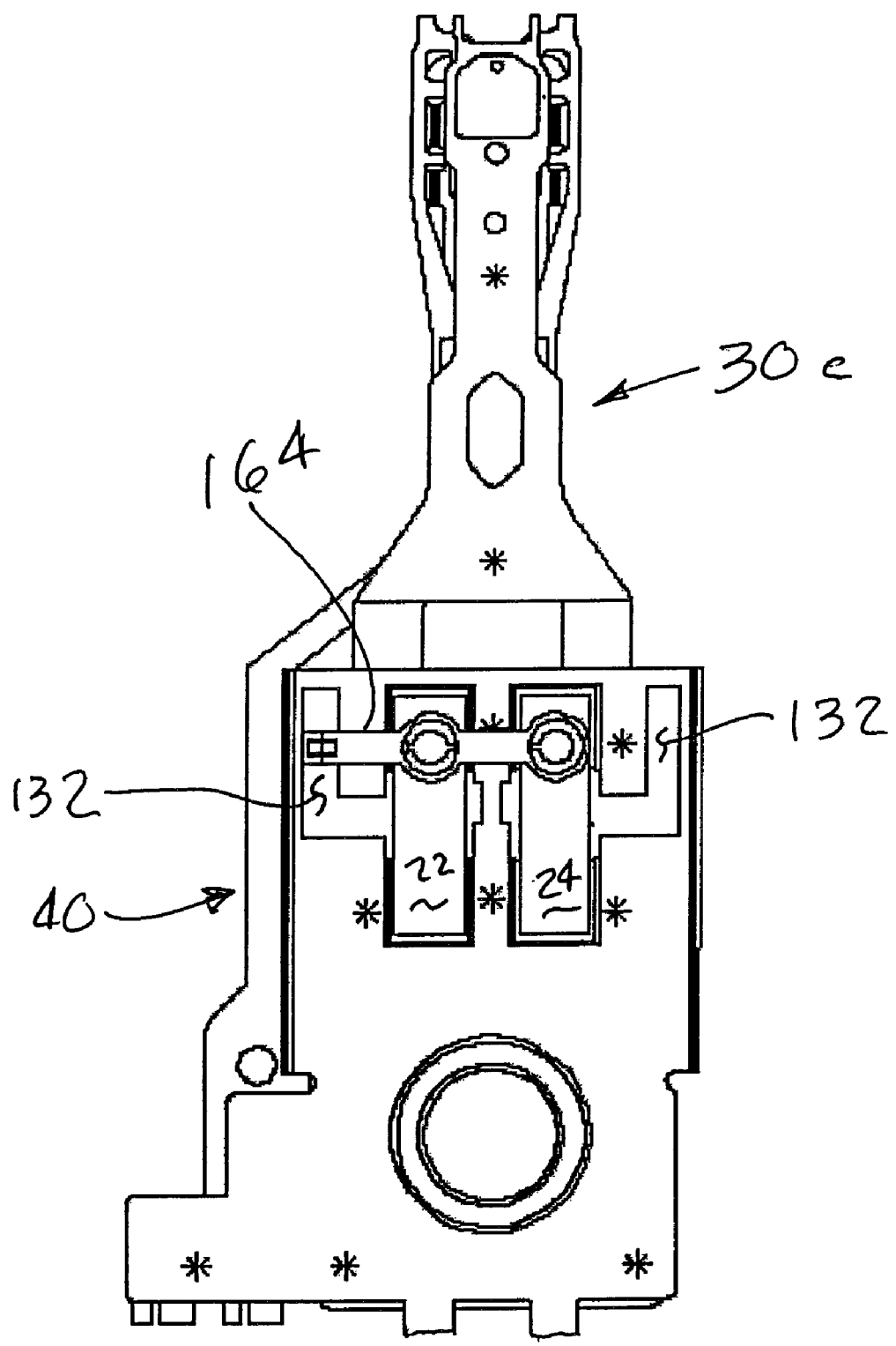
FIG. 81 is a top plan view of a third version of the third alternative embodiment wherein one side of the PZT motors is attached using solder or conductive epoxy to an extension of the conductive leads formed from the flexure material and the other side of the PZTs is bonded to conductive pads in the conductive trace layer of the flexure.
Figure 82:
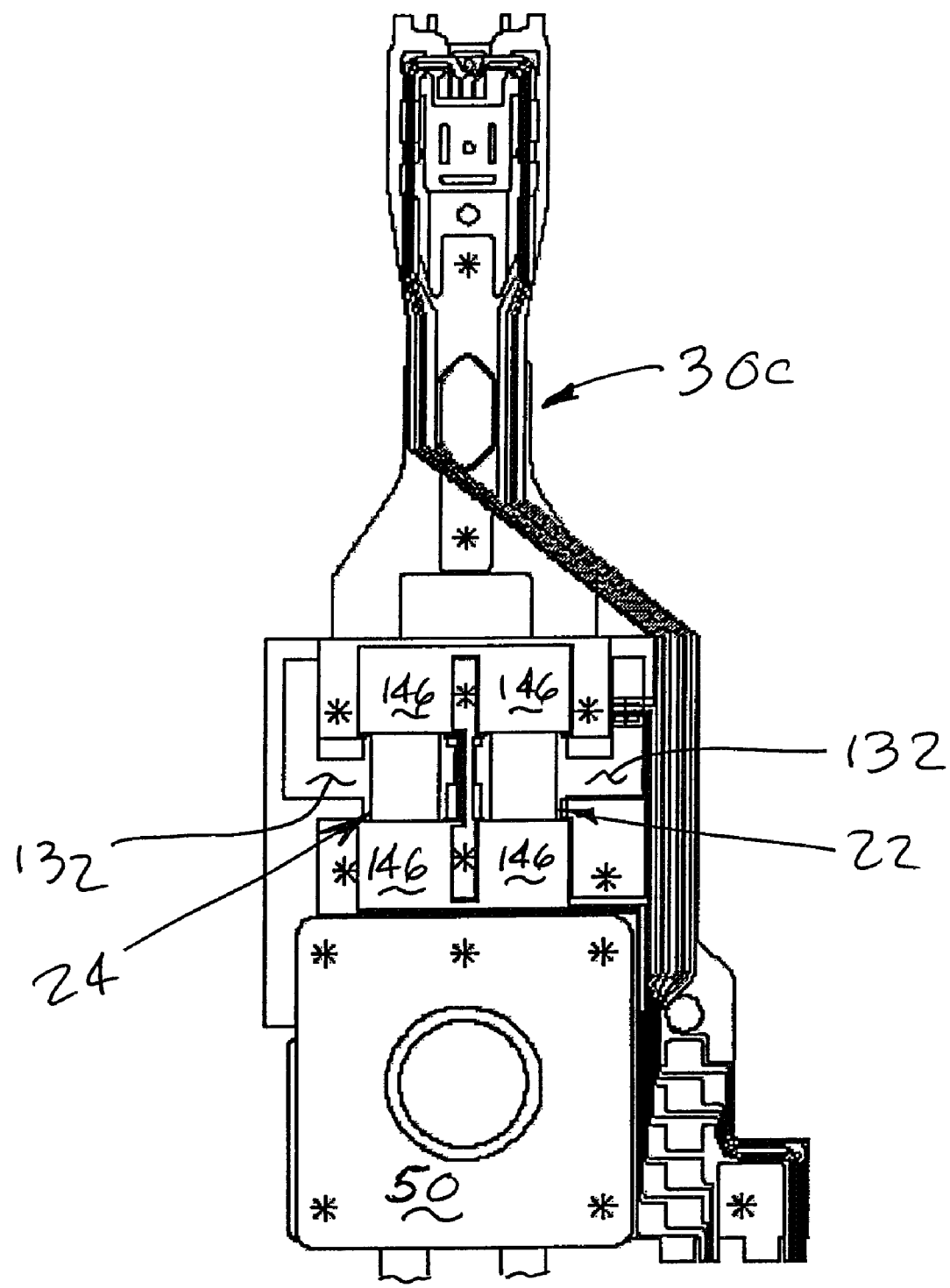
FIG. 82 is a bottom plan view of the version shown in FIG. 81.
Figure 83:
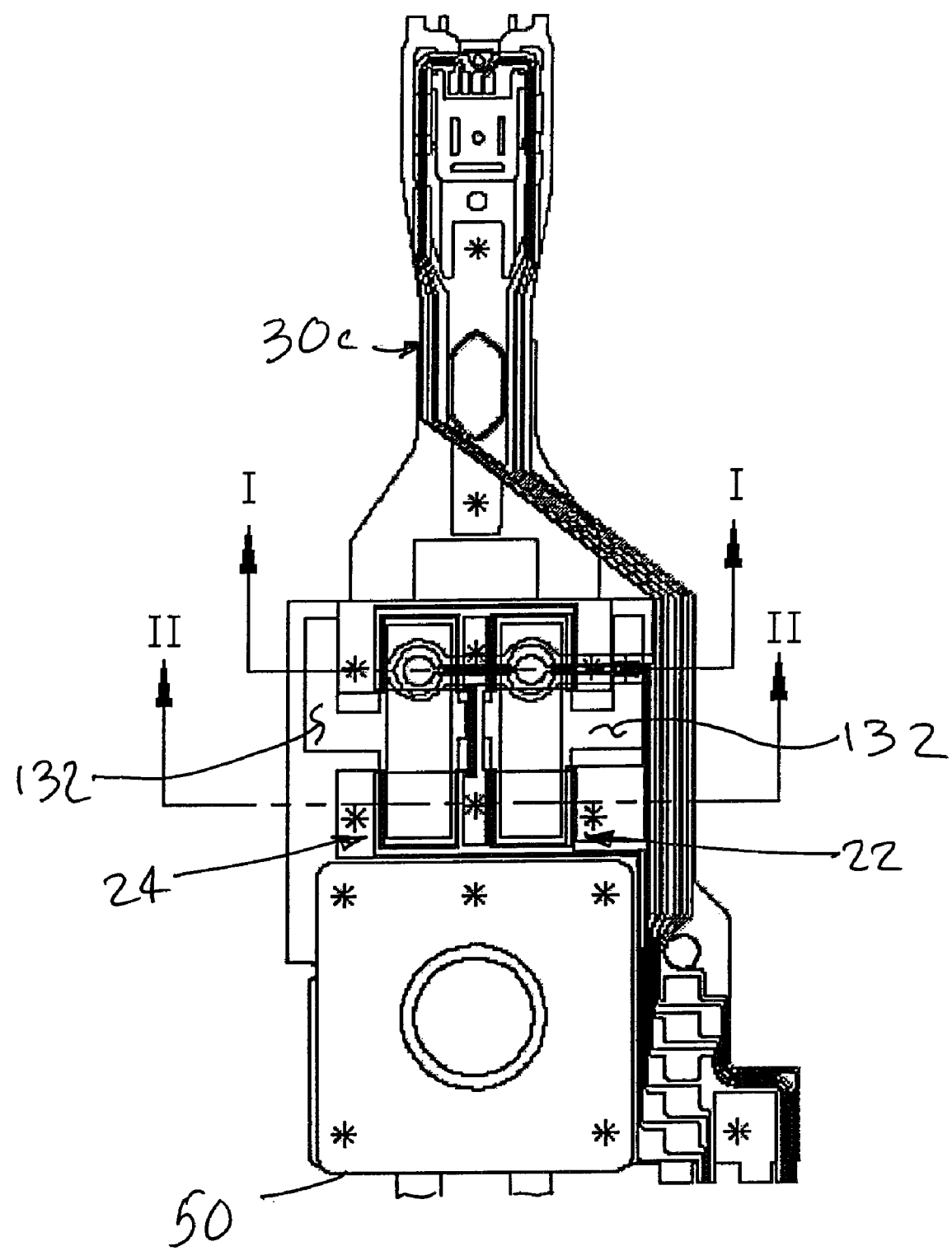
FIG. 83 is a composite view of FIGS. 81 and 82 with hidden lines shown for clarity.
Figure 84:
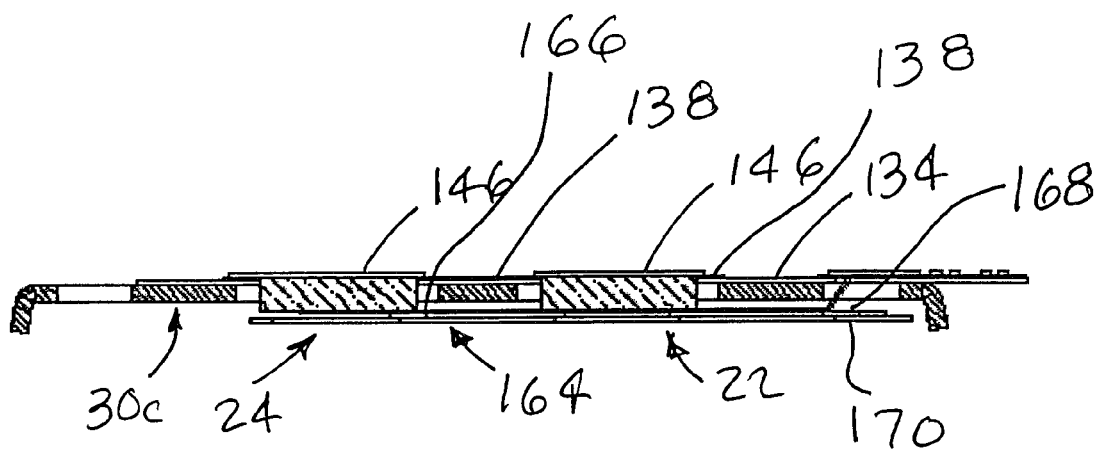
FIG. 84 is a section view along line I—I of FIG. 83.
Figure 85:
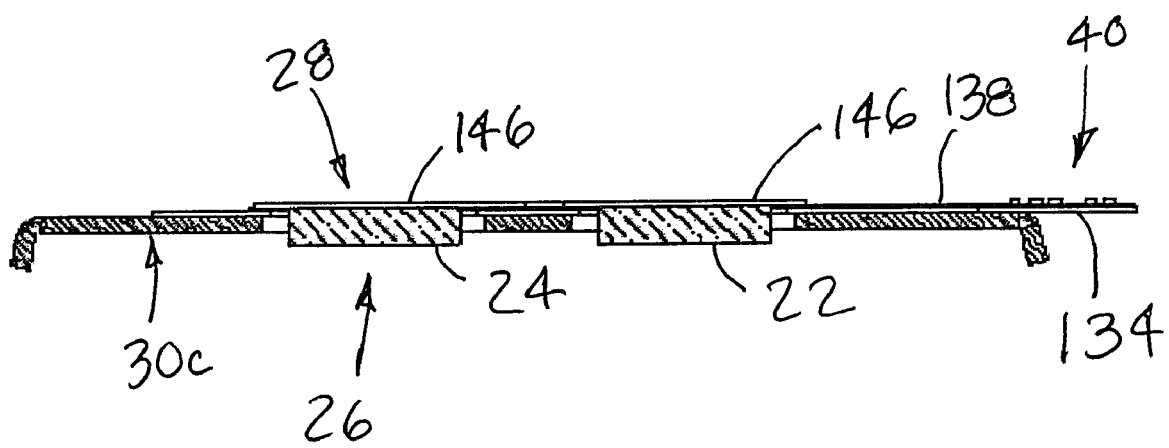
FIG. 85 is a section view along line II—II of FIG. 83.
Figure 86:
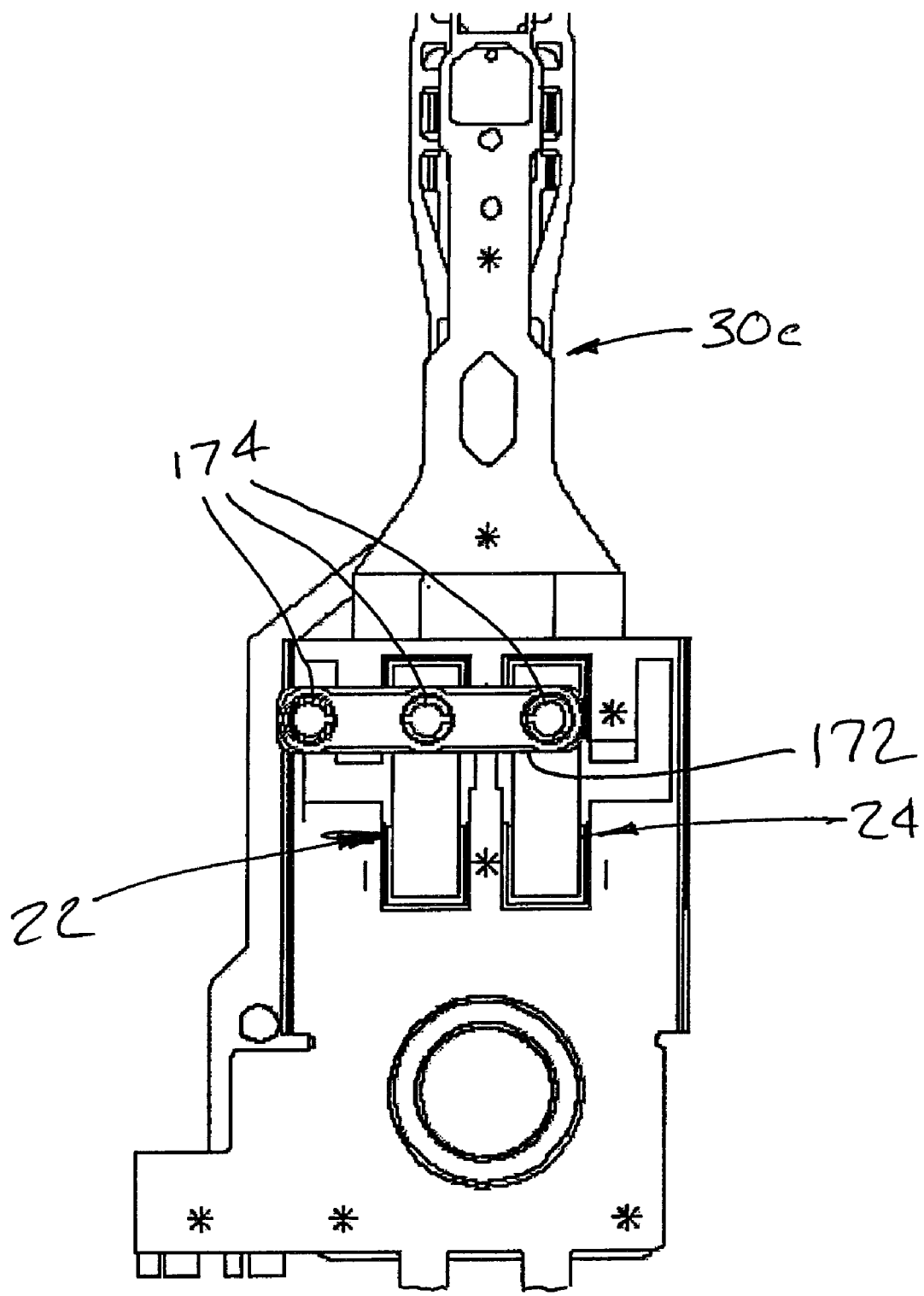
FIG. 86 is a top plan view of a fourth version of the third alternative embodiment wherein solder or epoxy connection is used with a separate piece to electrically attach the PZT motors to the conductive leads formed from the flexure material.
Figure 87:
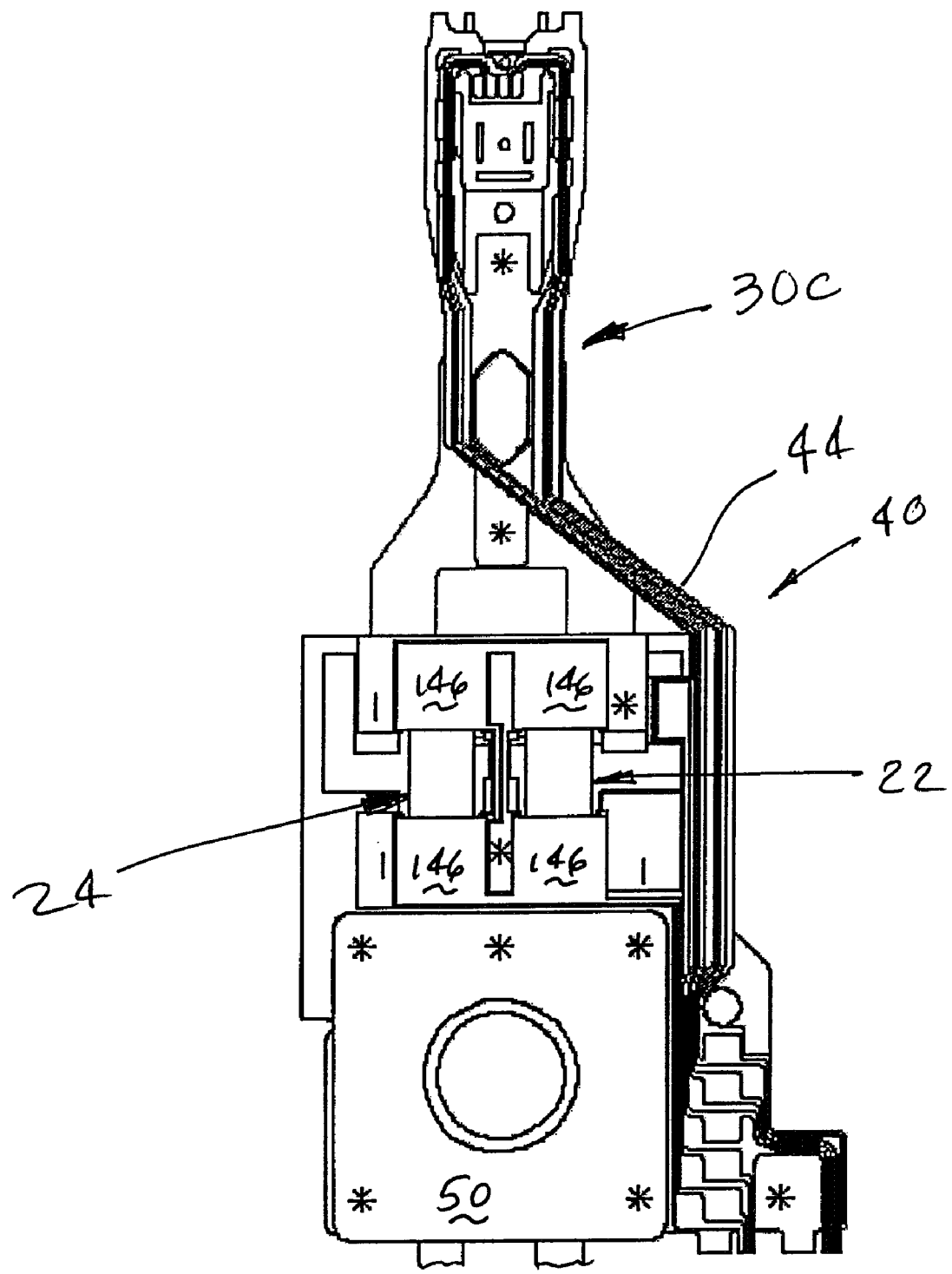
FIG. 87 is a bottom plan view of the version shown in FIG. 86.
Figure 88:
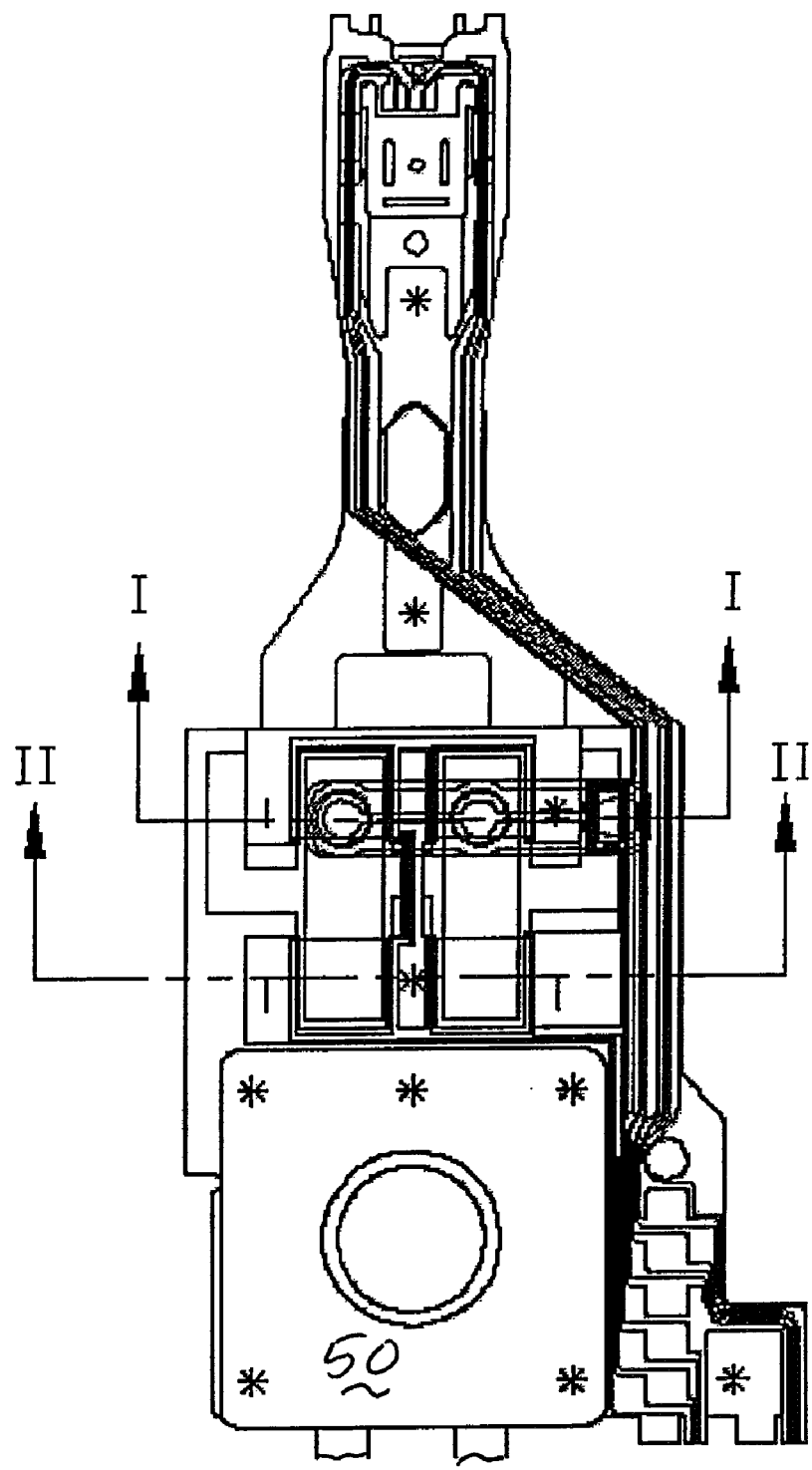
FIG. 88 is a composite view of FIGS. 86 and 87 with hidden lines shown for clarity.
Figure 89:
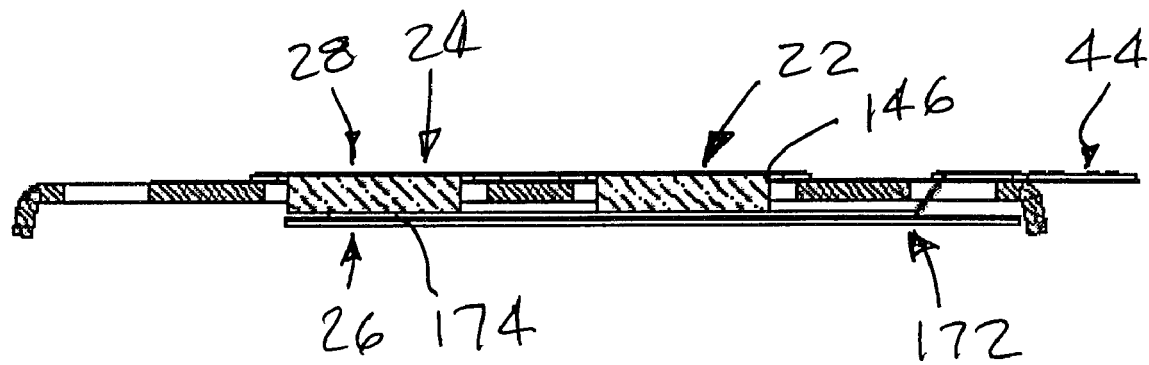
FIG. 89 is a section view along line I—I of FIG. 88.
Figure 90:
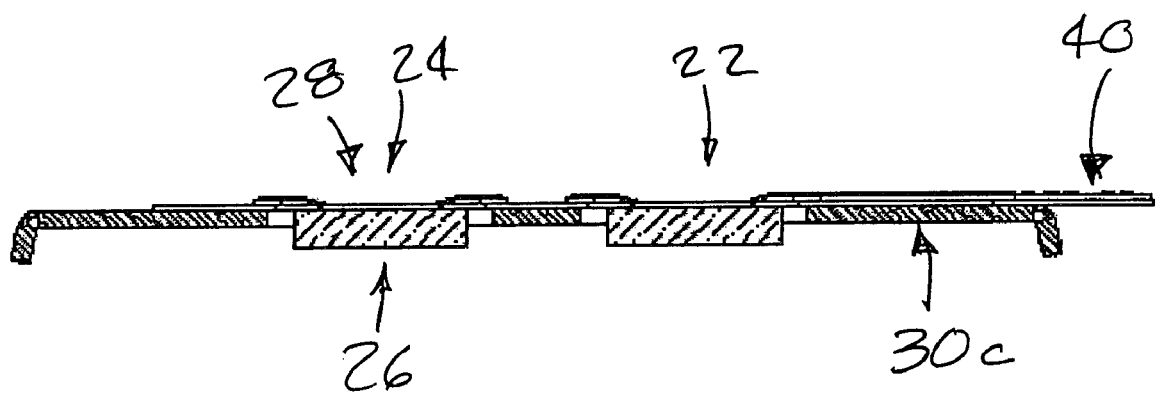
FIG. 90 is a section view along line II—II of FIG. 88.

Referring now to FIGS. 63–68, a third wire stitch alternative embodiment of the present invention with PZT motors 22, 24 mounted on the non-disk side of the suspension 20b may be seen. FIGS. 63 and 64 show the top and bottom plan views of this embodiment, and FIG. 65 is an enlarged fragmentary view of a portion of FIG. 63 showing details of the mounting arrangement for the PZT motors 22, 24 in this embodiment, but without showing the wire bond 82. FIG. 66 is a still further enlarged section view taken along line 12—12 of FIG. 65. FIG. 67 is an exploded perspective view of the suspension assembly 20b of FIG. 63, showing the PZT motors 22,24, the wire connection 82, the load beam 30c with apertures 132, a flexure metal substrate 134 with apertures 136, a dielectric layer 138 with apertures 140, a plurality of controlled amounts 142 of conductive epoxy, a conductive trace and pad layer 144 having a plurality of conductive pads 146 and a wire bond pad 148, and a mounting plate 50. As may be seen most clearly with respect to FIG. 67, the surface 28 of each of the PZT motors 22, 24 is mechanically mounted on the conductive pads 146 in the conductive trace layer 144 using a discrete amount of conductive epoxy 142, thus also providing an electrical connection to the surface 28 of the PZT motors 22 and 24. The mechanical and electrical connection is enabled by the apertures 132, 136, 140 aligned with the PZT motors in each of the load beam 30c, flexure metal substrate 134, and dielectric layer 138. The wire bond 82 makes an electrical connection between the wire bond pad 148 in the conductive layer 144 and the surface 26 of the PZT motors 22 and 24. FIG. 68 is a perspective view of the suspension assembly 20b of this embodiment. As may be most clearly seen in FIG. 66, the mechanical connection between the PZT motors and the load beam is via the respective overlaps between the conductive pads 146, the dielectric layer 138 and the metal substrate 134 of the flexure, it being understood that in this embodiment the flexure 40 is made up of at least the flexure metal substrate 134, the dielectric (insulating) layer 138 and the conductive trace layer 144. It may thus be seen that the force developed by the PZT's is transferred first via conductive epoxy 142 to the conductive pads 146, and then through the dielectric layer 138 to the flexure metal substrate 134. The force is then transferred from the metal substrate 134 to the load beam 30c via a plurality of 6 laser welds, indicated by the asterisks ("*") 150 in FIG. 64.

This embodiment is similar to the previous (second) wire stitch embodiment with the PZT motors 22, 24 bonded to pads 146 (which may be gold plated copper) on the flexure 40 except on the non-disk side of the suspension. The PZT motors 22 and 24 are each placed through appropriately sized apertures 132, 136 and 140 in the load beam and the flexure substrate and dielectric layers before being bonded to the pads 146 of the conductive trace layer 144. The bonding is accomplished using a conventional conductive adhesive 142. As has been described, the remaining electrical connection to the PZT is completed using an ultrasonically bonded wire 82 (which may be gold) on the non-disk side of the suspension. As may be seen most clearly in FIGS. 66 and 68, this concept also has the benefit of bringing the motors more "in-plane" with the structure (i.e., into closer alignment with the primary plane 83 of the overall suspension assembly) to minimize gram share (the amount of gram load carried by each individual PZT).

It is to be understood to be within the scope of the present invention to provide an assembly having only one PZT motor. Furthermore, it is within the present invention to use ultrasonic bonding of conductive leads formed as extensions from the flexure material as shown in FIGS. 69–73 or to use ultrasonic bonding of conductive leads formed from an additional add-on component as shown in FIGS. 74–80 to make the electrical connection to the PZT motor. Additionally, it is within the present invention to use conductive epoxy or solder as shown in FIGS. 81–85 to attach conductive leads formed from the flexure material or from an additional add-on component shown in FIGS. 86–90 to make the electrical connection to the PZT motor.

Referring now most particularly to FIGS. 69 through 73, a version similar to the third wire stitch version of the present invention may be seen in which a lead extension 152 replaces the wire bond or stitch 82. Lead extension 152 is a part of the flexure 40 and the conductive trace 154 in extension 152 is ultrasonically bonded to the PZTs 22, 24.

Referring now to FIGS. 74–80, another version in which ultrasonic bonding is used with a separate piece of material 156 to from the connection to surface 26 of the PZTs 22 and 24. The separate piece 156 is formed of a laminate of a conductive layer 158, a dielectric layer 160, and a stainless steel substrate layer 162.

In FIGS. 81 through 85, a version using solder to connect the PZTs with a lead extension 164 may be seen. Lead extension 164 is formed of the three layer laminate of flexure 40, including a conductive layer 166, a dielectric layer 168, and a supporting substrate 170 of stainless steel.

Referring now to FIGS. 86 through 90, a version similar to that of FIGS. 74–80 may be seen in which a separate piece 172 is used similar to 156, except that there are enlarged circular pads 174 in the conductive layer 158 to allow attachment using solder or conductive epoxy.

Figure 91:
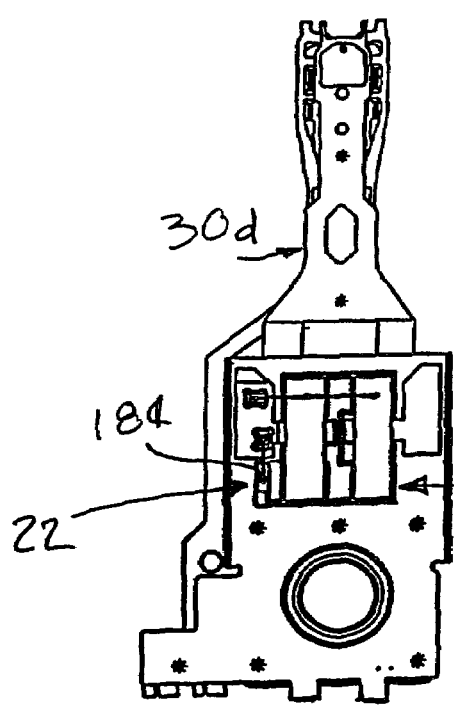
FIG. 91 shows a top plan view of a fourth embodiment having a prefabricated motor subassembly.
Figure 92:
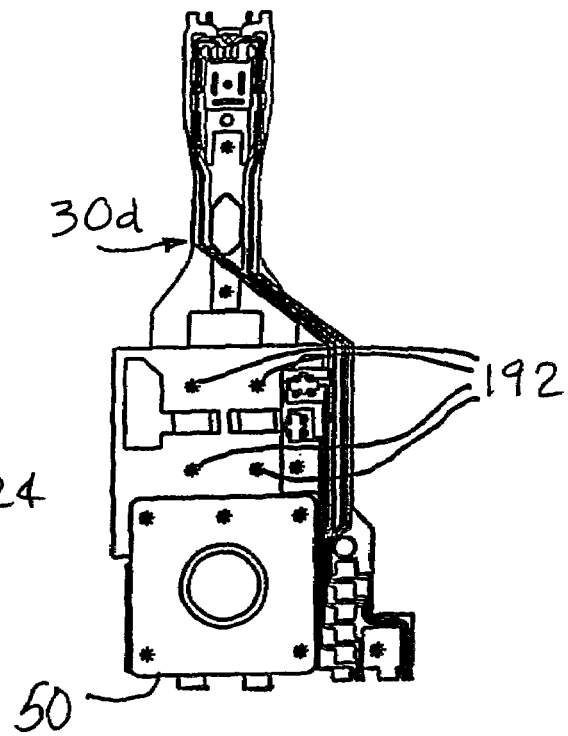
FIG. 92 shows a bottom plan view of the embodiment of FIG. 91.
Figure 93:
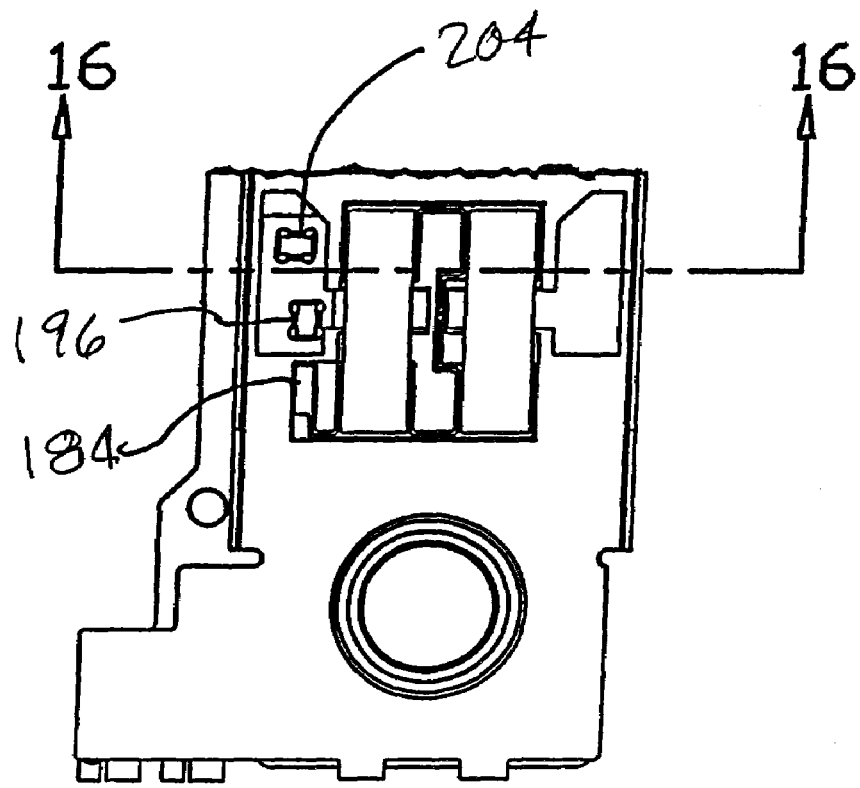
FIG. 93 is an enlarged fragmentary view of a portion of FIG. 91.
Figure 94:
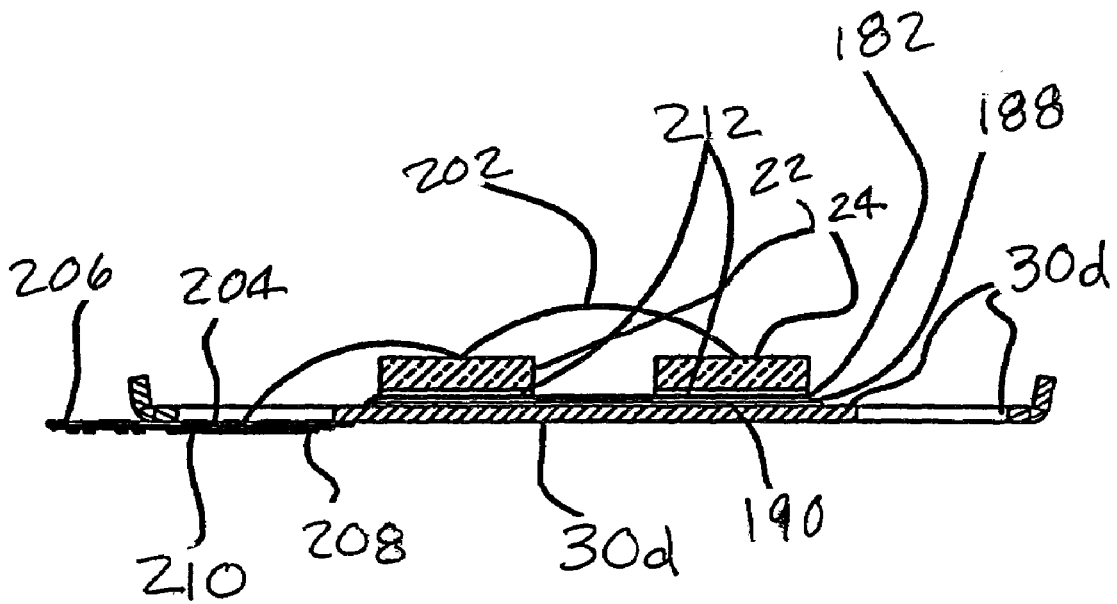
FIG. 94 is an enlarged section view taken along line 16—16 of FIG. 93.
Figure 95:
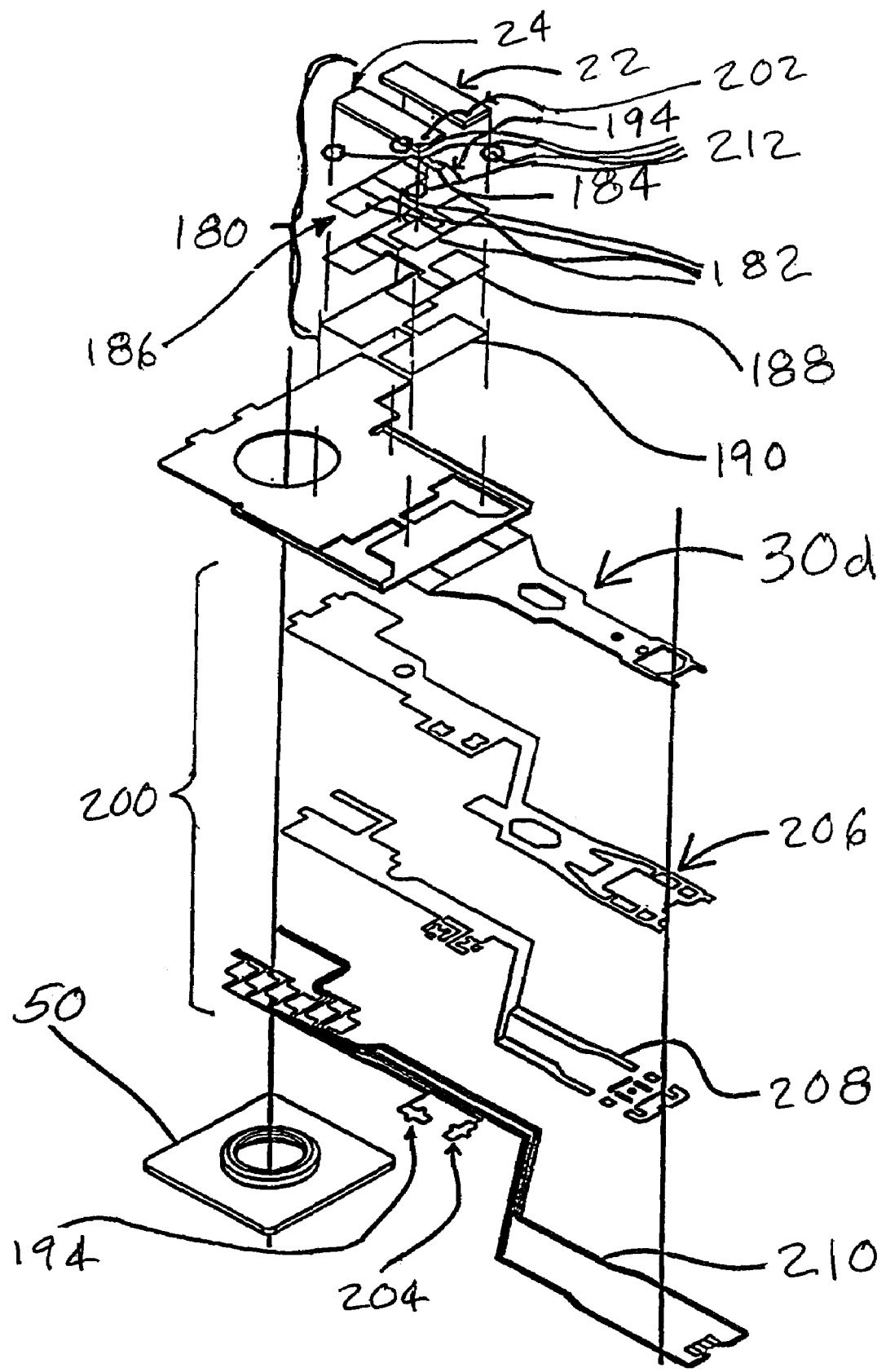
FIG. 95 shows an exploded view of the prefabricated motor subassembly and head suspension assembly of which it forms a part.
Figure 96:
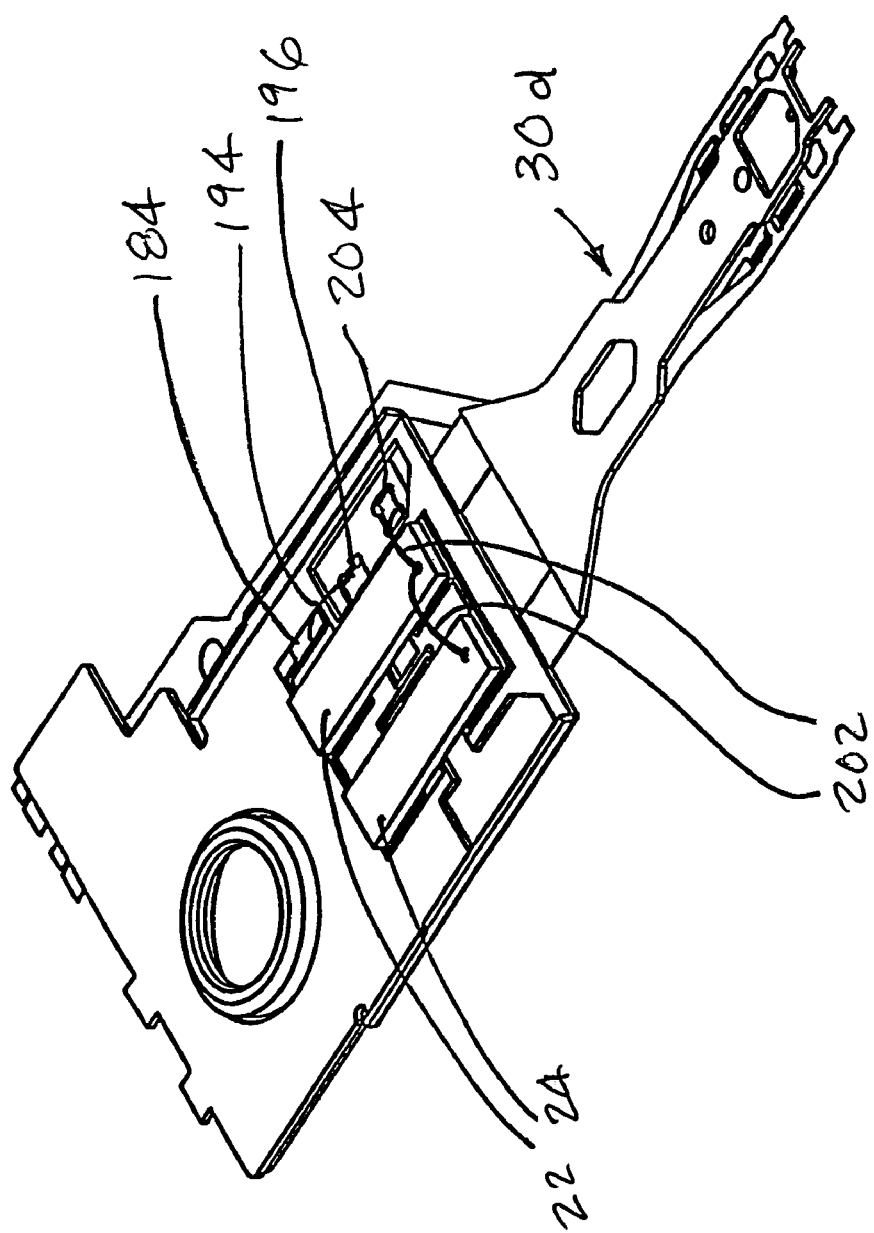
FIG. 96 shows a perspective assembly view of the embodiment of FIG. 95.
Figure 97:
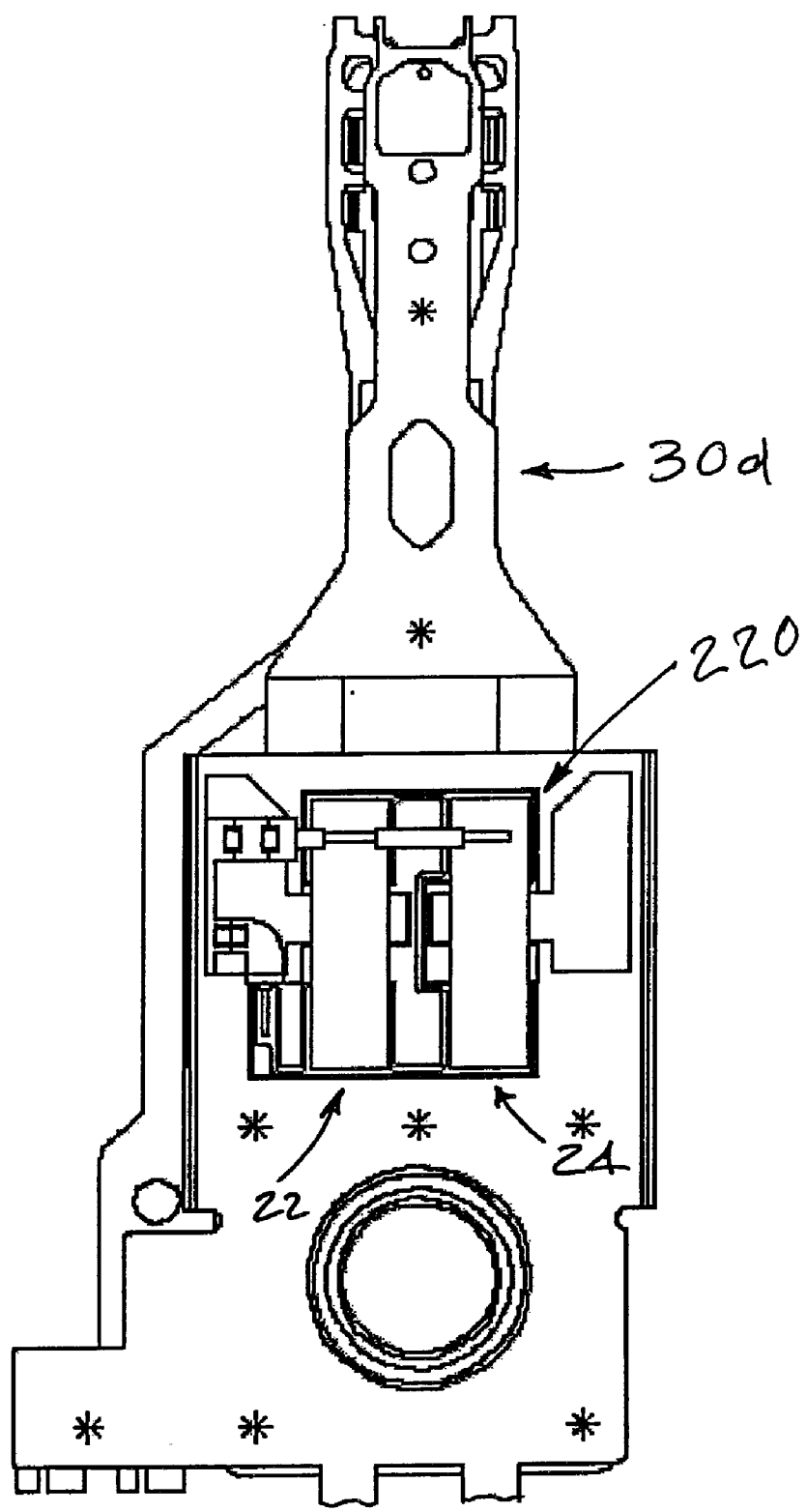
FIG. 97 is a top plan view of a first version of a fourth alternative embodiment wherein the PZT motors in a prefabricated subassembly are ultrasonically bonded to extensions of the conductive leads formed from the flexure material.
Figure 98:
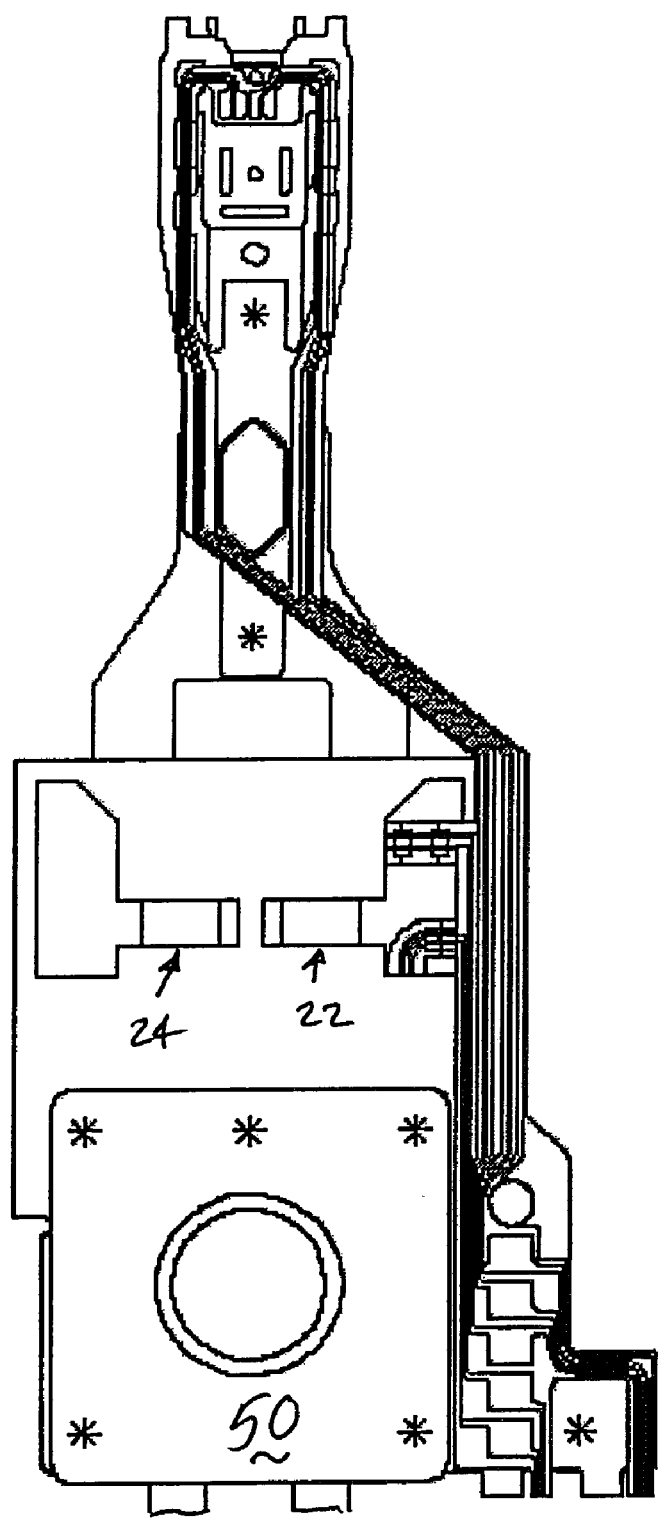
FIG. 98 is a bottom plan view of the version shown in FIG. 97.
Figure 99:
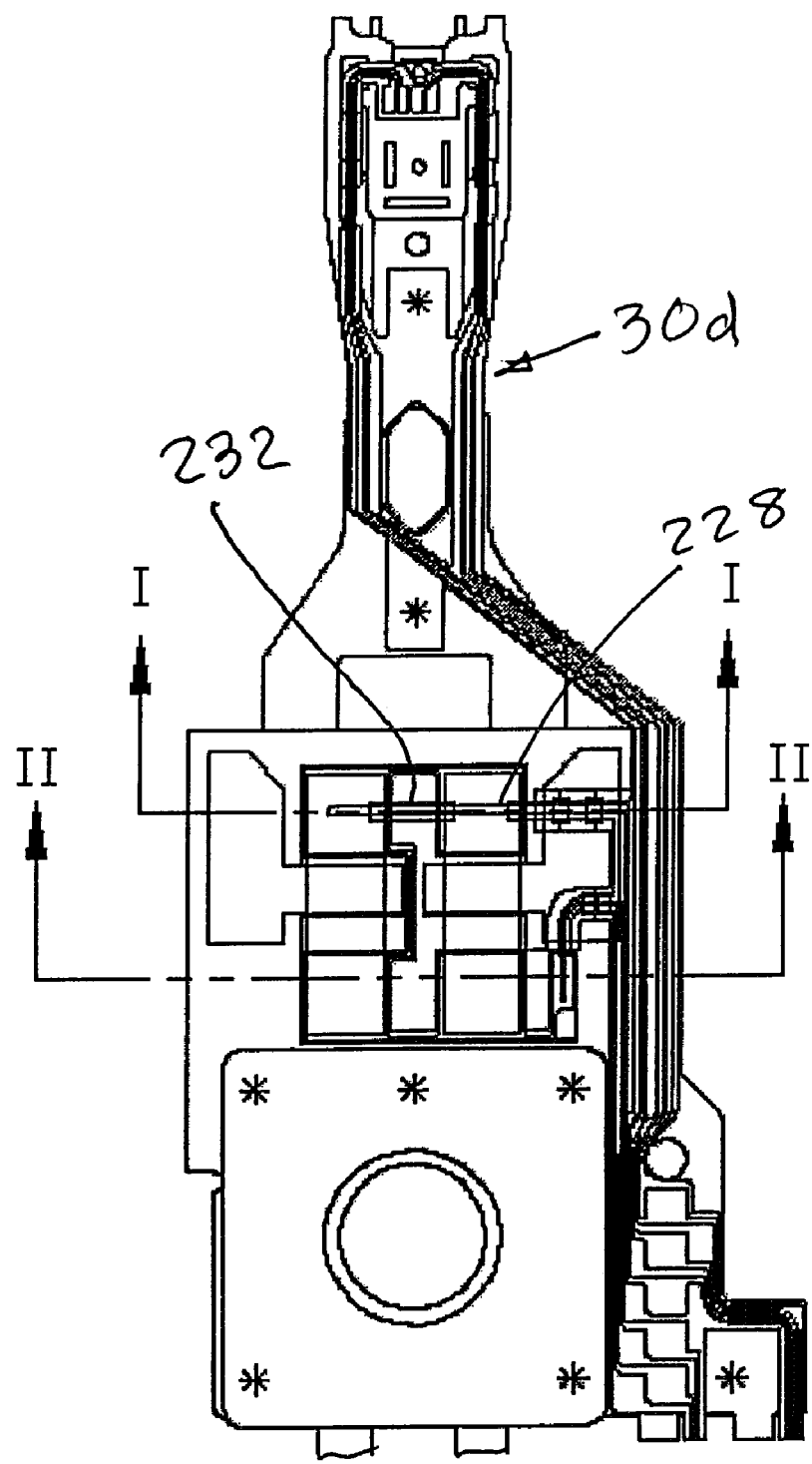
FIG. 99 is a composite view of FIGS. 97 and 98 with hidden lines shown for clarity.

Referring now to FIGS. 91–96, a fourth alternative embodiment of the wire stitch version of the present invention may be seen. This embodiment has a prefabricated PZT motor subassembly 180 mounted on and forming part of the head suspension assembly. FIGS. 91 and 92 show the top and bottom plan views of this embodiment, and FIG. 93 is an enlarged fragmentary view of a portion of FIG. 91 showing details of the mounting arrangement for the PZT motors 22, 24 in this embodiment, except omitting the wire bonds. FIG. 94 is an enlarged section view taken along line 16—16 of FIG. 95 and showing the wire bond to the PZTs. In this embodiment the pre-fabricated motor subassembly has PZT motors 22 and 24 already attached to conductive pads 182 similar to pads 146 and which are connected to a separate termination pad 184 on the motor subassembly 180. The PZT motor subassembly 180 includes the PZT elements 22 and 24, a motor conductive pad layer 186 with the motor termination pad 184 connected to the conductive pads 182 (for connection to the bottom surface 28 of the PZT elements 22, 24), a motor insulator layer 188, and a motor metal substrate layer 190. The motor subassembly 180 is preferably assembled first, and then installed (preferably by weld attachment at weld points 192 [indicated by the asterisks "*" in FIG. 92] to the load beam 30d of the suspension). Alternatively, the motor subassembly 180 may be attached to the load beam 30d by adhesive. After the motor subassembly is mechanically or structurally attached to the suspension, a first ultrasonic wire bond 194 is completed from the first wire bond pad 196 in the conductive trace layer 198 of the suspension flexure 200 to the motor subassembly termination pad 184, and a second ultrasonic wire bond 202 is completed from the second wire bond pad 204 to the top surface 26 of both PZT motors 22 and 24 to complete the electrical connections to the motor subassembly 180. FIGS. 95 and 96 show, respectively, an exploded view and a perspective assembly view of the prefabricated motor subassembly and head suspension assembly to which it is attached. This version has a flexure substrate 206, a dielectric layer 208, and a conductive trace layer 210. Conductive epoxy 212 is used to bond the surface 28 of the PZTs 22 and 24 to the motor conductive pads 182.

It is within the present invention to have a separate motor subassembly which uses ultrasonic bonding of conductive leads formed from the flexure material as shown in FIGS. 97–106 or to use ultrasonic bonding of conductive leads formed from an additional add-on component as shown in FIGS. 107–112 to make the electrical connection to the PZT motor. Additionally, it is within the present invention to use conductive epoxy or solder as shown in FIGS. 113–118 to attach conductive leads formed from the flexure material or from an additional add-on component shown in FIGS. 119–124 to make the electrical connection to the PZT motor in a separate subassembly similar to subassembly 180 used with the wire stitch attachment described previously.

Figure 100:
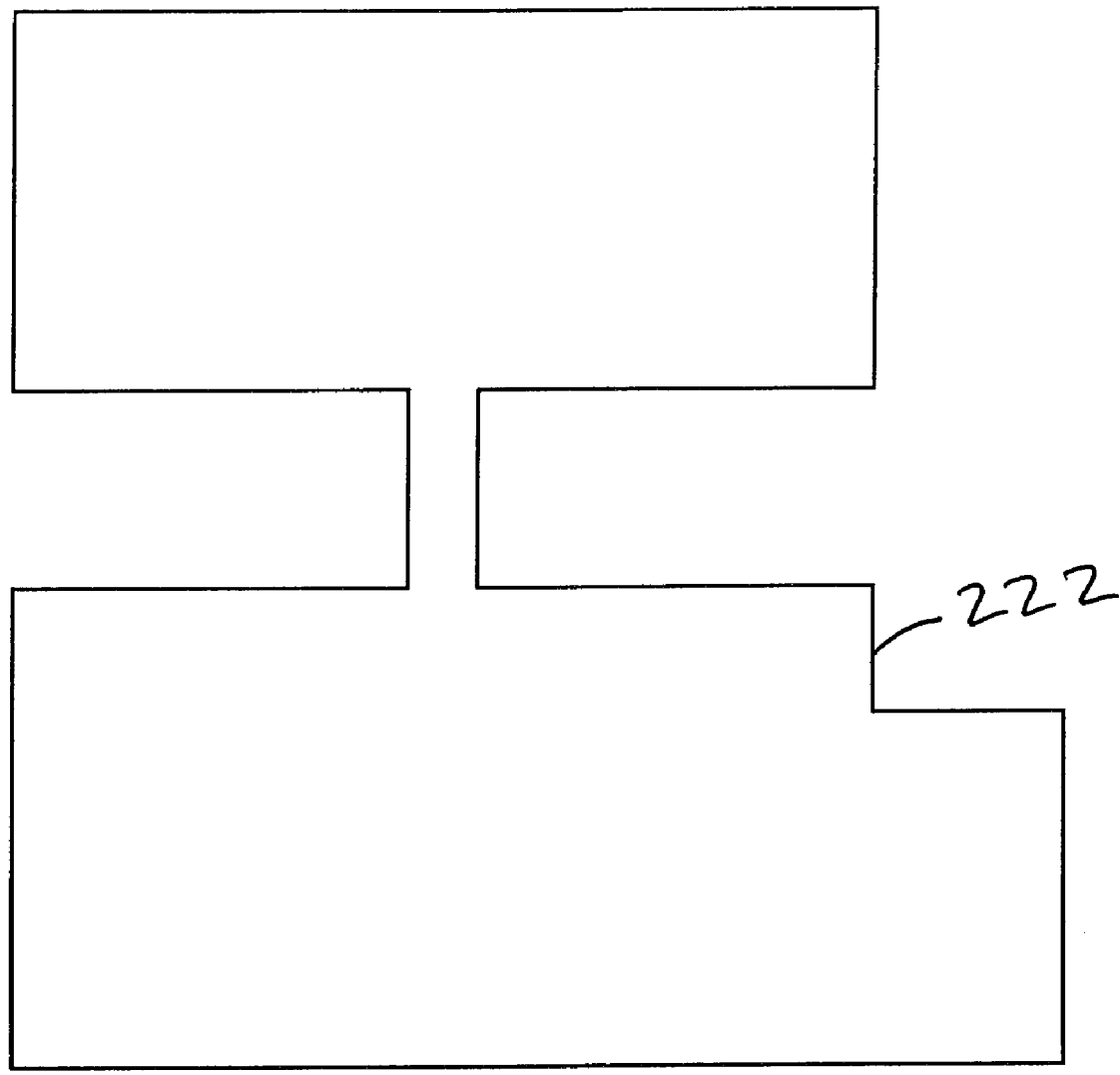
FIG. 100 is an enlarged plan view of a motor subassembly metal substrate from FIG. 97.
Figure 101:
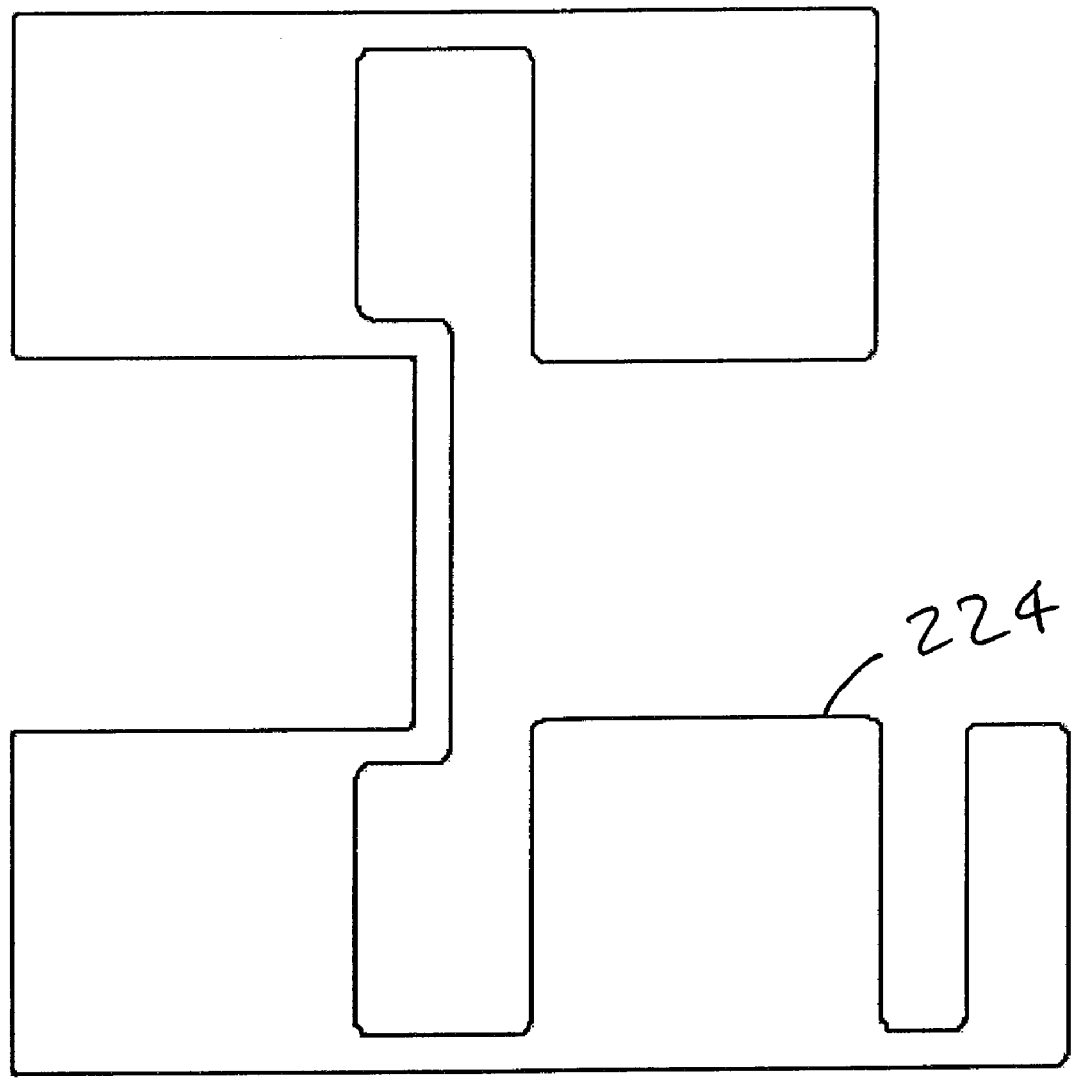
FIG. 101 is a plan view of a dielectric layer for the motor subassembly of FIG. 97.
Figure 102:
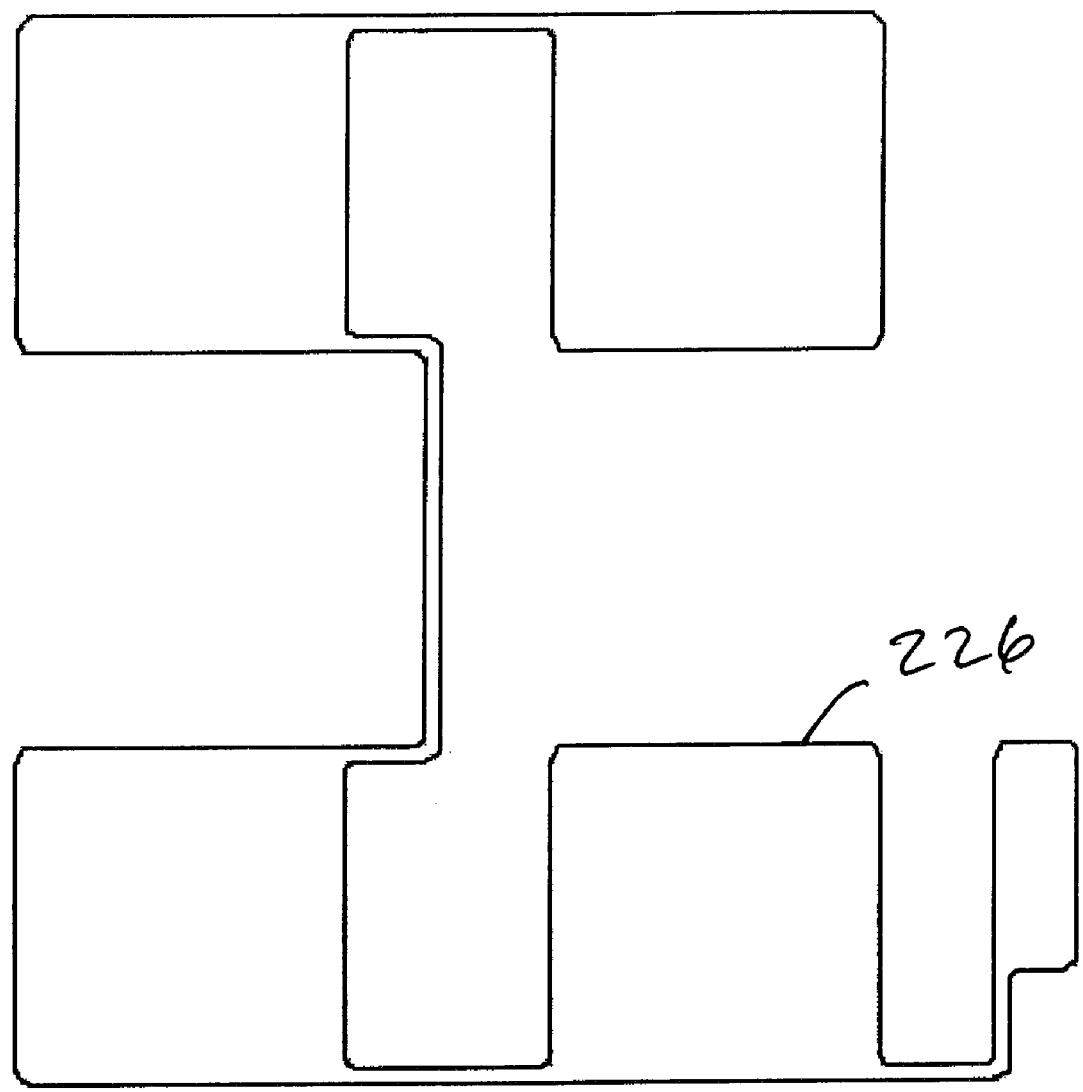
FIG. 102 is a plan view of a conductive pad layer for the motor subassembly of FIG. 97.
Figure 103:
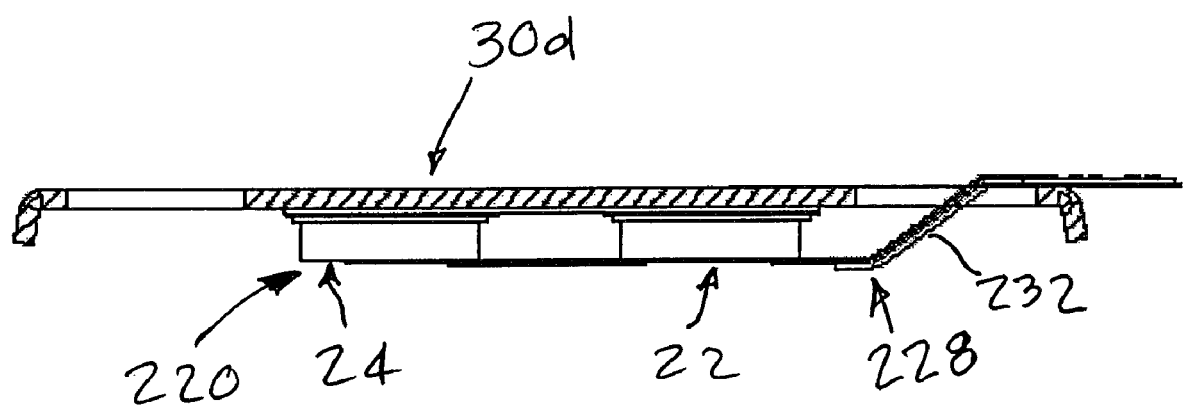
FIG. 103 is a section view along line I—I of FIG. 99.
Figure 104:
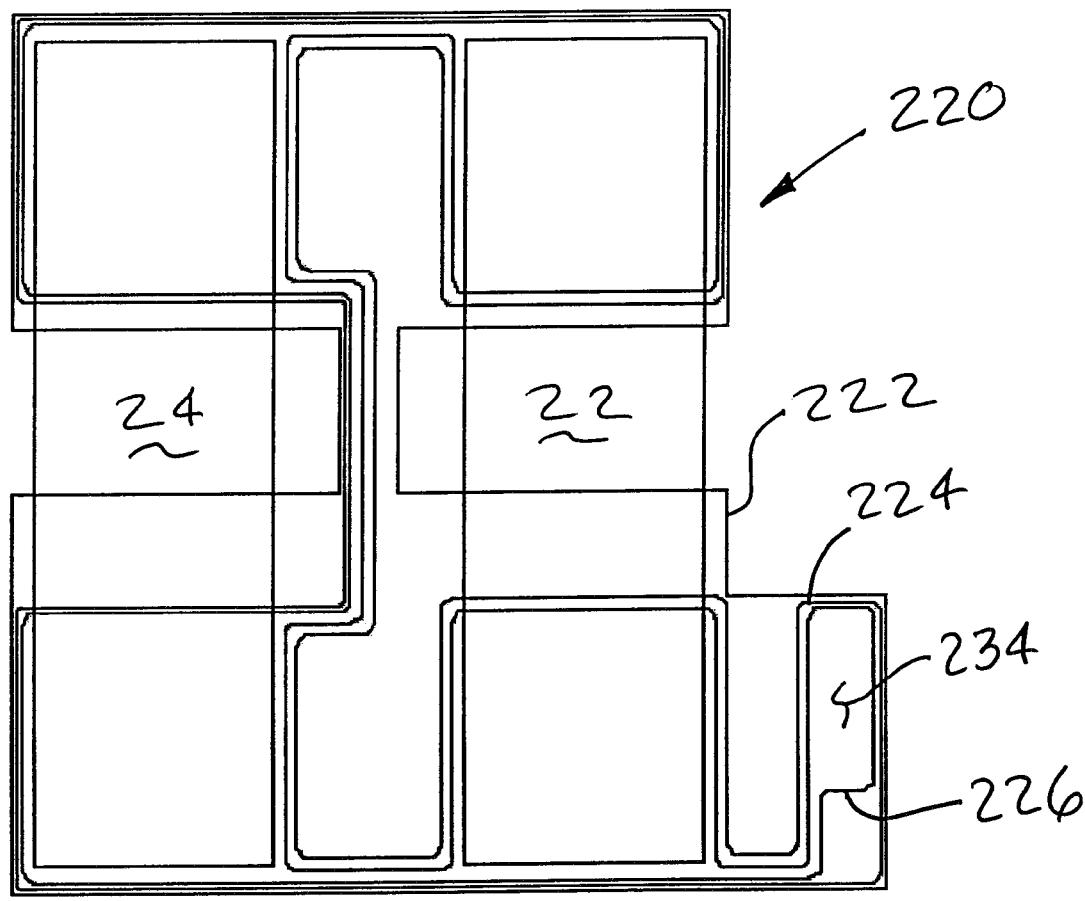
FIG. 104 is an enlarged plan view of a composite or wireform drawing (with hidden lines shown for clarity) of the metal substrate of FIG. 100, together with the dielectric layer of FIG. 101 and the conductive pad layer of FIG. 102.
Figure 105:
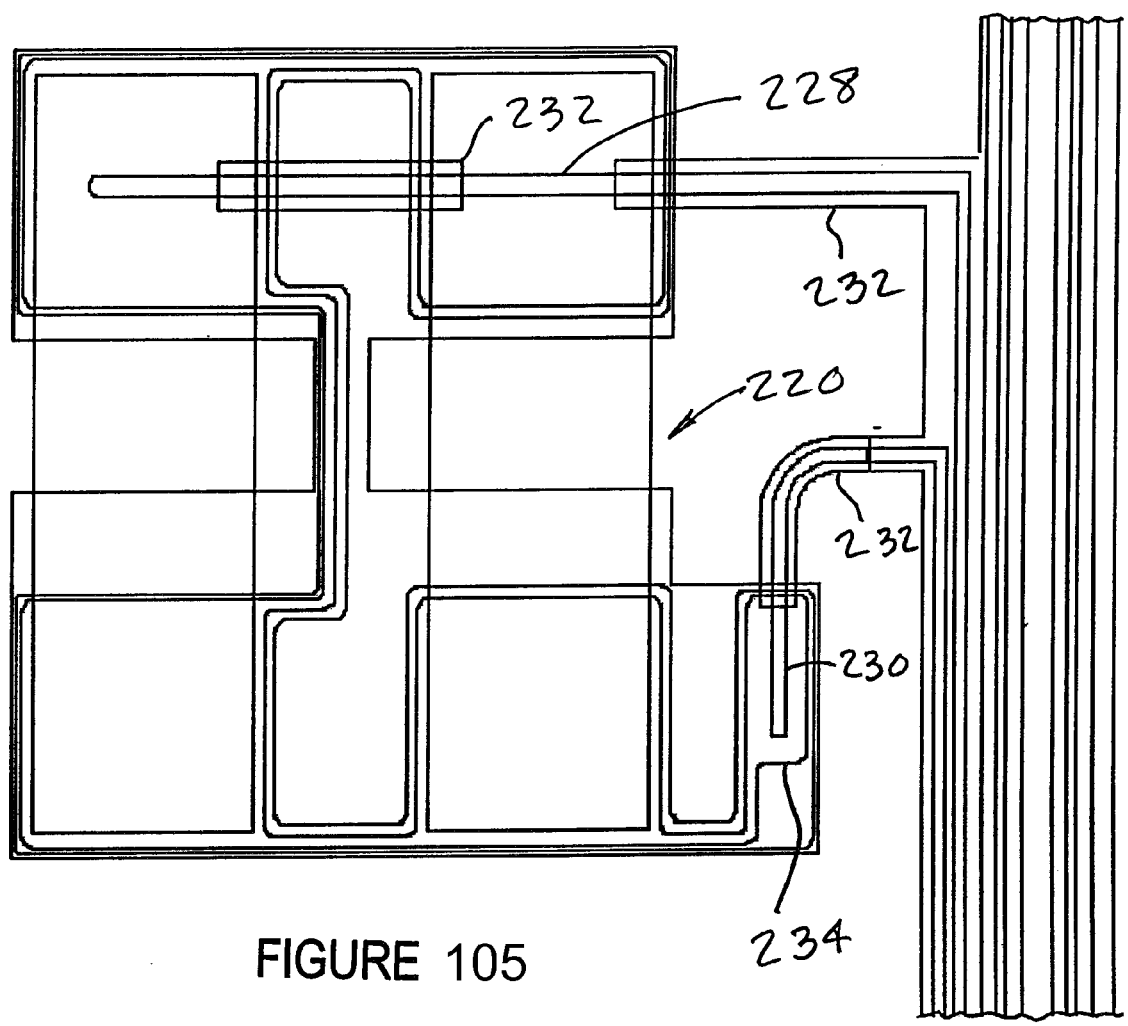
FIG. 105 is an enlarged plan view similar to that of FIG. 104, except showing the lead extensions and a portion of the dielectric layer from the flexure.
Figure 106:
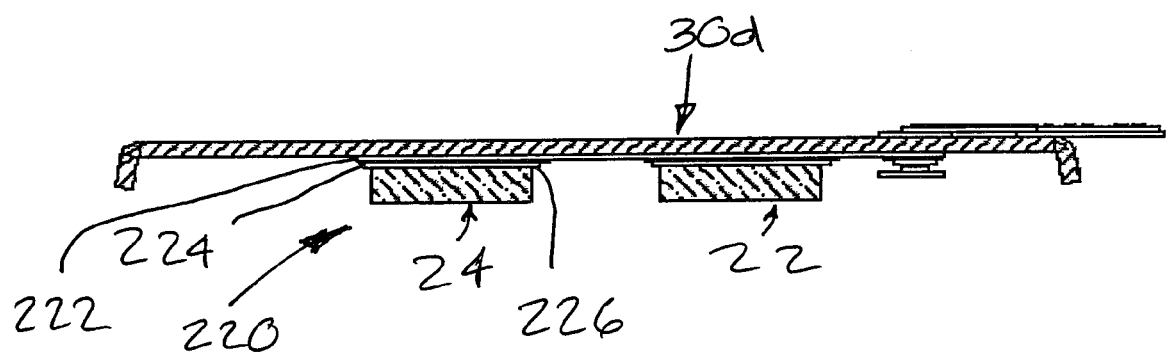
FIG. 106 is a section view along line II—II of FIG. 99.
Figure 107:
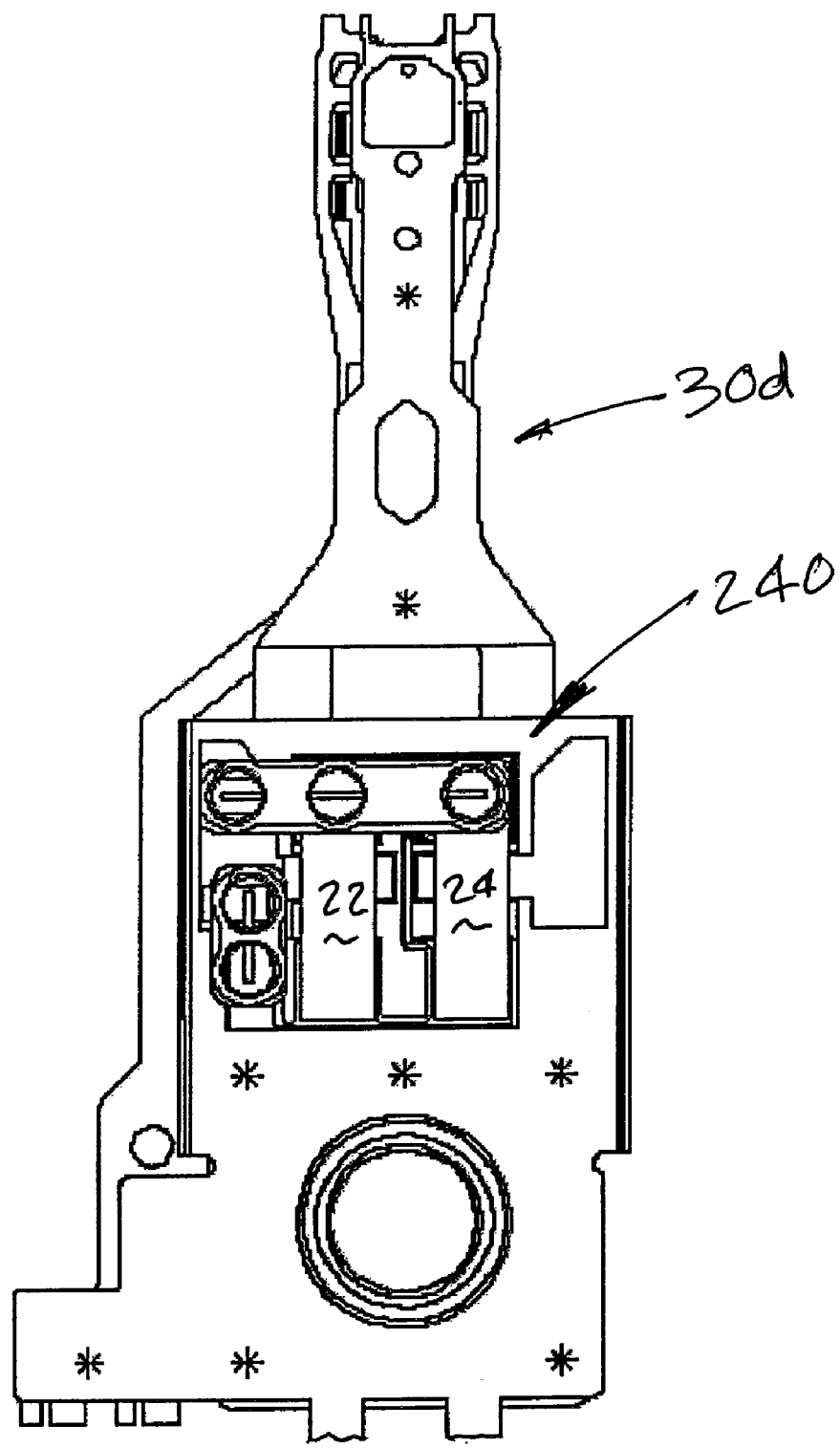
FIG. 107 is a top plan view of a second version of the fourth alternative embodiment wherein ultrasonic bonding using a pair of extra pieces electrically attach the PZT motors to the conductive leads formed from the flexure material.
Figure 108:
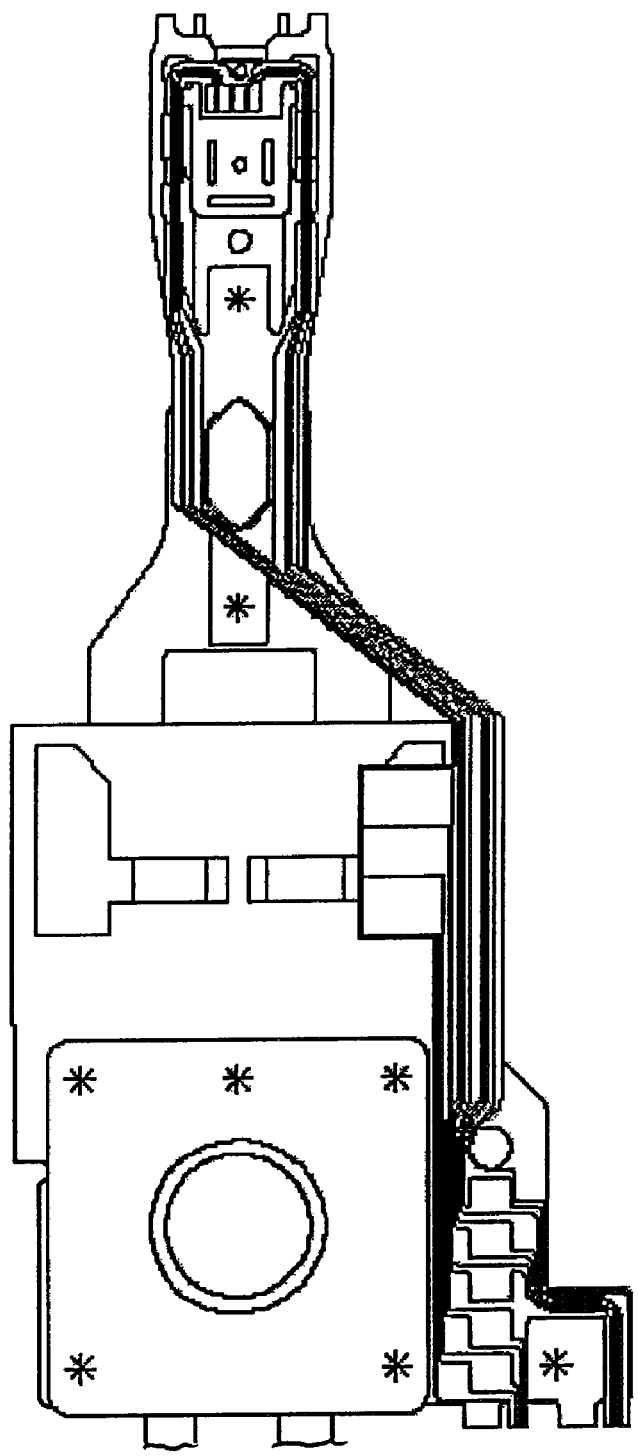
FIG. 108 is a bottom plan view of the version shown in FIG. 107.
Figure 109:
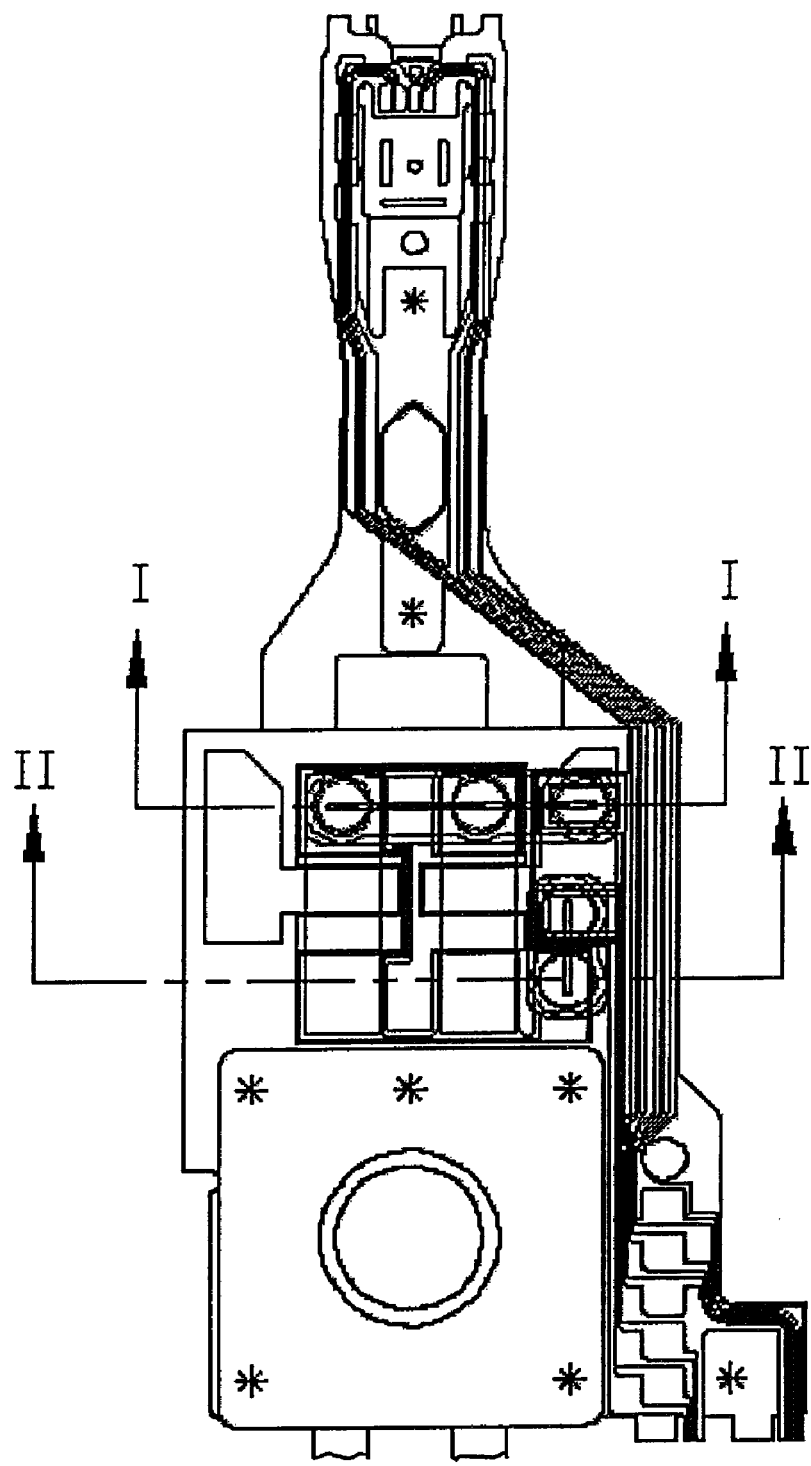
FIG. 109 is a composite view of FIGS. 107 and 108 with hidden lines shown for clarity.
Figure 110:
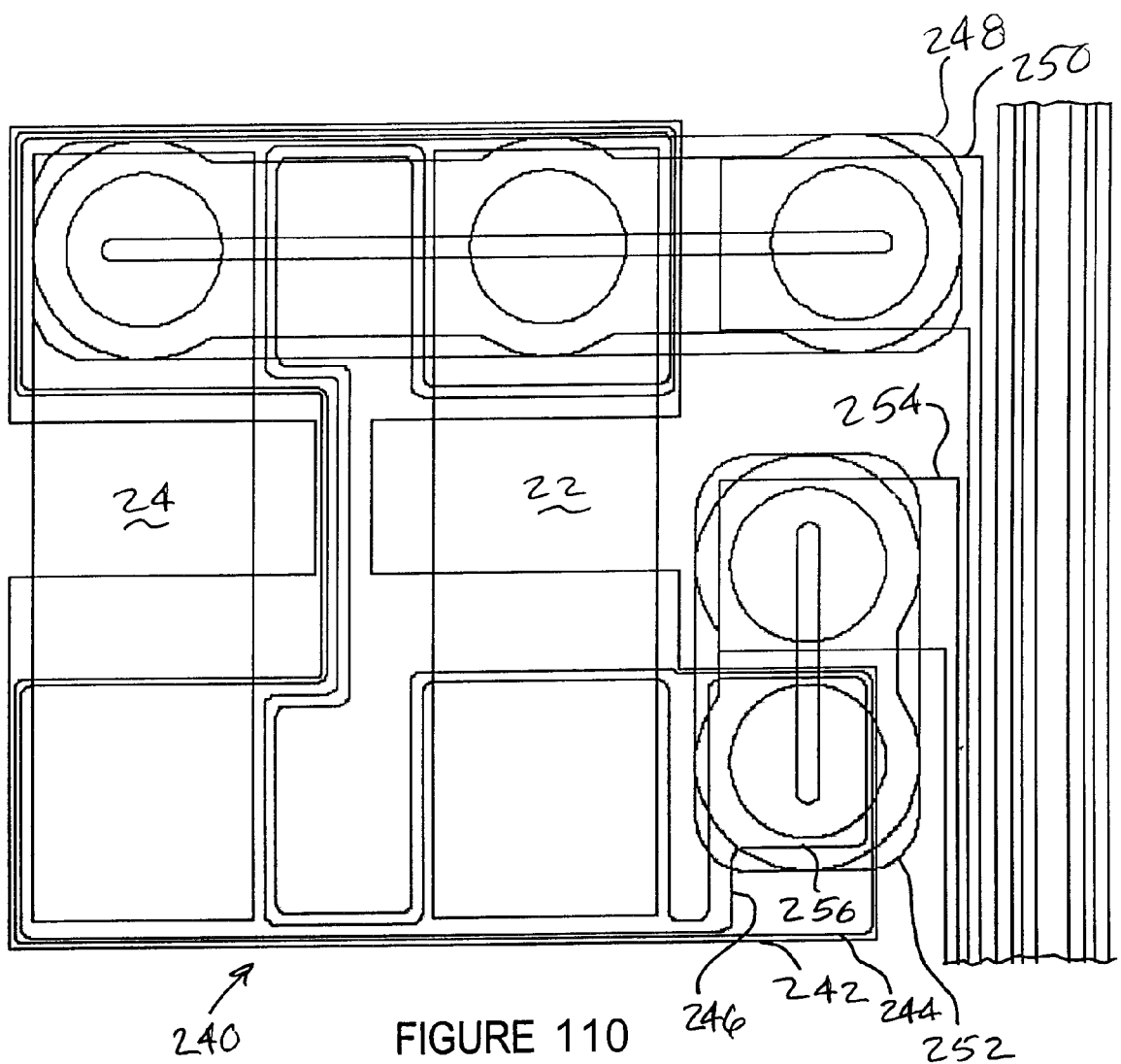
FIG. 110 is an enlarged composite or wireform view (with hidden lines shown for clarity) of the motor subassembly of FIG. 108, together with the separate pieces of laminate connecting the motor subassembly to a portion of the flexure.
Figure 111:
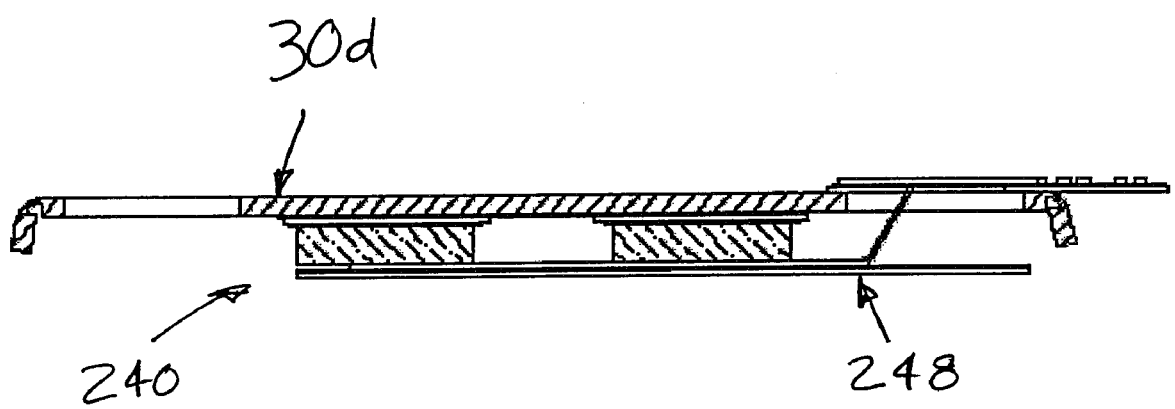
FIG. 111 is a section view along line I—I of FIG. 109.
Figure 112:
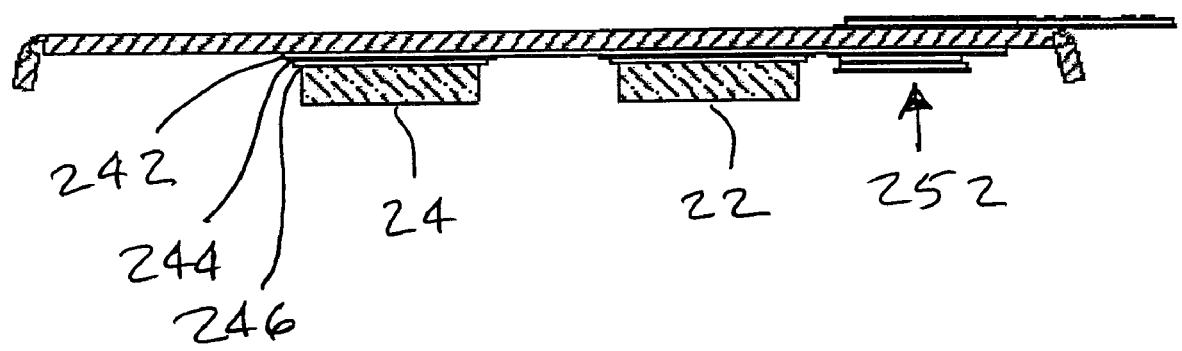
FIG. 112 is a section view along line II—II of FIG. 109.
Figure 113:
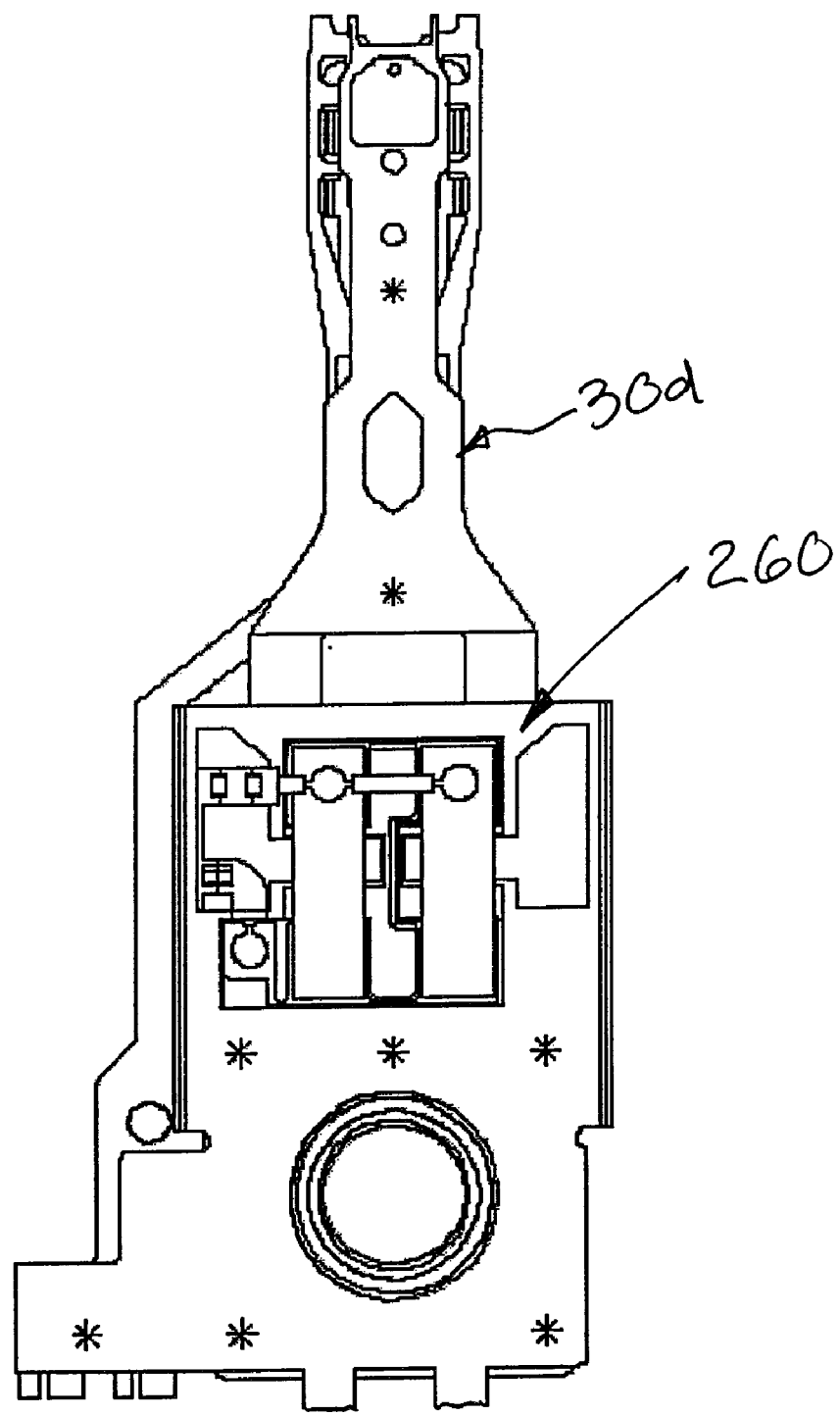
FIG. 113 is a top plan view of a third version of the fourth alternative embodiment wherein the PZT motors are attached using solder or conductive epoxy to extensions of the conductive leads formed from the flexure material.
Figure 114:
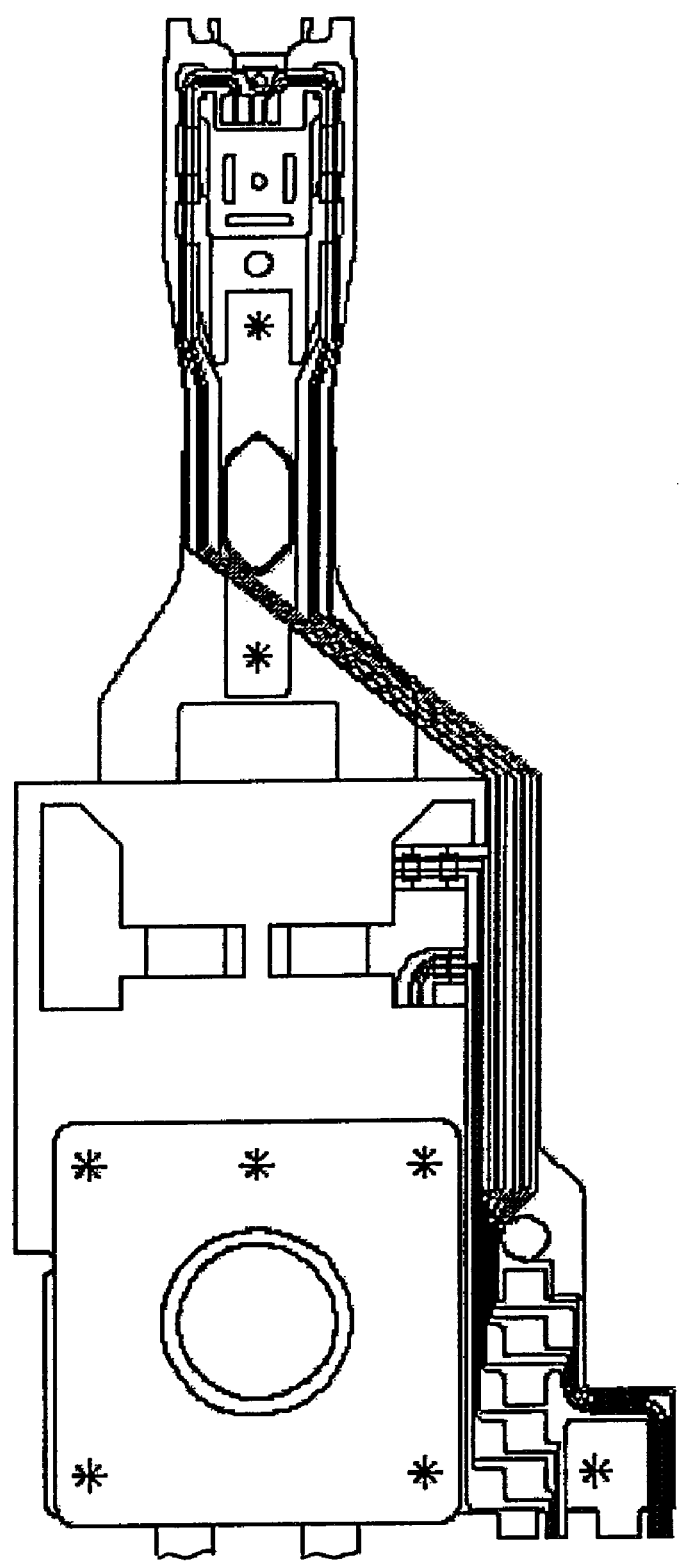
FIG. 114 is a bottom plan view of the version shown in FIG. 112.
Figure 115:
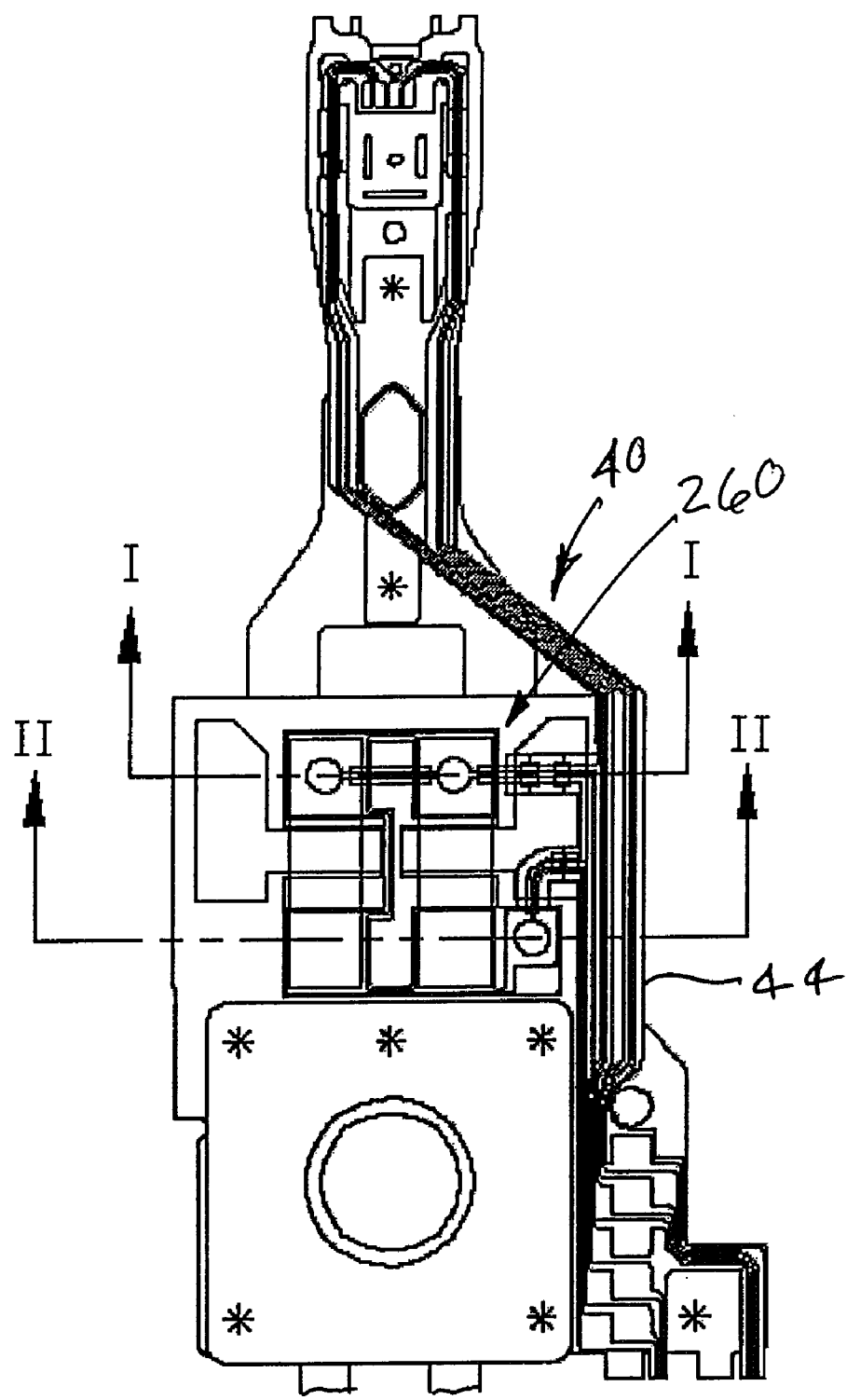
FIG. 115 is a composite view of FIGS. 113 and 114 with hidden lines shown for clarity.
Figure 116:
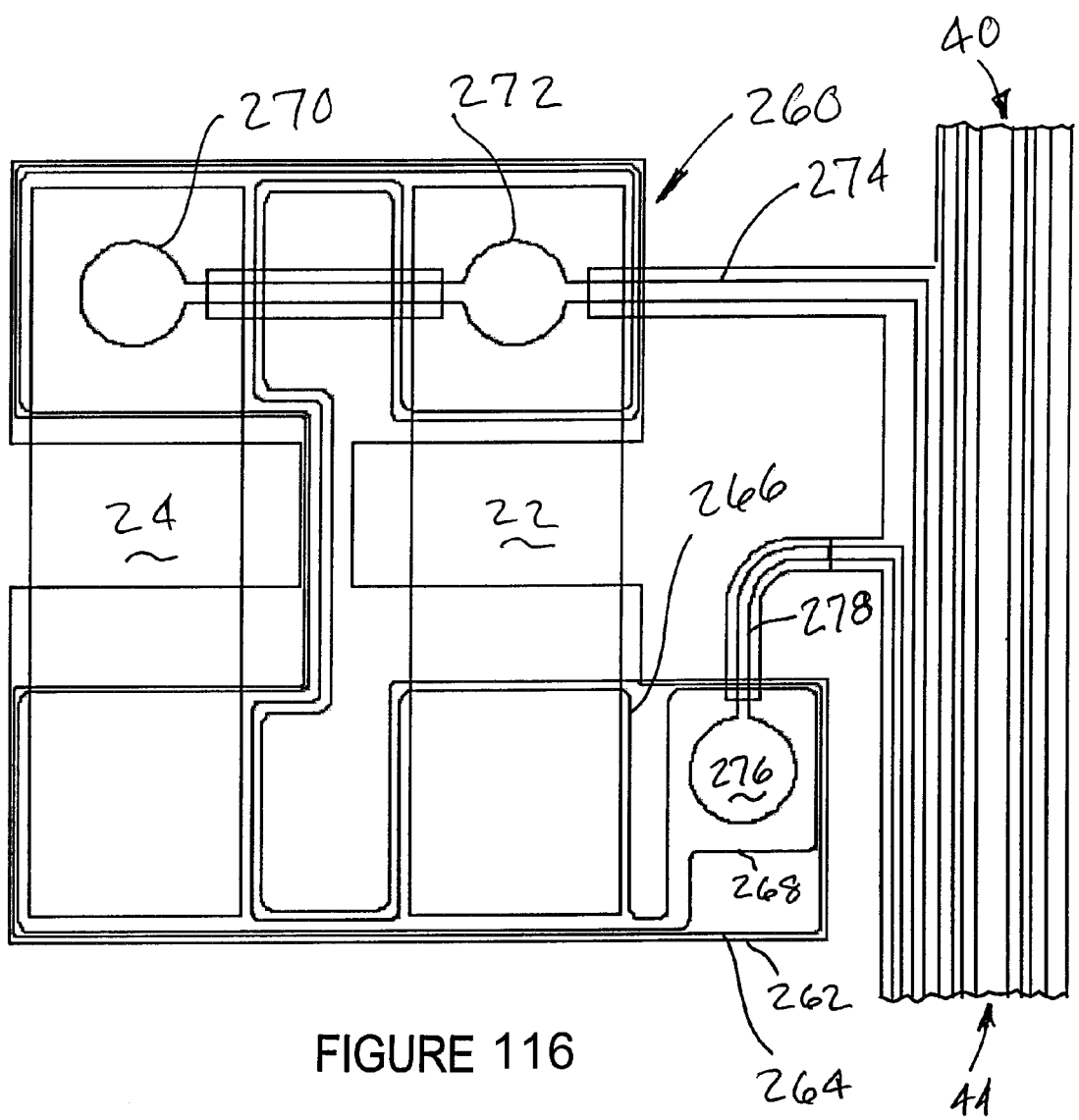
FIG. 116 is an enlarged composite or wireform view (with hidden lines shown for clarity) of the motor subassembly of FIG. 113, together with lead extensions and solder connections between the motor subassembly and a portion of the flexure.
Figure 117:
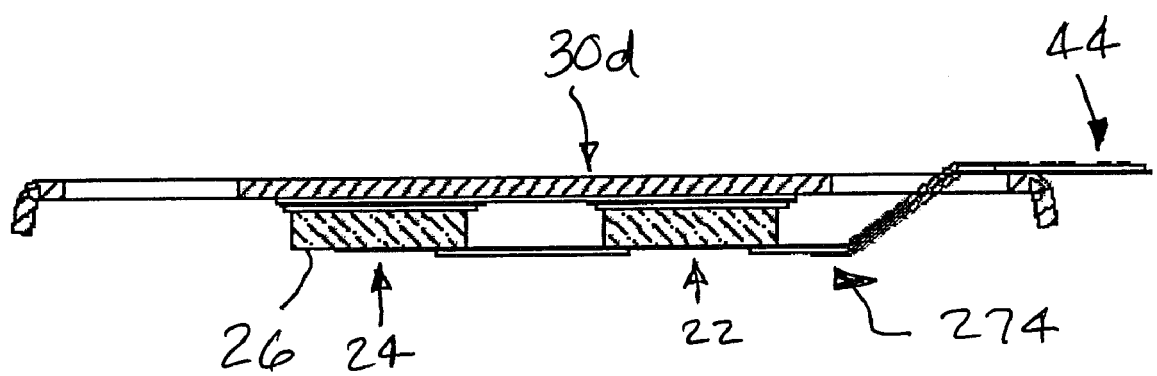
FIG. 117 is a section view along line I—I of FIG. 115.
Figure 118:
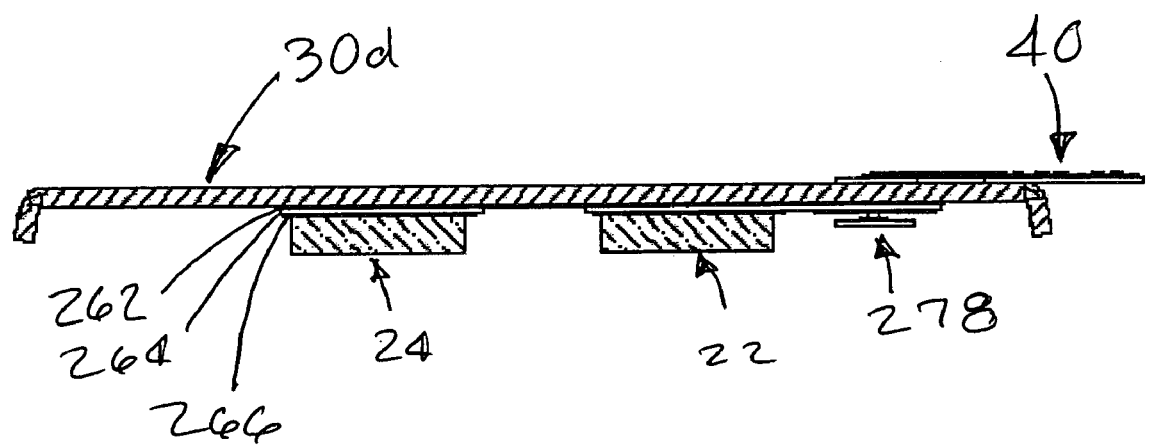
FIG. 118 is a section view along line II—II of FIG. 115.
Figure 119:
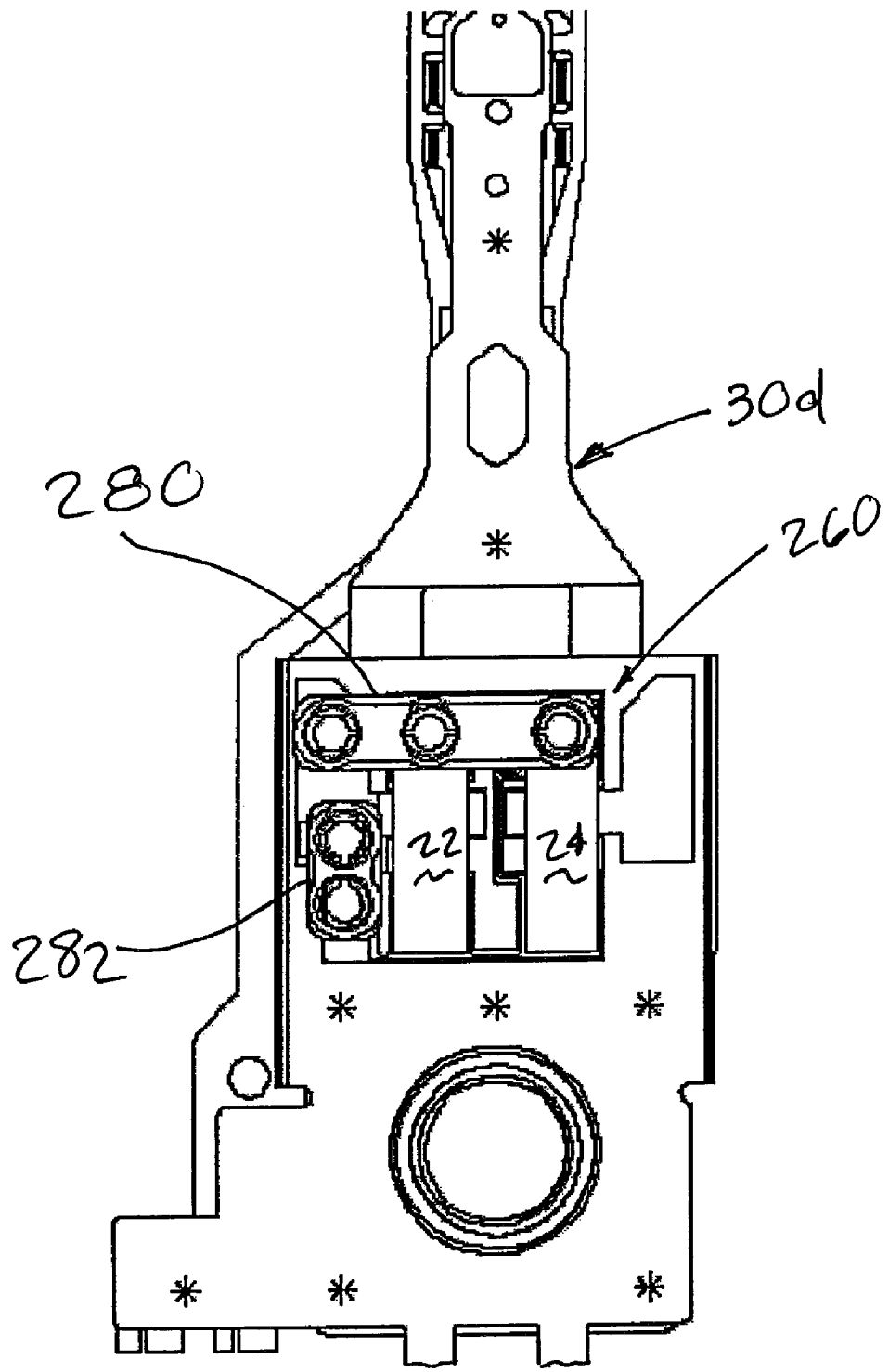
FIG. 119 is a top plan view of a fourth version of the fourth alternative embodiment wherein solder or conductive epoxy connections using a pair of extra pieces electrically attach the PZT motors to the conductive leads formed from the flexure material.
Figure 120:
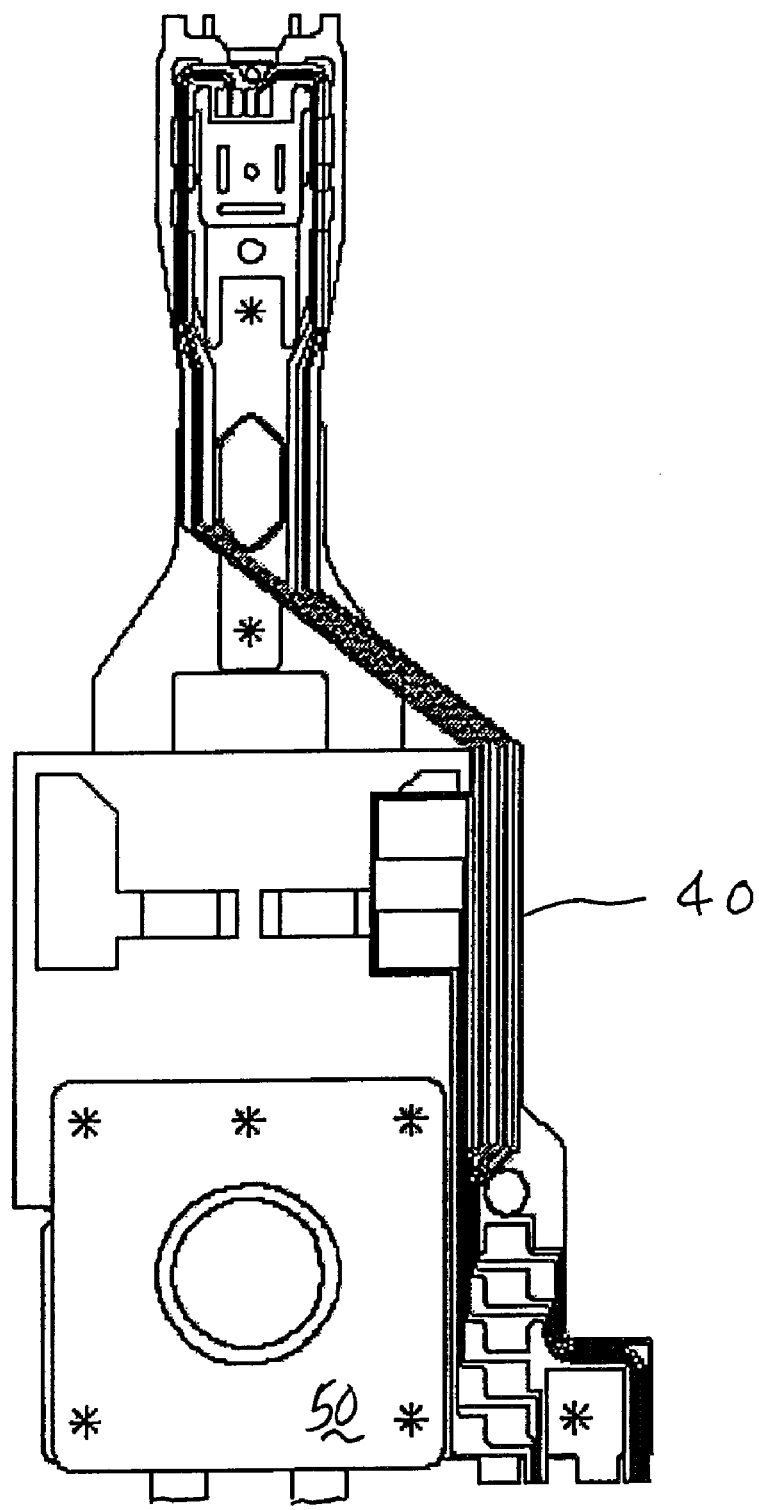
Figure 121:
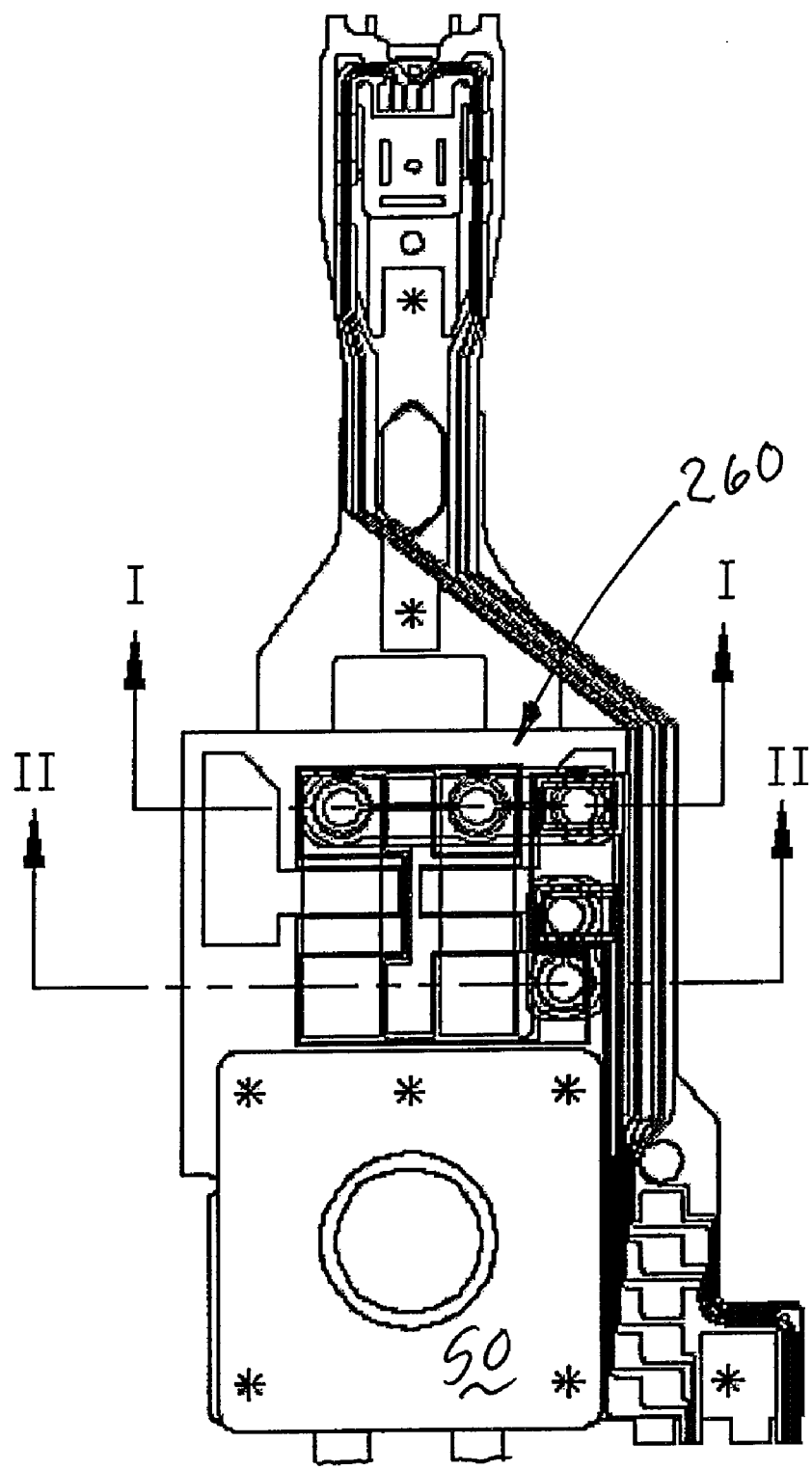
Figure 122:
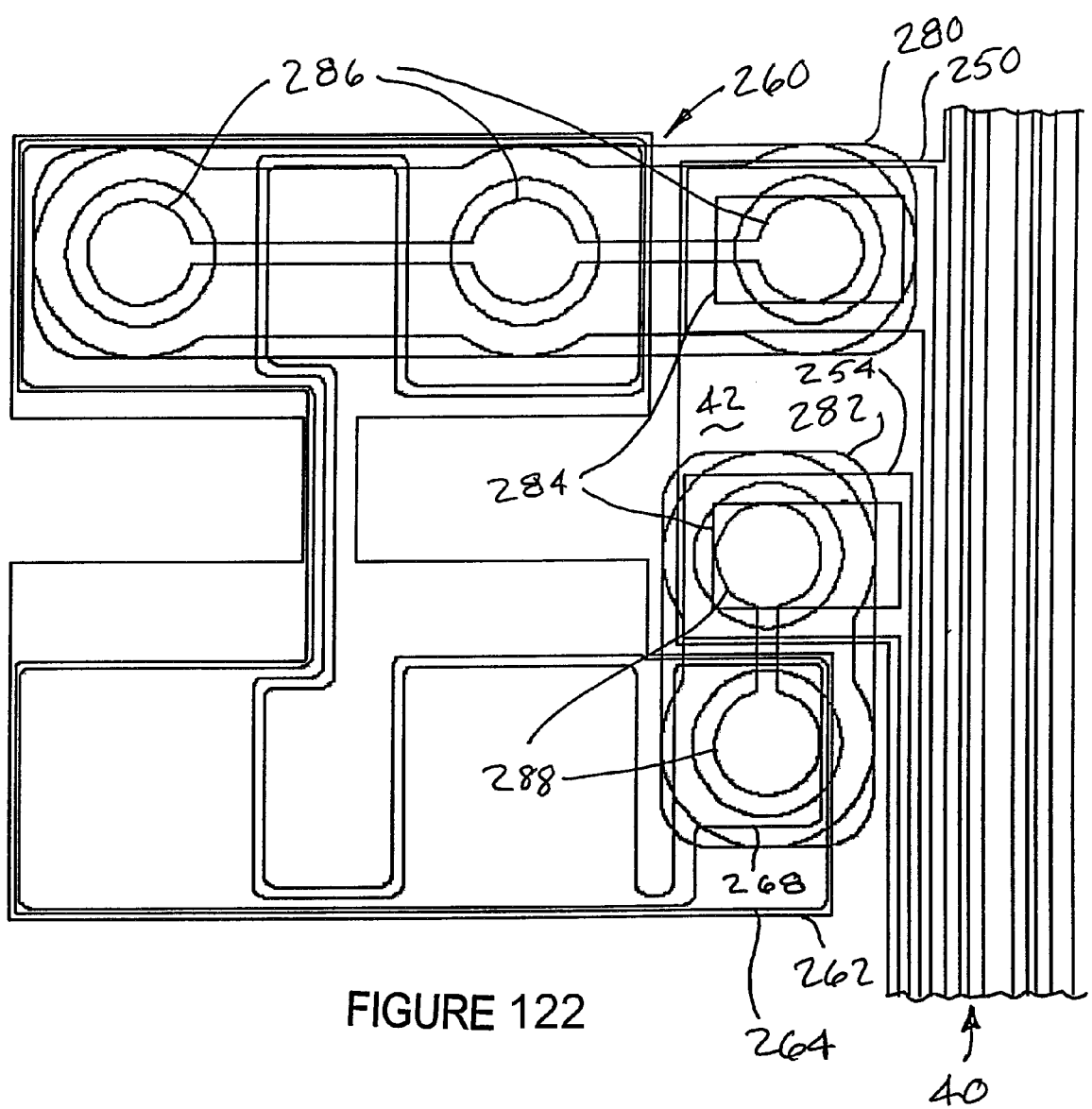
Figure 123:
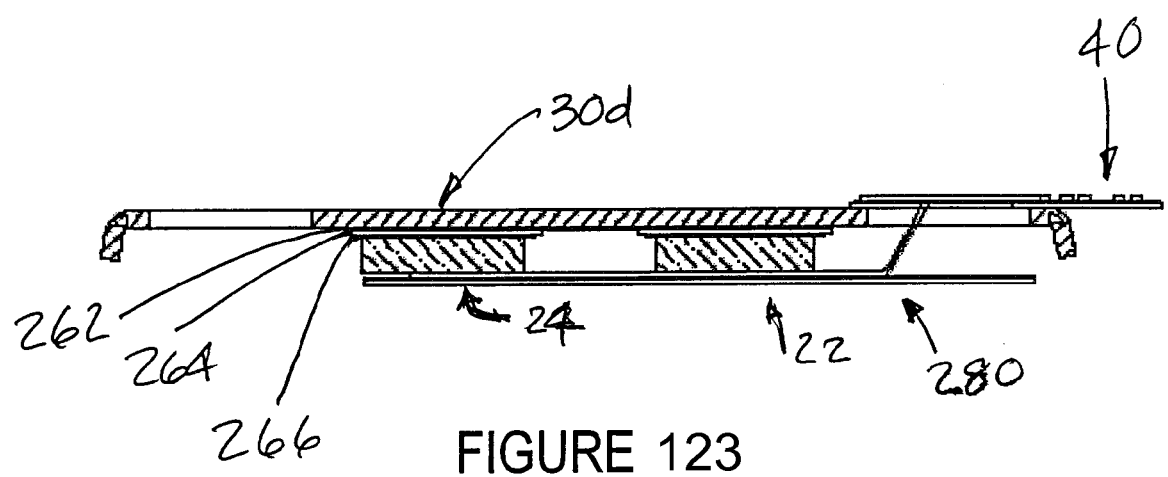
Figure 124:
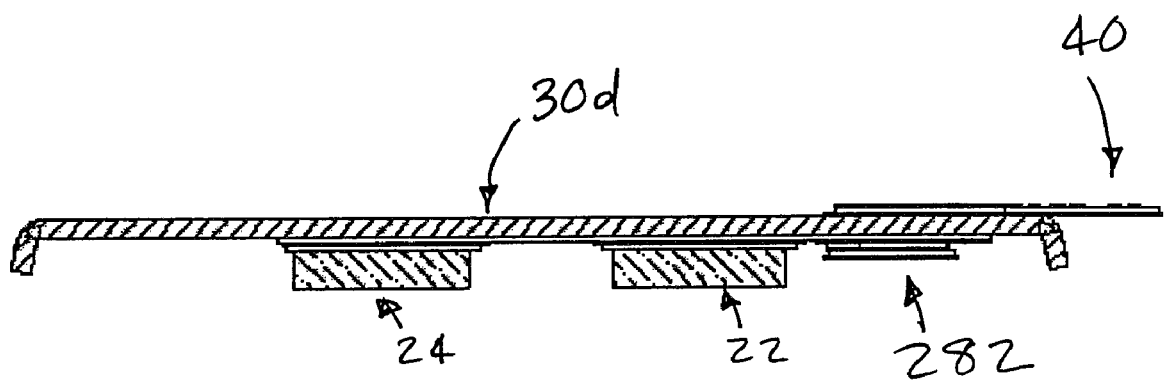

Referring now most particularly to FIGS. 97 through 106, a version of the present invention using a motor subassembly 220 may be seen. FIG. 100 shows an enlarged plan view of a metal substrate layer 222 useful for the motor subassembly 220. FIG. 101 is a plan view of a dielectric layer 224 for the motor subassembly 220, and FIG. 102 shows a conductive pad layer 226 for the motor subassembly 220. FIG. 104 shows the motor subassembly 220 and FIG. 105 shows the motor subassembly with lead extensions 228 and 230, along with portions of the dielectric layer 232 of the flexure to connect to the PZTs 22 and 24 in the motor subassembly 220. In this embodiment, the lead extensions 228 is ultrasonically bonded to the surface 26 of the PZTs 22, 24 and the lead extension 230 is ultrasonically bonded to a bond pad 234 in the conductive pad layer 226 which is mechanically and electrically bonded to surface 28 of the PZTs 22 and 24.

FIGS. 107–112 illustrate another variation of the present invention wherein the motor subassembly 240 has a substrate 242, a dielectric layer 244 and a conductive pad layer 246 connected to surface 28 of PZTs 22 and 24. A first separate laminate piece 248 connects via ultrasonic bonding a first flexure bond pad 250 the surface 26 of PZTs, and a second separate laminate piece 252 connects via ultrasonic bonding between a second flexure bond pad 254 and a conductive pad layer bond pad 256.

Similarly, referring now to FIGS. 113 through 118, lead extensions may be used to provide solder or conductive epoxy connections to the motor subassembly 260 in this version of the present invention. Motor subassembly 260 has a substrate layer 262, a dielectric layer 264, and a conductive pad layer 266 which carries a conductive pad layer bond pad 268. Solder or conductive epoxy connections at 270 and 272 connect a first lead extension 274 from flexure 40 to the surface 26 of PZTs 22 and 24, and solder or conductive epoxy connection 276 connects a second lead extension 278 to the bond pad 268. The load beam 30d for this version carries the motor subassembly and may make use of the assembly details described with respect to FIGS. 91–96.

Referring now to FIGS. 119 through 124, a version of the present invention may be seen in which two separate laminate pieces 280, 282 are used to connect to motor subassembly 260. In the view shown in FIG. 122, the PZTs have been omitted, along with the stainless steel layer 38 of flexure 40, and apertures 284 in the portion of dielectric layer 42 are shown for the first and second flexure bond pads 250 and 254 of the conductive layer 43 of the flexure 40. Solder connections 286 and 288 may be used to connect separate pieces 280 and 282 as shown.

It is to be understood that in any of the above embodiments or versions using solder, that conductive epoxy may be used in place of the solder, while still remaining within the scope of the present invention.

Currently the chip set required to provide for both large positive and negative voltages (on the order of +30 volts) with respect to circuit common to drive the PZT motors with a bipolar source cannot be incorporated into the other driver electronics. This increases the cost of the hard drive by requiring that the drive circuit provide both +V and –V outputs with respect to circuit common. The present invention allows the hard drive controller to operate in a lower overall (although still bipolar) voltage range while maintaining the same stroke performance of the suspension, by dissociating the PZT's from circuit common so that either major surface of the PZT motors can be connected to either the drive output or circuit common. With this invention, the driver electronics can be incorporated into a single chip, decreasing component costs at the hard drive level.

The present invention may thus be seen to be apparatus and method for selectively applying a voltage to one of a first and a second major surface of at least one of a pair of piezoelectric motors (PZTs) on a disk drive head suspension with a primary plane of a load beam of the head suspension parallel to the major surfaces of the PZT elements, wherein the PZT elements are electrically insulated from the load beam. Electrical connection to the PZTs may be made via wires or electro-mechanical attachment of a plated surface of the PZT with a bond pad on an electrically isolated substrate. The PZTs may be located on a first or second major surface of the load beam, or may be assembled in a pre-fabricated motor assembly before being installed in the head suspension. Apertures in the load beam and other layers permit physical installation of the PZT motors and enable electrical connection to a side of the PZTs that would otherwise be substantially inaccessible for such electrical connection.

This invention is not to be taken as limited to all of the details thereof as modifications and variations thereof may be made without departing from the spirit or scope of the invention. For example, and not by way of limitation, the structure or technique shown or described with respect to one version or embodiment may be used with other versions or embodiments where desired. By way of another example, and not by way of limitation, the separate piece used in various embodiments described above may be an isolated conductor while still remaining within the spirit and scope of the present invention. Such an isolated conductor may have an aspect ratio of width to thickness of about five to one or greater. Furthermore, such a separate piece may be formed generally in the z-axis direction (i.e., generally perpendicular to the plane of the suspension or the plane of one of the major surfaces 26 or 28 of the PZTs) as desired to conform to the pad and PZT topography. The isolated conductor may be attached via ultrasonic bonding, solder or conductive epoxy.

What is claimed is:

1. Apparatus for mechanically mounting and electrically connecting to a piezoelectric element on a head suspension comprising:
   a. an electrically conductive substrate having a primary plane and forming a part of the head suspension;
   b. a piezoelectric element having a first major surface that is generally planar and located parallel to the primary plane; and
   c. an electrically insulating layer between the substrate and the piezoelectric element such that the piezoelectric element is electrically insulated from all metallic structural parts of the head suspension;
   wherein the first major surface of the piezoelectric element faces toward the substrate and
   wherein the substrate has an aperture aligned with a portion of the piezoelectric element and the electrically insulating layer has a void aligned with the aperture to provide access for electrical connection to the first major surface of the piezoelectric element through the aperture and void.

2. Apparatus for selectively applying a voltage to one of a first and a second major surface of at least one of a pair of piezoelectric motors on a disk drive head suspension with a primary plane of a load beam of the head suspension parallel to a major surface of the piezoelectric motors, the apparatus comprising:
   a. a first electrical connection to at least one of the piezoelectric motors on a first side thereof;
   b. a second electrical connection to the at least one piezoelectric motor on a second side thereof located opposite the first side;

wherein the at least one piezoelectric motor is electrically insulated from all metallic structural parts of the head suspension and at least one of the first and second electrical connections is made through an aperture in at least one structural part of the head suspension.

3. The apparatus of claim 2 wherein the other of the first and second electrical connections to at least one of the piezoelectric motors is an electro-mechanical attachment of a plated surface of the at least one of the piezoelectric motors with a bond pad on an electrically isolated substrate.

4. The apparatus of claim 2 wherein the at least one of the piezoelectric motors is located on one of a first and second major surface of the head suspension.

5. The apparatus of claim 2 wherein the at least one of the piezoelectric motors is assembled in a pre-fabricated motor assembly before being installed in the head suspension.

6. The apparatus of claim 2 wherein the at least one aperture is formed in the head suspension in alignment with at least one of the piezoelectric motors to enable electrical connection to a side of the at least one of the piezoelectric motors that would otherwise be substantially inaccessible for such electrical connection.

* * * * *